United States Patent [19]
Ito et al.

[11] Patent Number: 5,838,082
[45] Date of Patent: Nov. 17, 1998

[54] SUPERCONDUCTING BEARING DEVICE

[75] Inventors: Norio Ito; Junichiro Shinozaki; Hiroshi Imaizumi, all of Suwa, Japan

[73] Assignee: Seiko Epson Corporation, Tokyo, Japan

[21] Appl. No.: 602,654

[22] Filed: Feb. 16, 1996

[30]     Foreign Application Priority Data

| Feb. 17, 1995 | [JP] | Japan | 7-029490 |
| Mar. 15, 1995 | [JP] | Japan | 7-056208 |
| Mar. 30, 1995 | [JP] | Japan | 7-074066 |
| Apr. 6, 1995 | [JP] | Japan | 7-081446 |
| Nov. 30, 1995 | [JP] | Japan | 7-313219 |

[51] Int. Cl.$^6$ .................................................. H02K 7/09
[52] U.S. Cl. .......................... 310/90.5; 310/90; 310/156; 505/166
[58] Field of Search ........................ 310/90.5, 90, 156; 505/166

[56]                     References Cited

U.S. PATENT DOCUMENTS

| 4,879,485 | 11/1989 | Tassinario | 310/156 |
| 5,196,748 | 3/1993 | Rigney | 310/90.5 |
| 5,220,232 | 6/1993 | Rigney, II et al. | 310/90.5 |
| 5,302,874 | 4/1994 | Pinkerton | 310/90.5 |
| 5,330,967 | 7/1994 | Takahata et al. | 505/166 |
| 5,332,971 | 7/1994 | Aubert | 324/319 |
| 5,506,558 | 4/1996 | Laube | 335/306 |
| 5,525,849 | 6/1996 | Ito et al. | 310/90.5 |
| 5,540,116 | 7/1996 | Hull et al. | 74/572 |
| 5,557,155 | 9/1996 | Hull | 310/90.5 |

FOREIGN PATENT DOCUMENTS

| 4-191520 | 7/1992 | Japan . |  |
| 4-331815 | 11/1992 | Japan . |  |
| 5-180225 | 7/1993 | Japan . |  |
| WO 93/16294 | 10/1993 | Japan | 310/90.5 |
| 6-2646 | 1/1994 | Japan . |  |
| 6-42532 | 2/1994 | Japan . |  |
| 6-81845 | 3/1994 | Japan . |  |
| 7-004476 | 1/1995 | Japan . |  |
| 2204741 | 5/1987 | United Kingdom | 310/90.5 |

*Primary Examiner*—Steven L. Stephan
*Assistant Examiner*—Elvin G. Enad
*Attorney, Agent, or Firm*—Michael T. Gabrik

[57]                     ABSTRACT

A superconducting bearing device comprising a superconductor mounted on a stationary member and a magnet section to be mounted on a rotating member, the superconductor and the magnet section being disposed to oppose each other with a gap therebetween. Also disclosed is a method for producing the magnet section thereof, wherein the magnet section consists of a plurality of annular permanent magnets which are concentric with the axis of the rotating member and also include at least one soft magnetic yoke disposed between these annular permanent magnets. Each annular magnet, in turn, may be comprised of a plurality of arcuate magnet portions whose joint surfaces may be concentrically or axially staggered to disperse nonuniform flux densities observed at their junction surfaces. The joint surfaces between the annular and magnets and the interposing rings may be curved or slanted to reduce axial displacement when the magnet section is rotated. Also, the yoke members may protrude towards the superconductor relative to the permanent magnets comprising the magnet section, and these yokes may be optimally shaped to concentrate and direct magnetic flux to the opposing superconductor in conjunction with curled magnetization of the permanent magnets. Finally, one or more restraining members or wedge portions may be fitted to the magnet section to radially and circumferentially compress the permanent magnets sections and prevent their displacement and breakage at high rotational speeds.

45 Claims, 28 Drawing Sheets

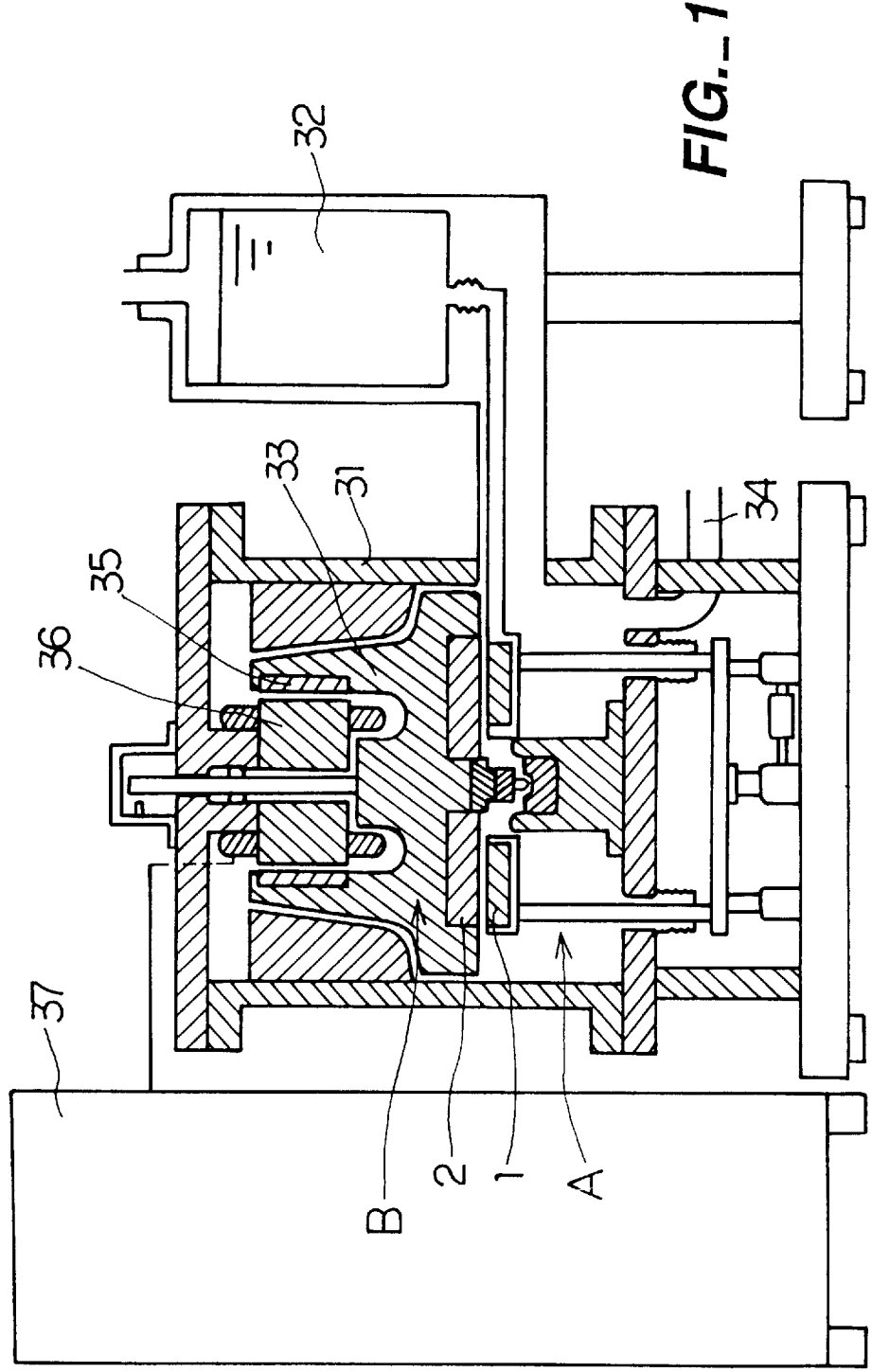
FIG._1

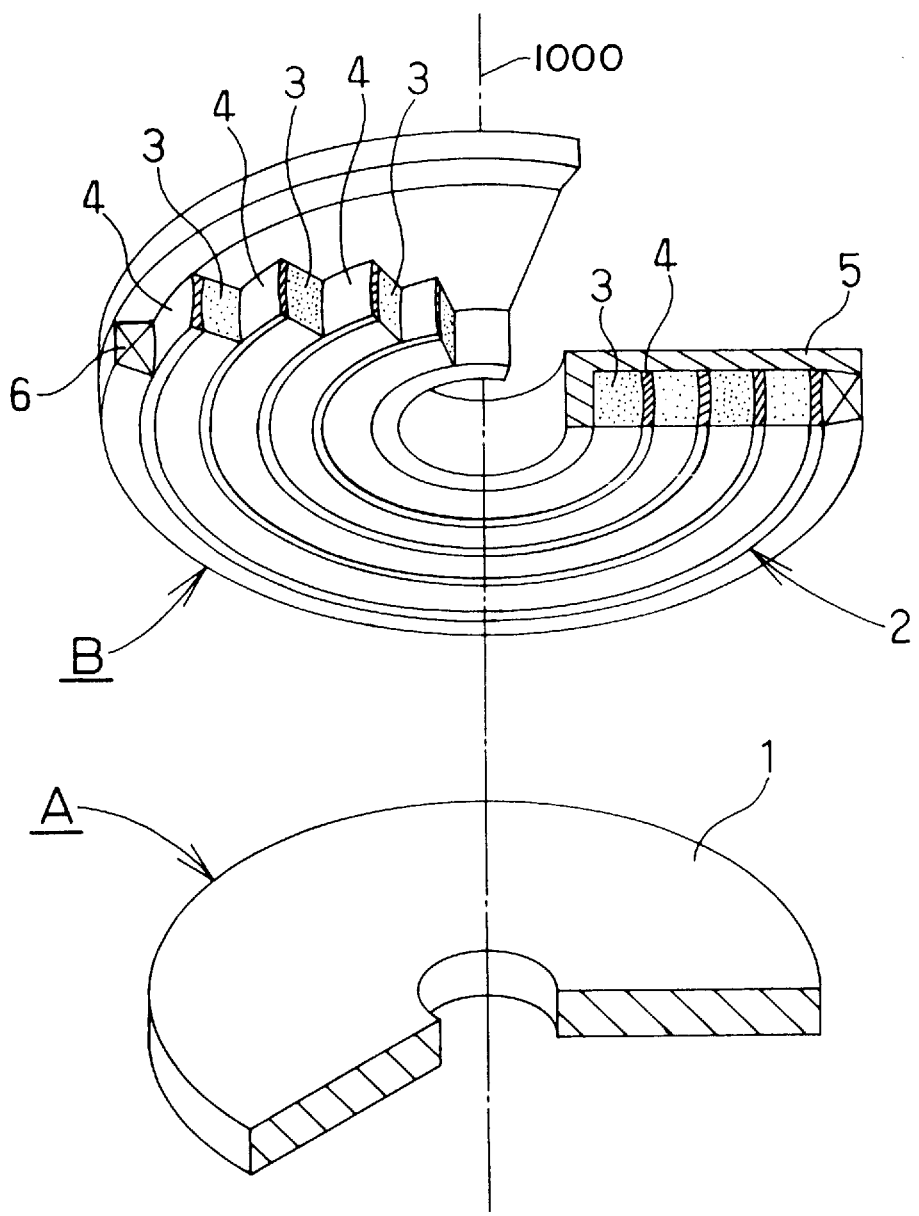
FIG._2

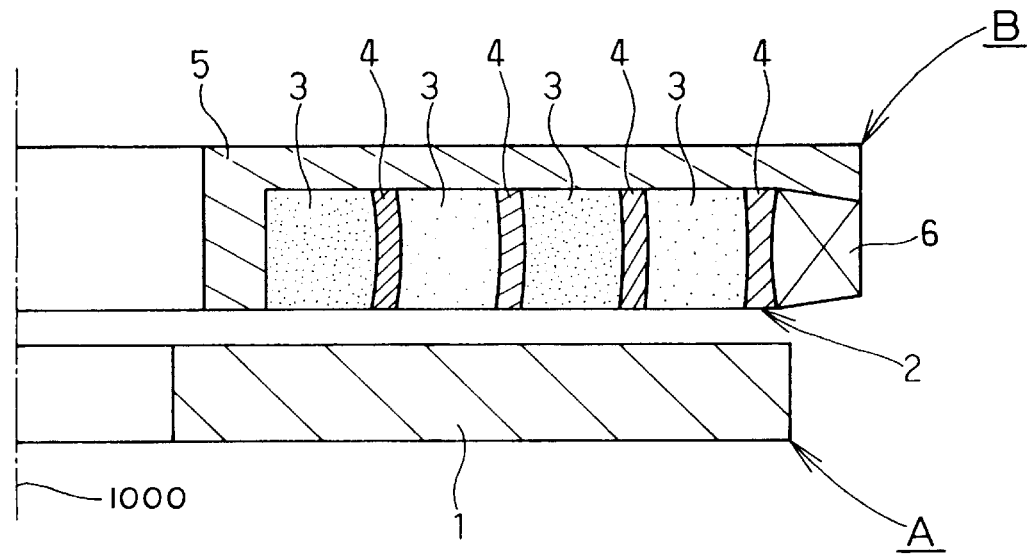
FIG._3
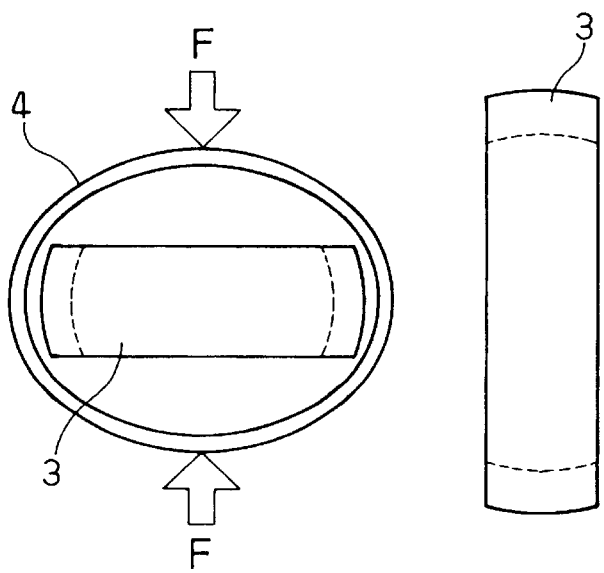
FIG._4A  FIG._4B

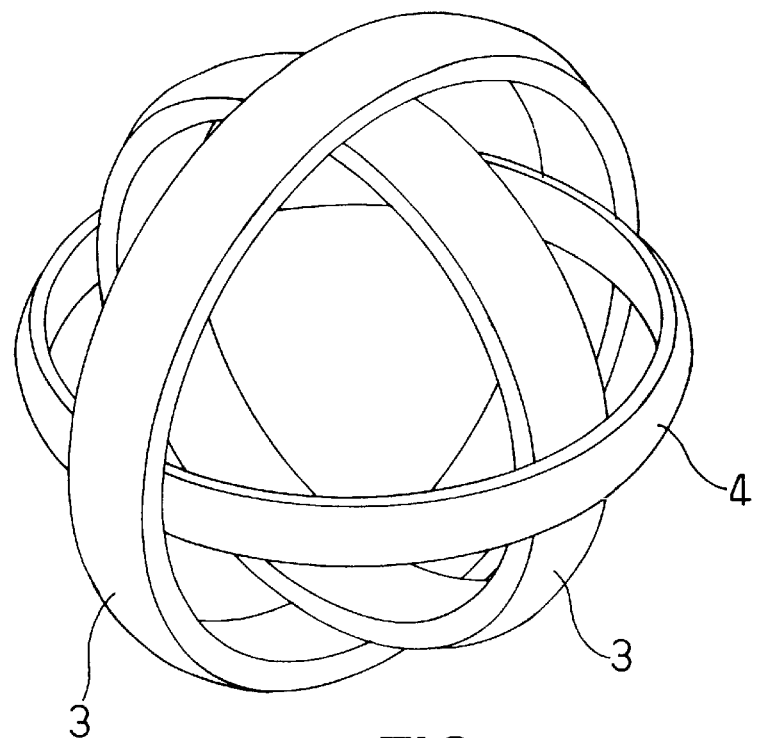
FIG._5
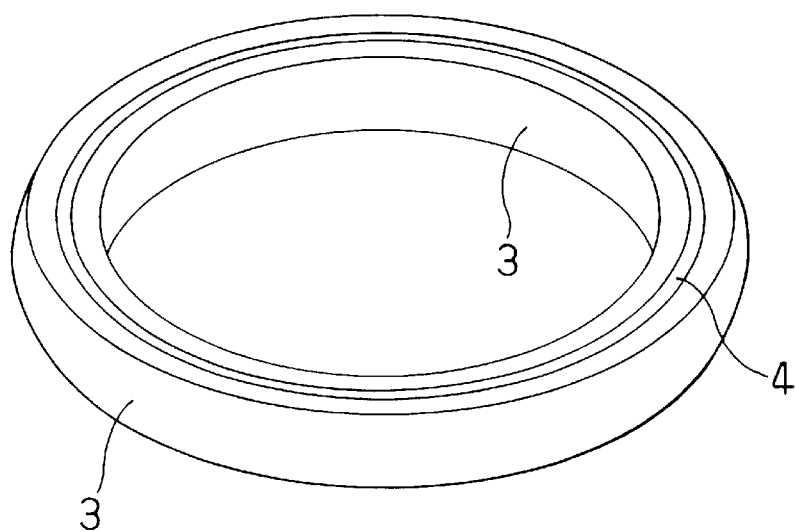
FIG._6

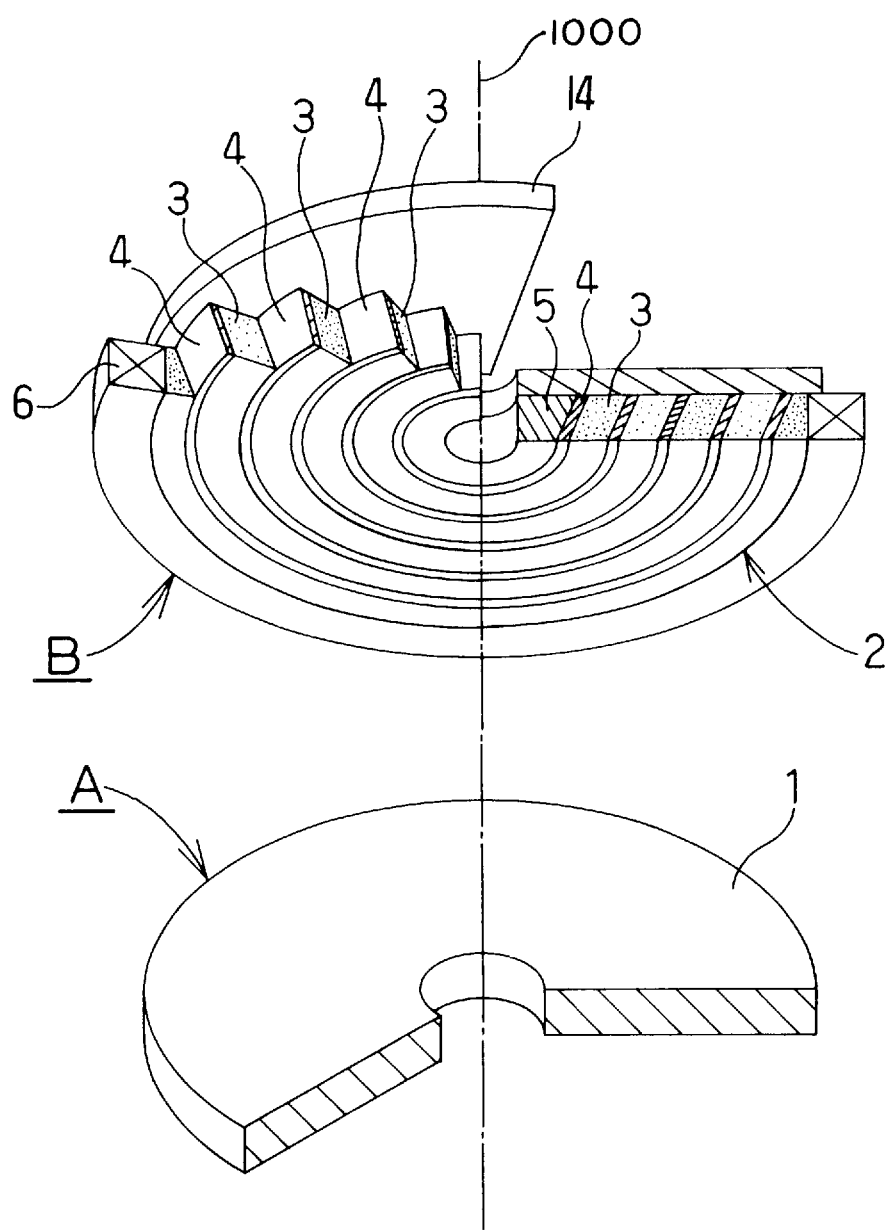
FIG._7

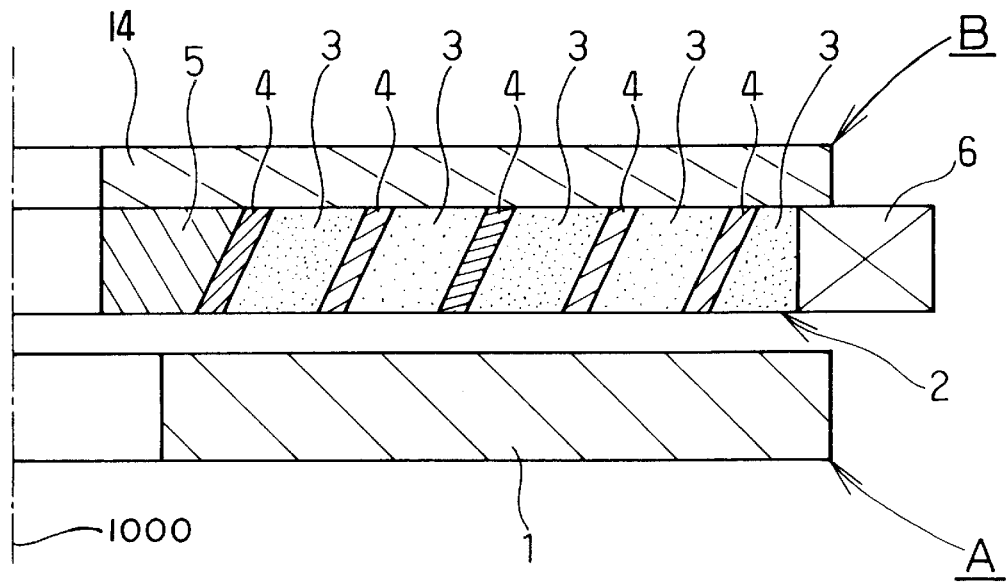
FIG._8
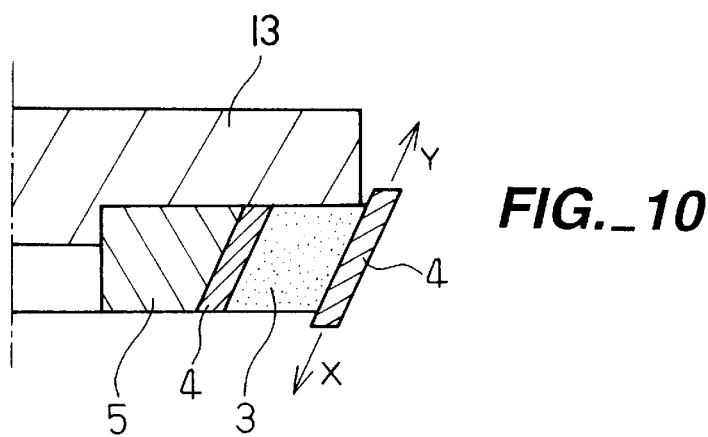
FIG._10
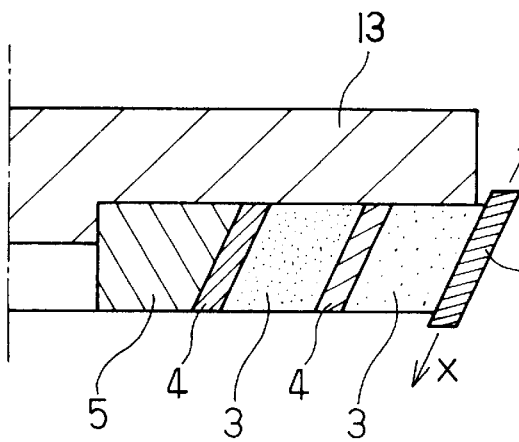
FIG._11

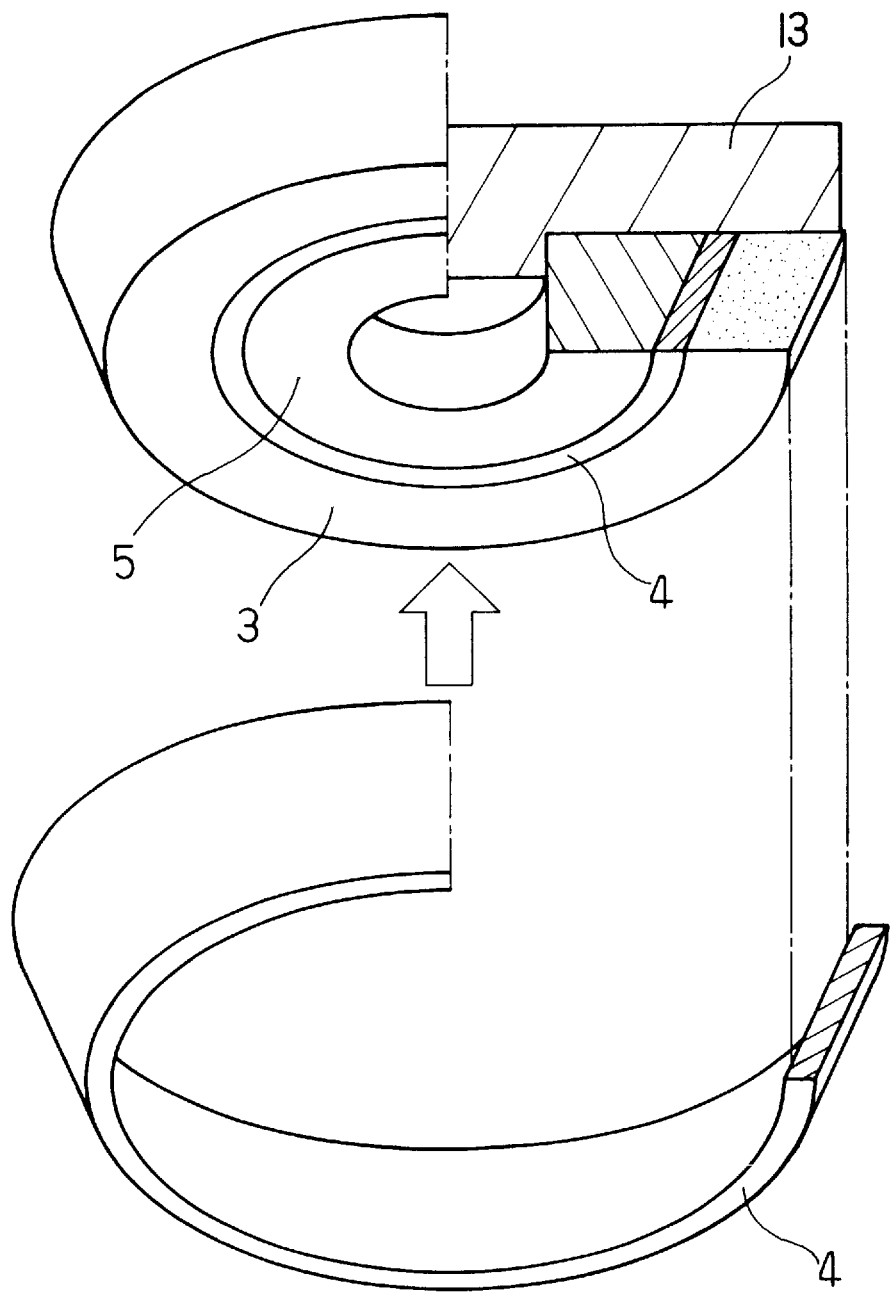
FIG._9

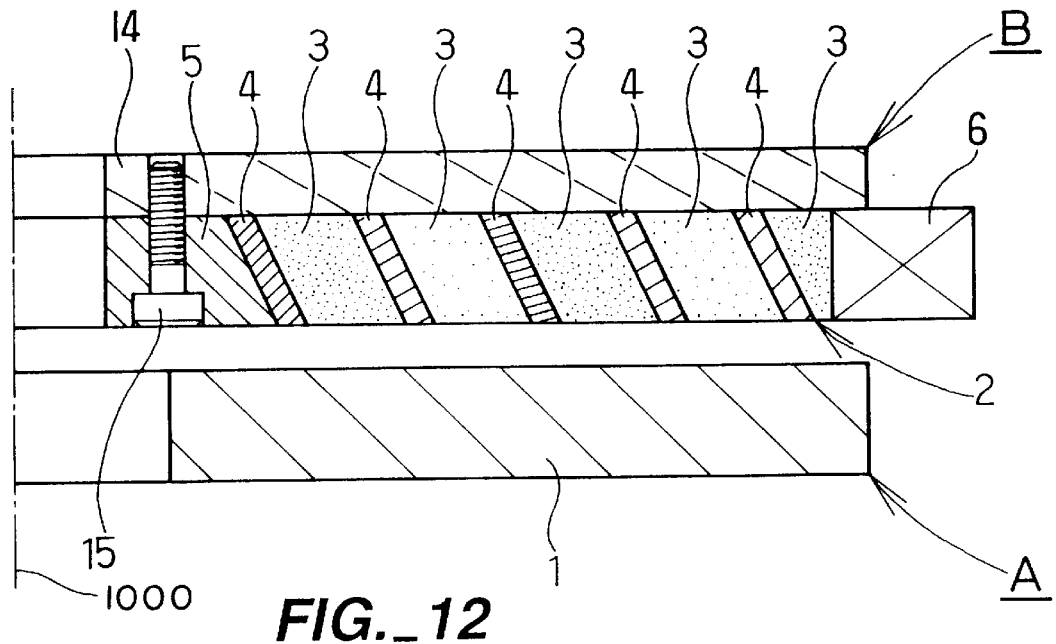
FIG._12
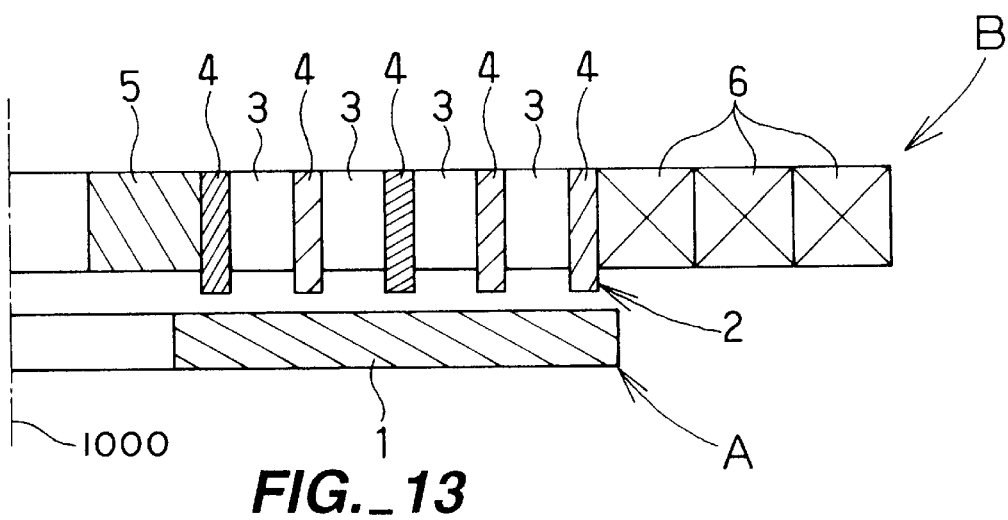
FIG._13

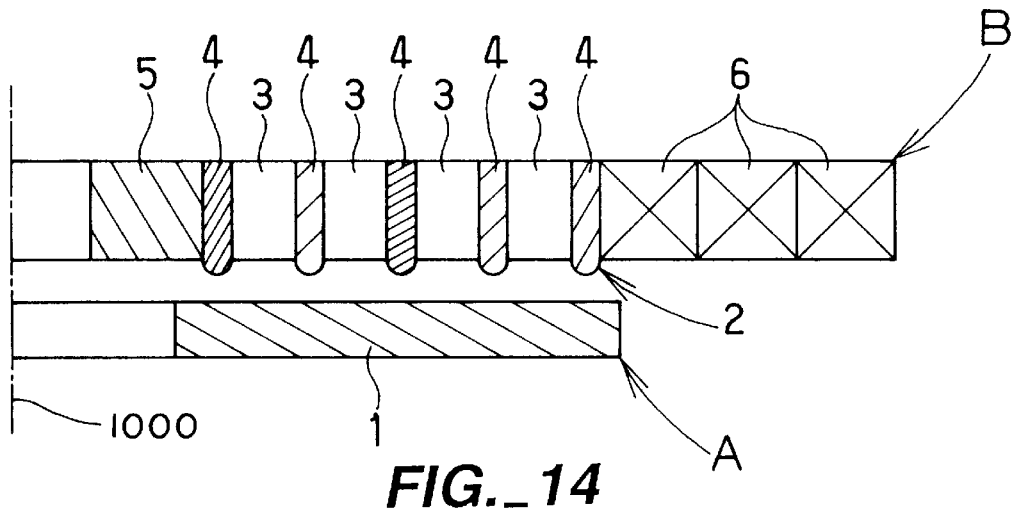
FIG._14
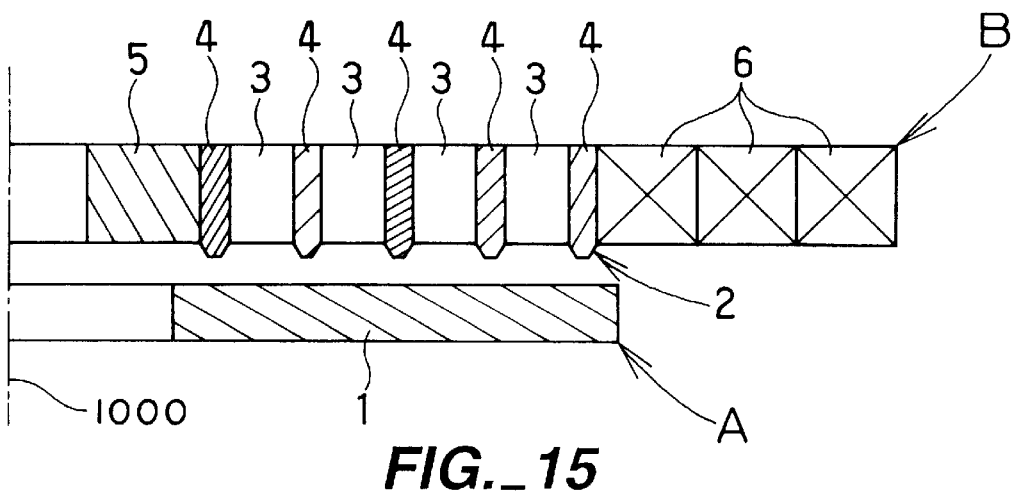
FIG._15

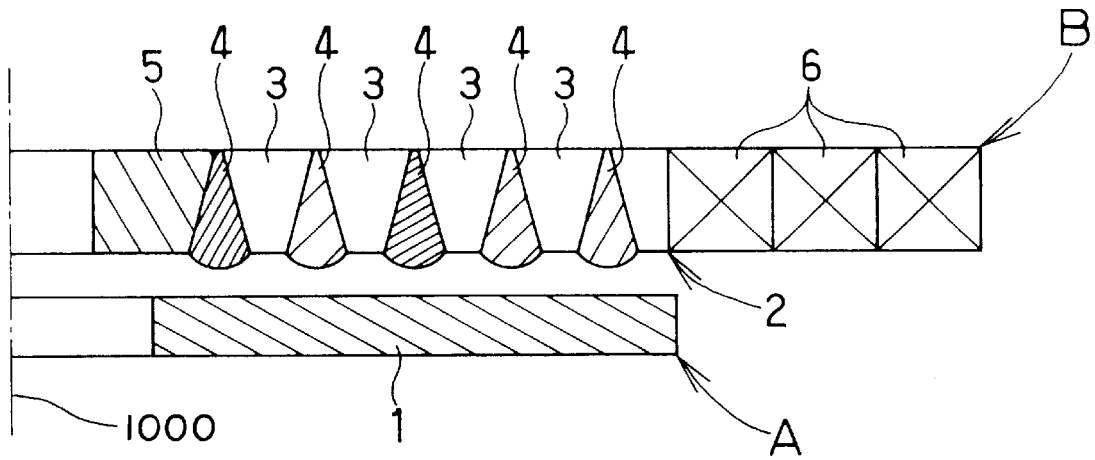
FIG._16
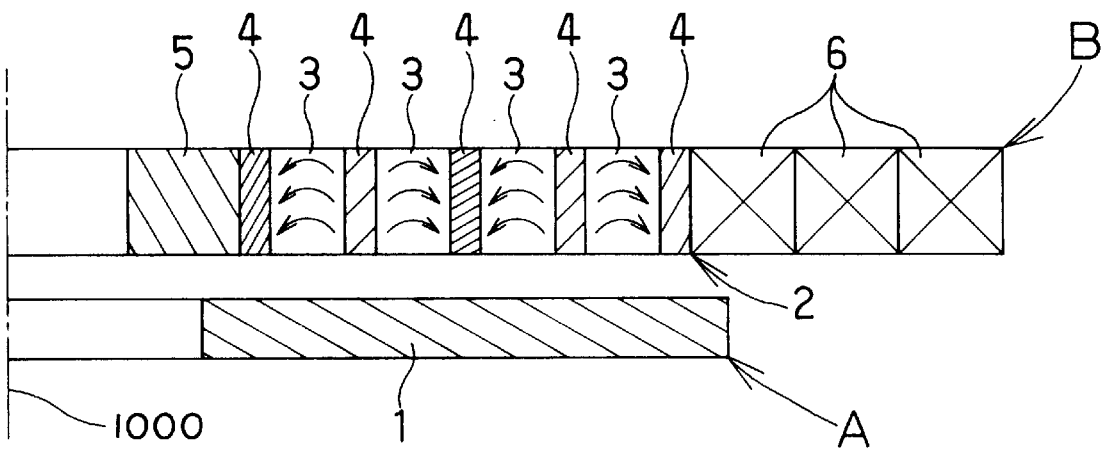
FIG._17

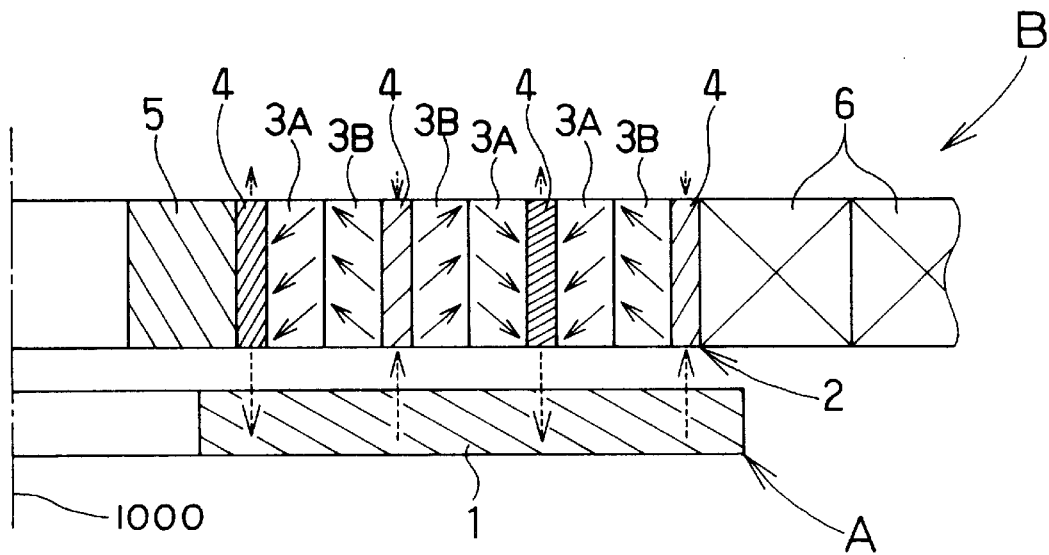
FIG._18
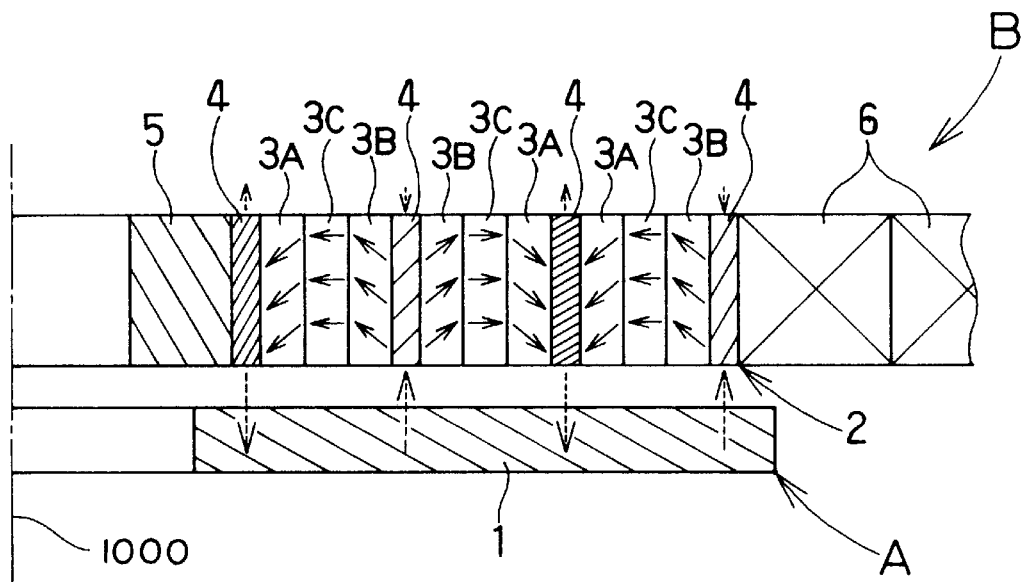
FIG._19

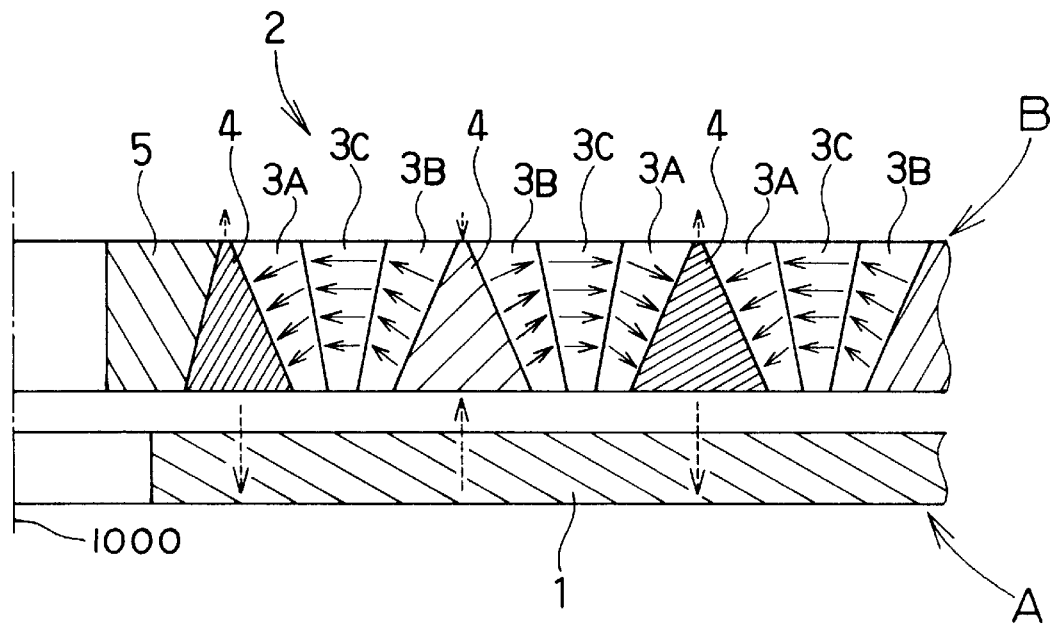
FIG._20
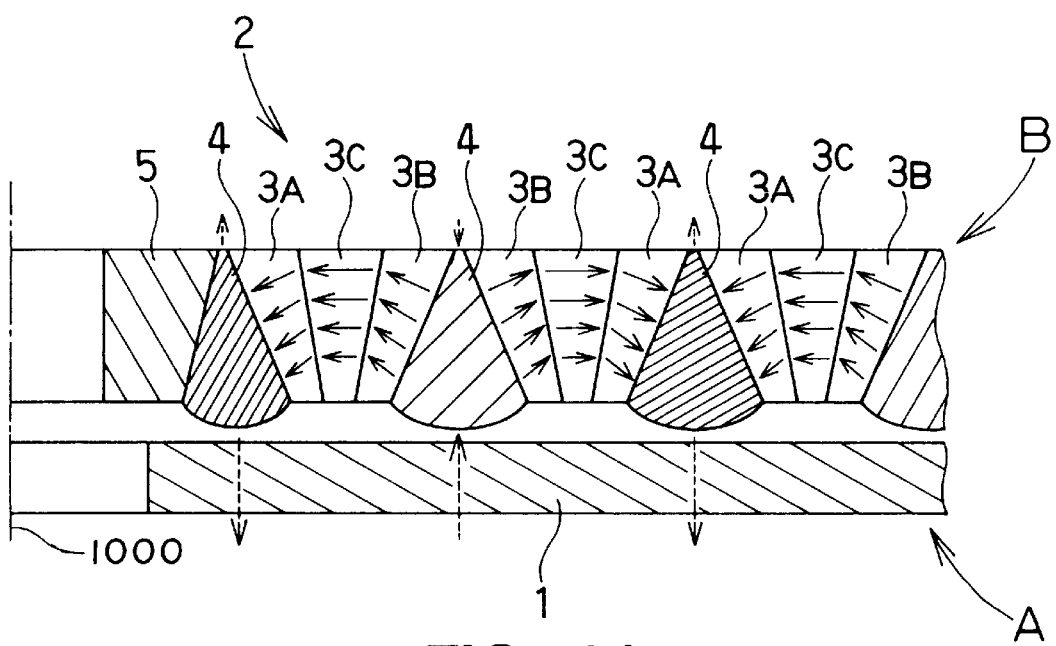
FIG._21

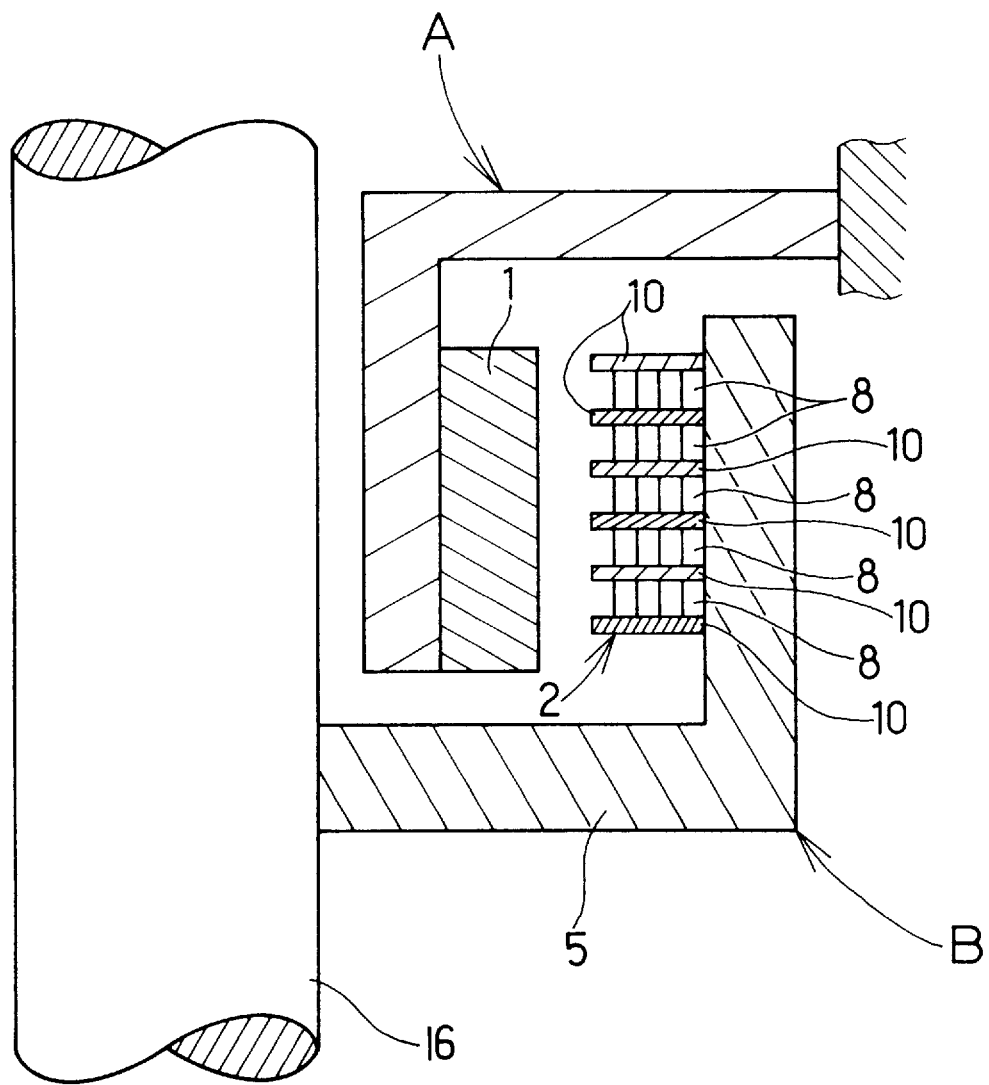
FIG._22

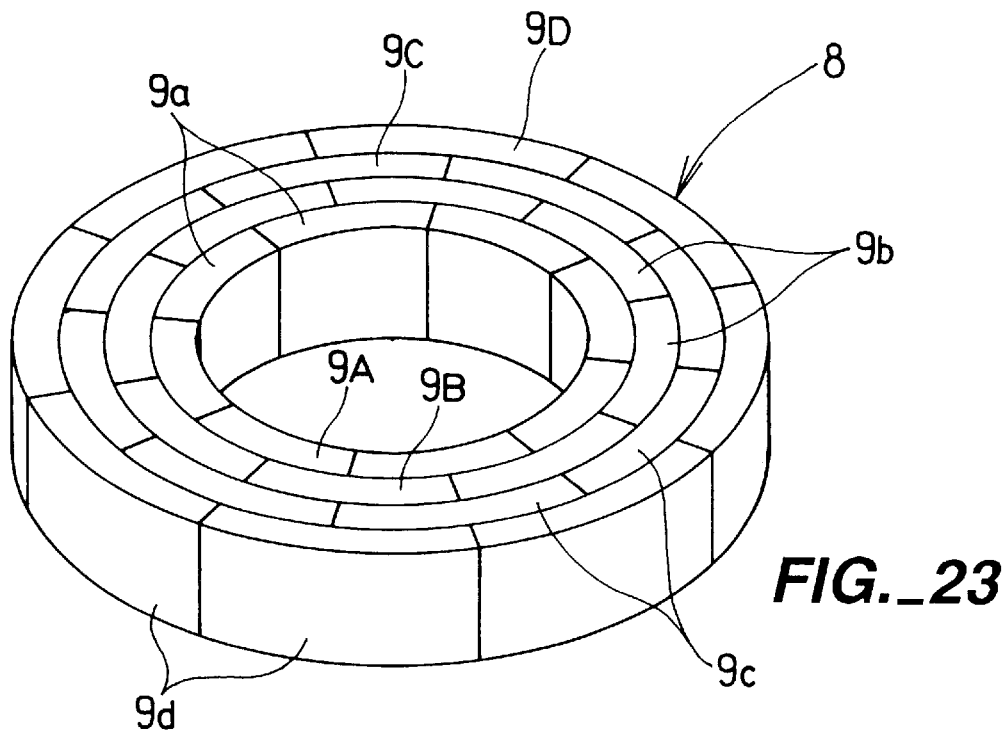
FIG._23
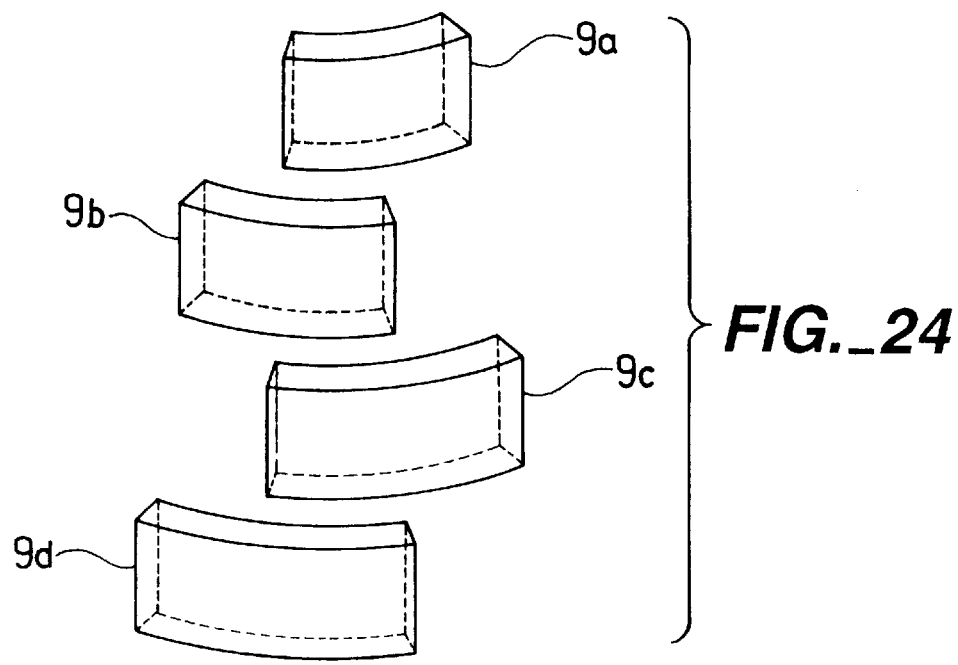
FIG._24

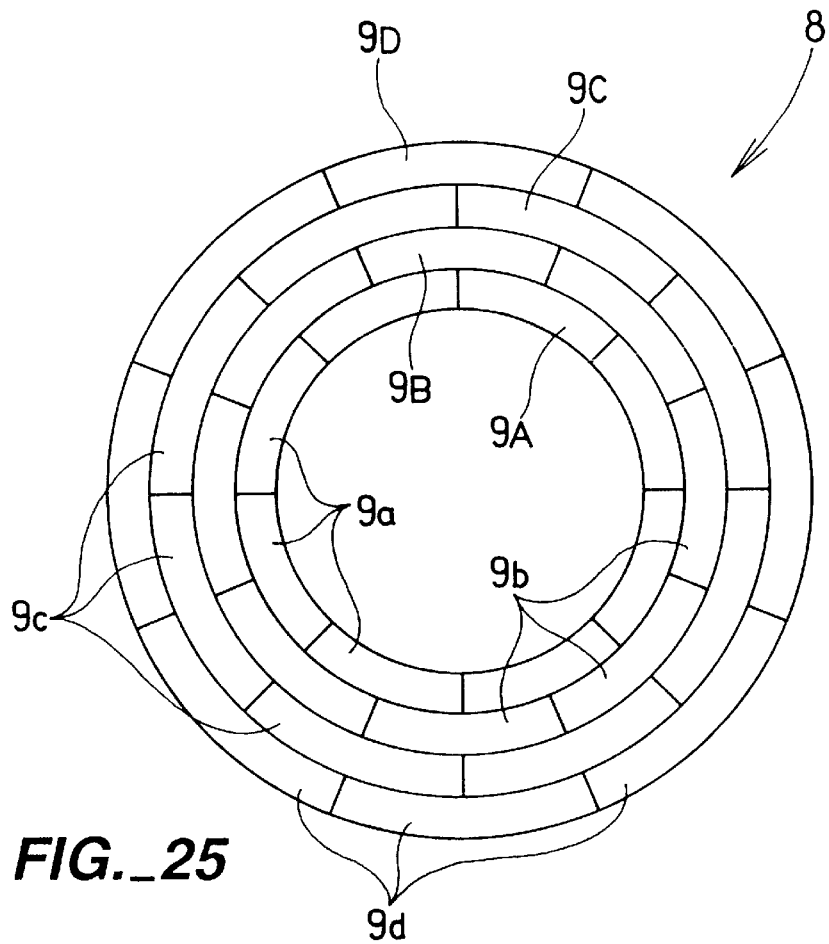
FIG._25
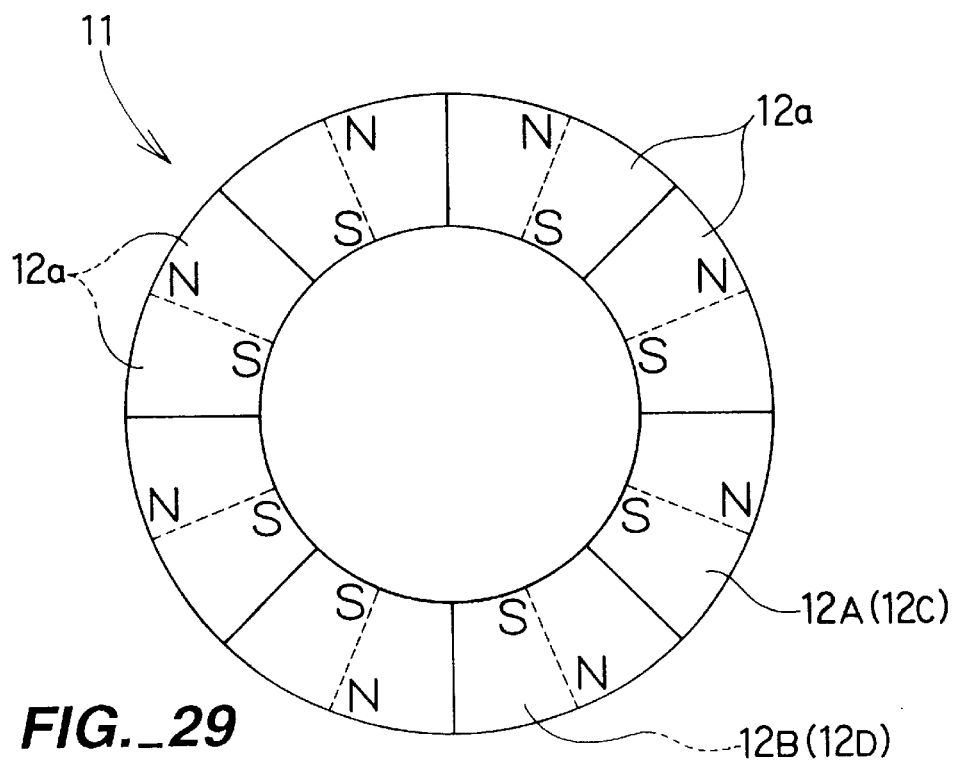
FIG._29

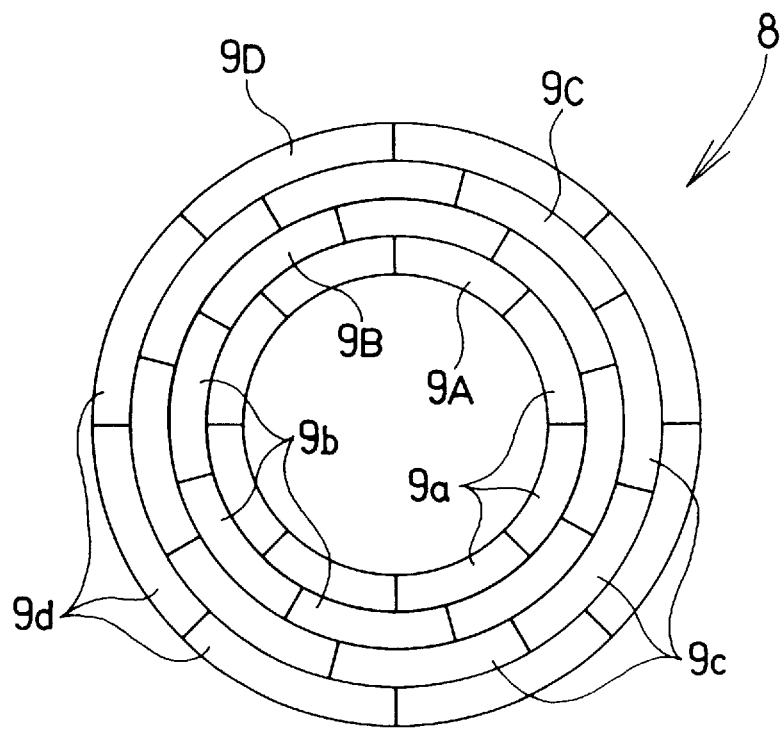
FIG._26
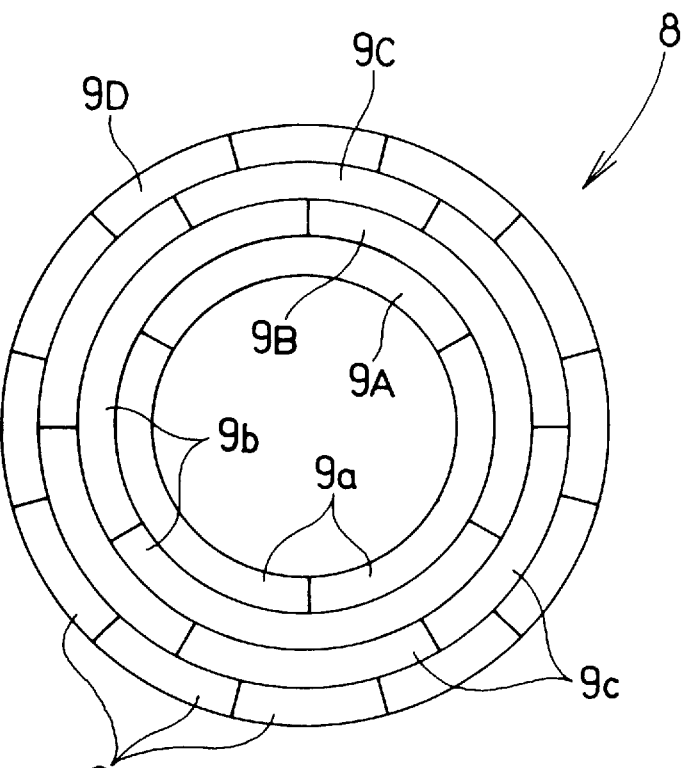
FIG._27

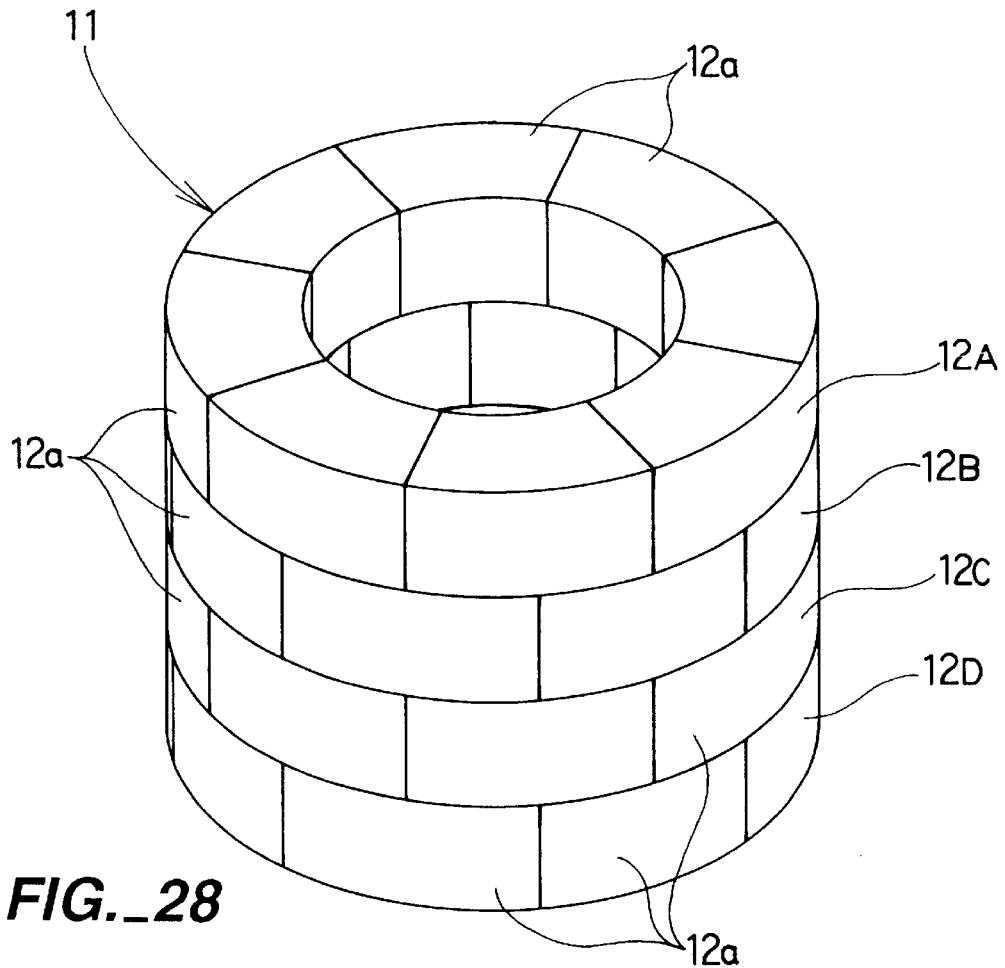
FIG._28
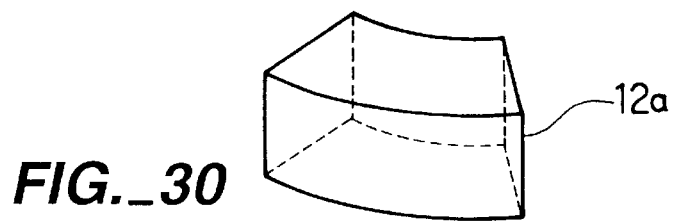
FIG._30

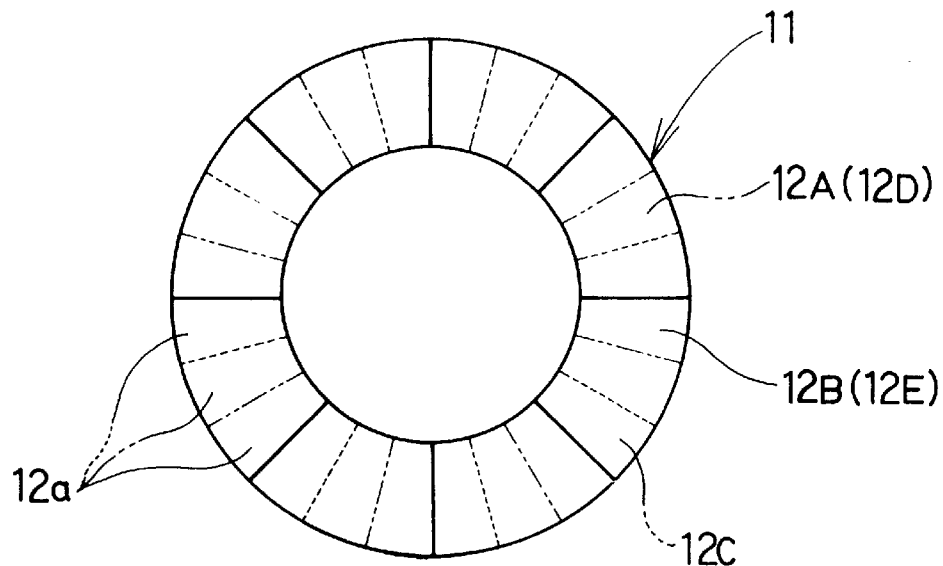
FIG._31A
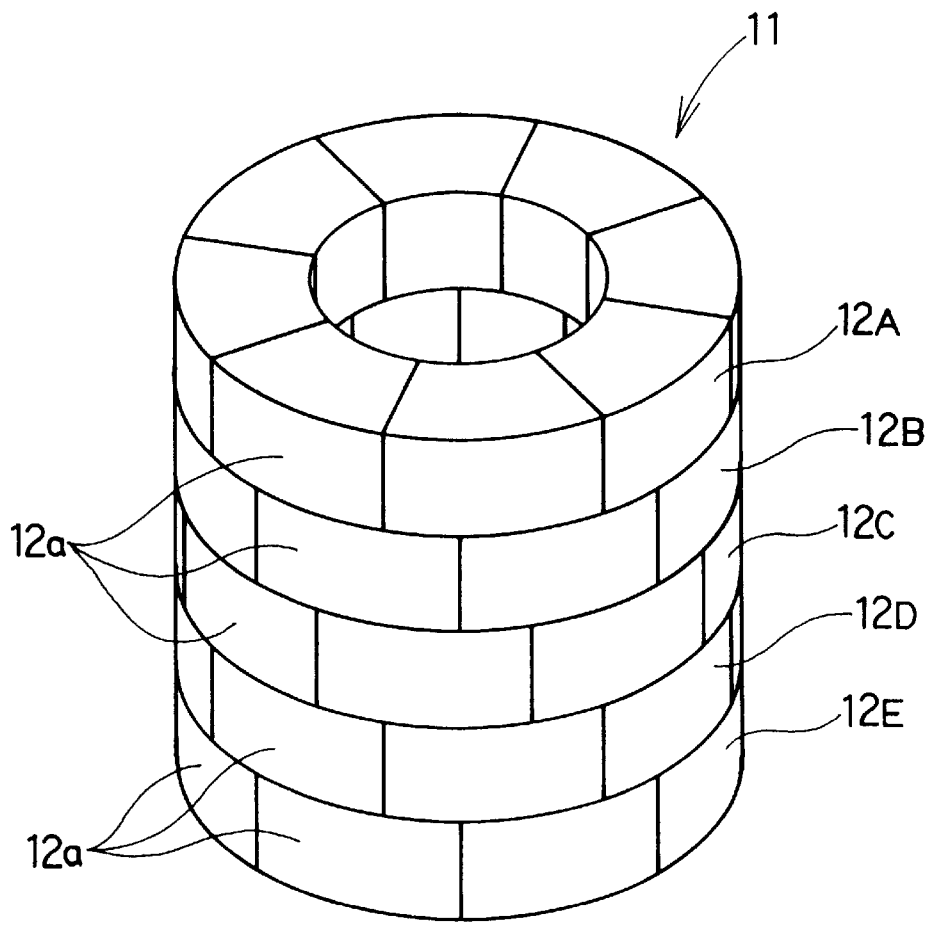
FIG._31B

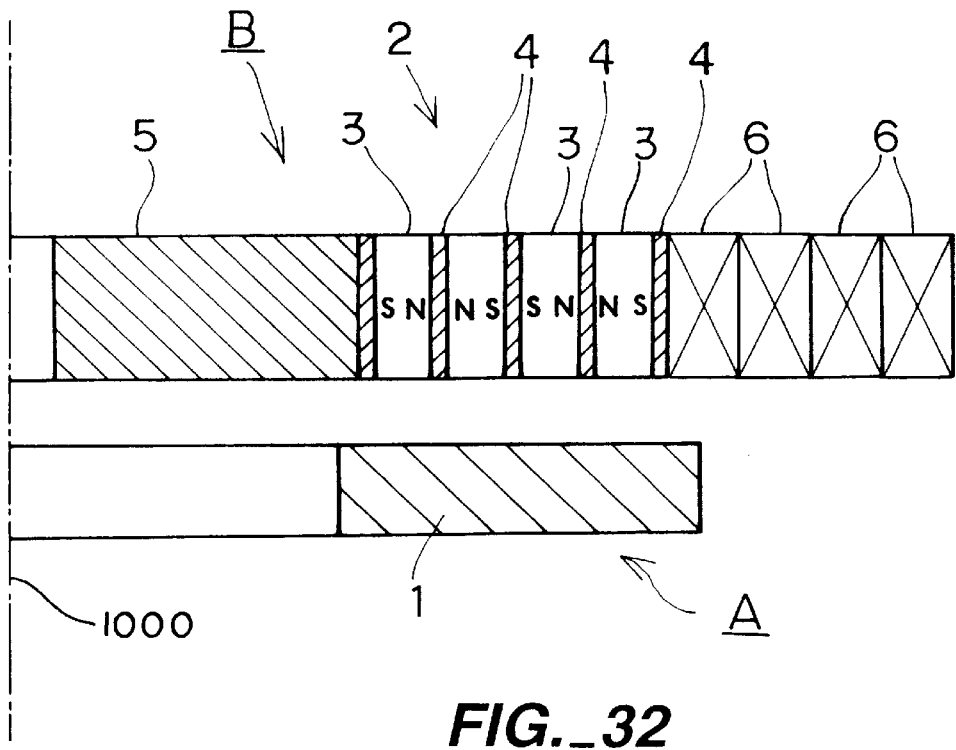
FIG._32
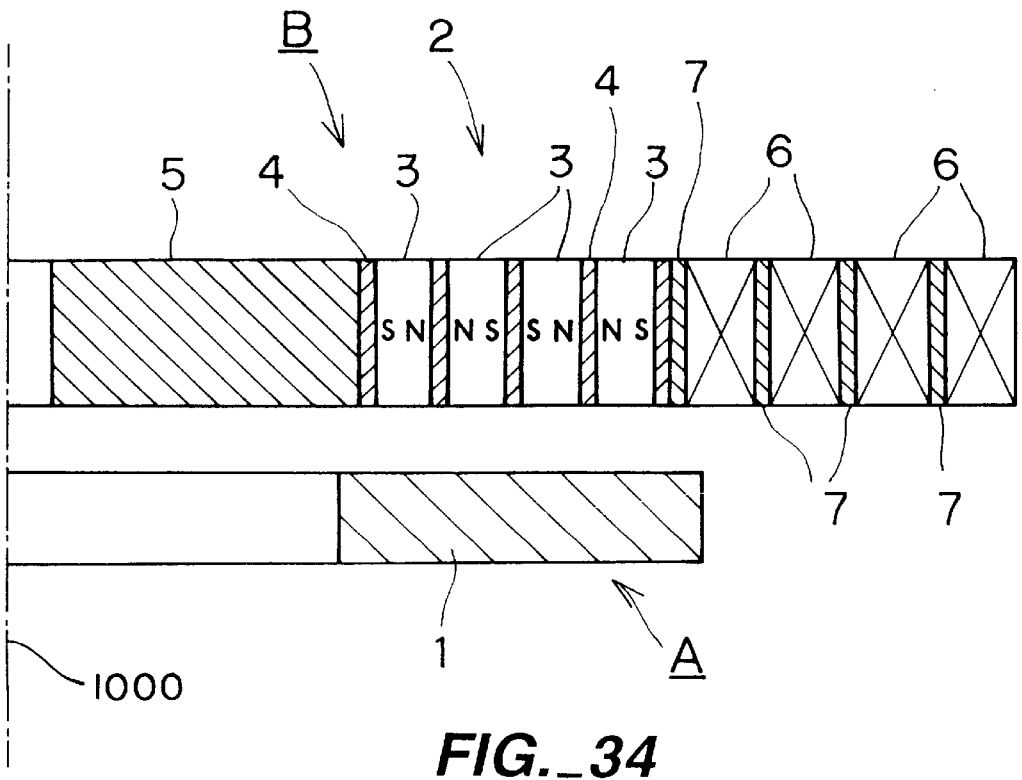
FIG._34

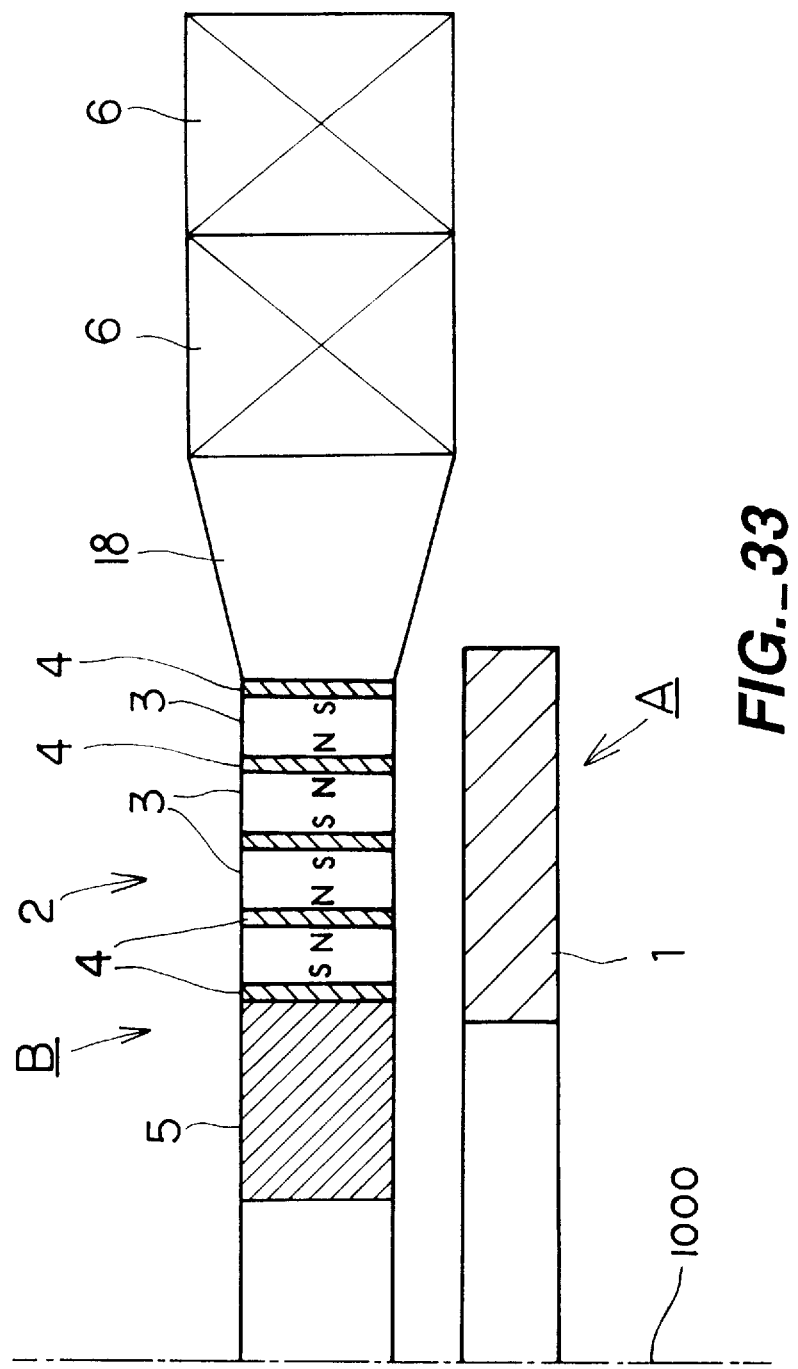
FIG._33

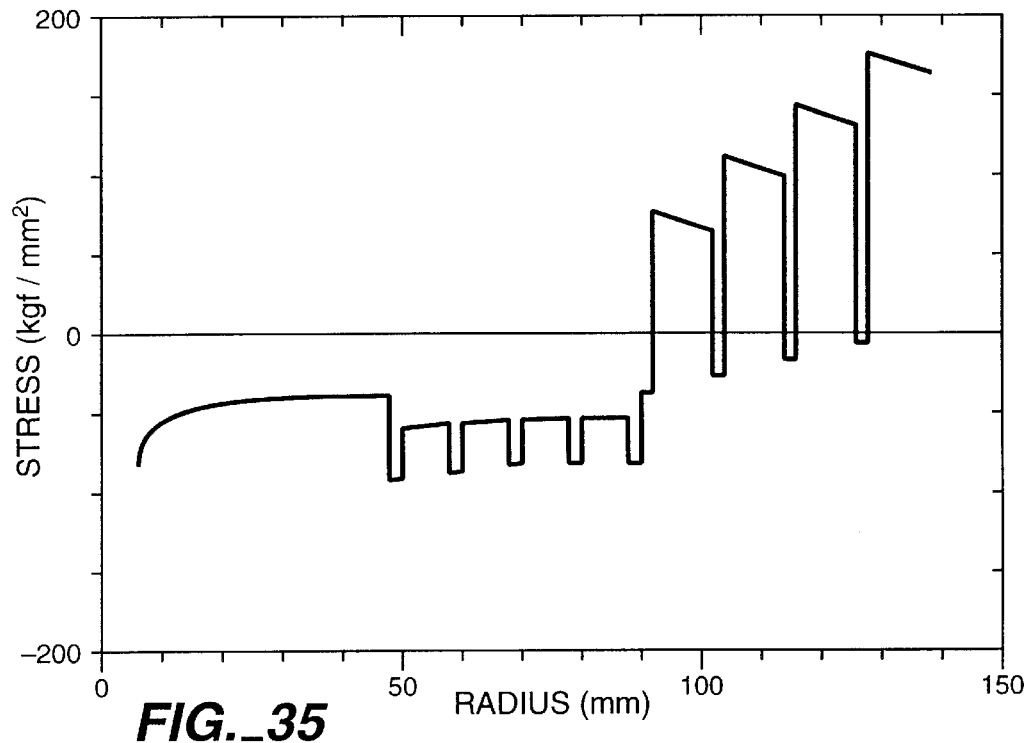
FIG._35
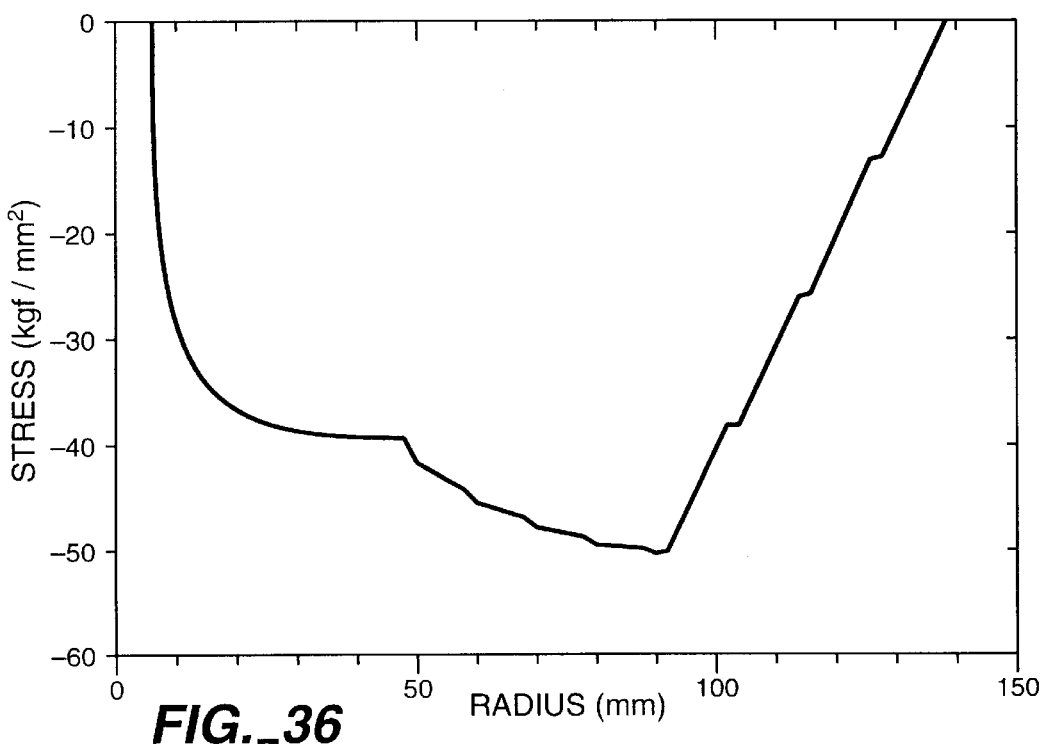
FIG._36

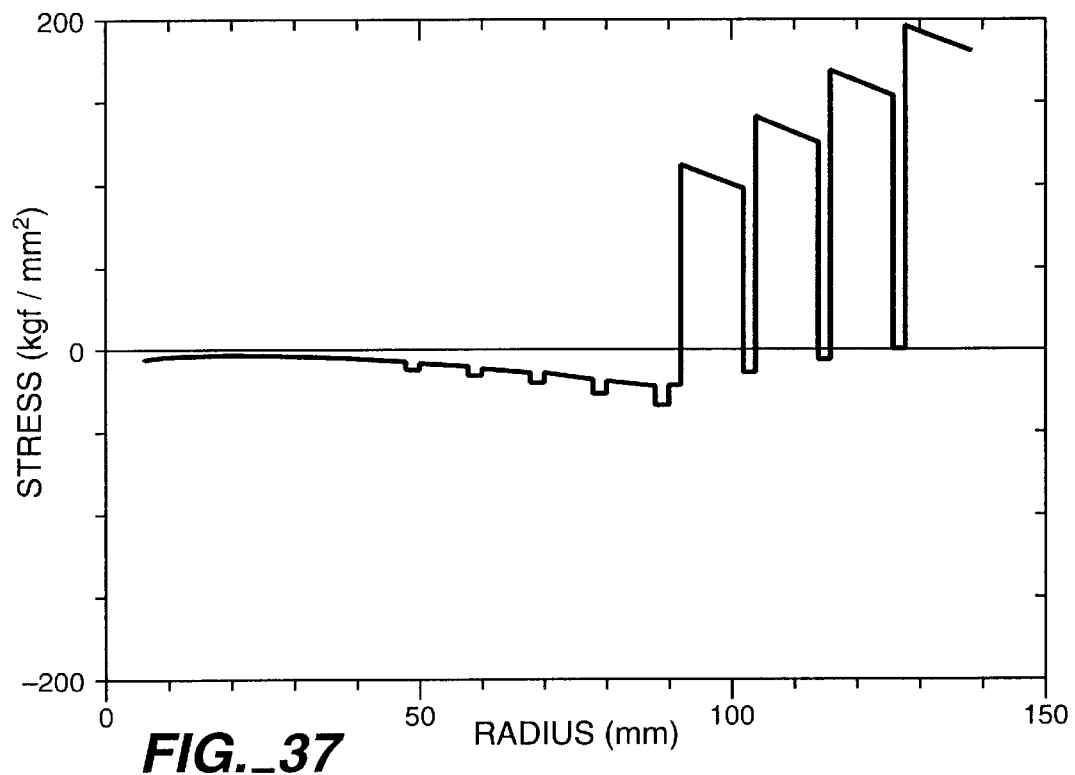
FIG._37
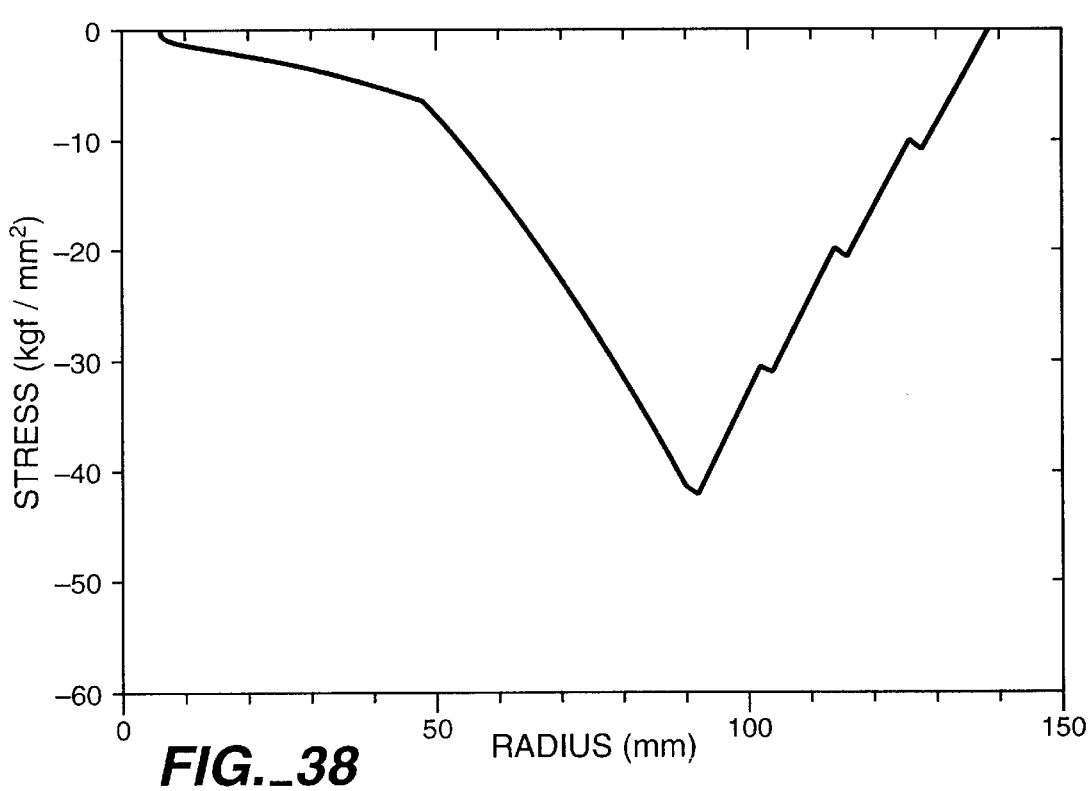
FIG._38

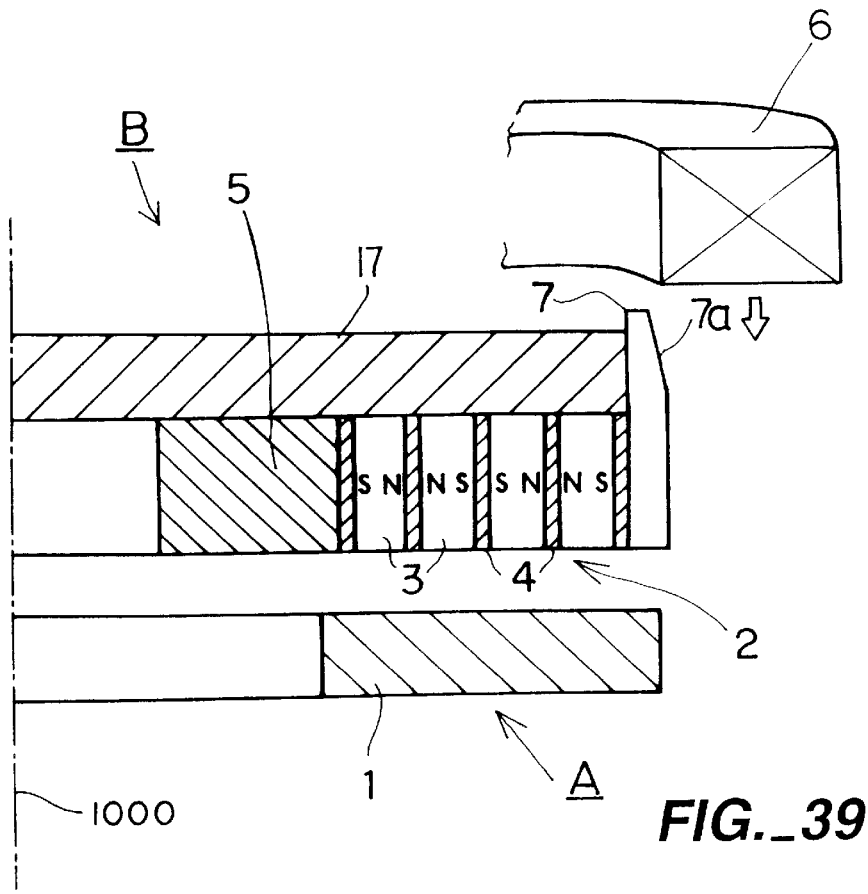
FIG._39
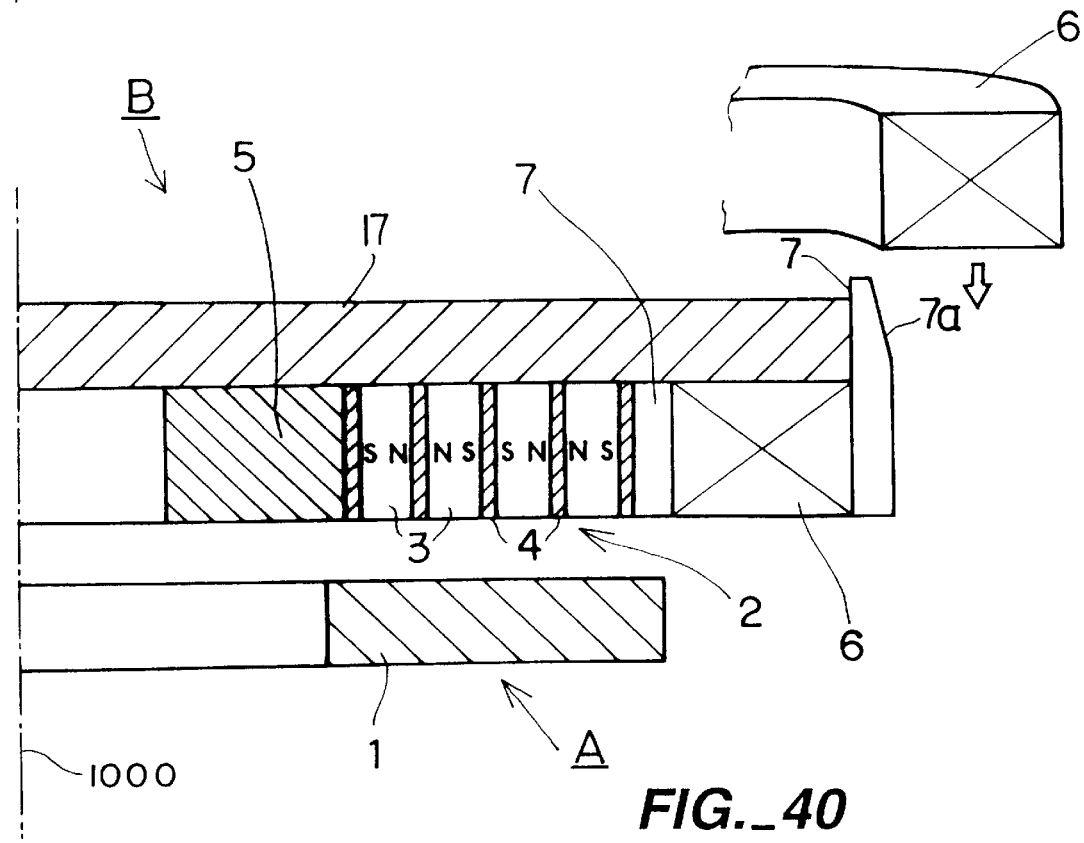
FIG._40

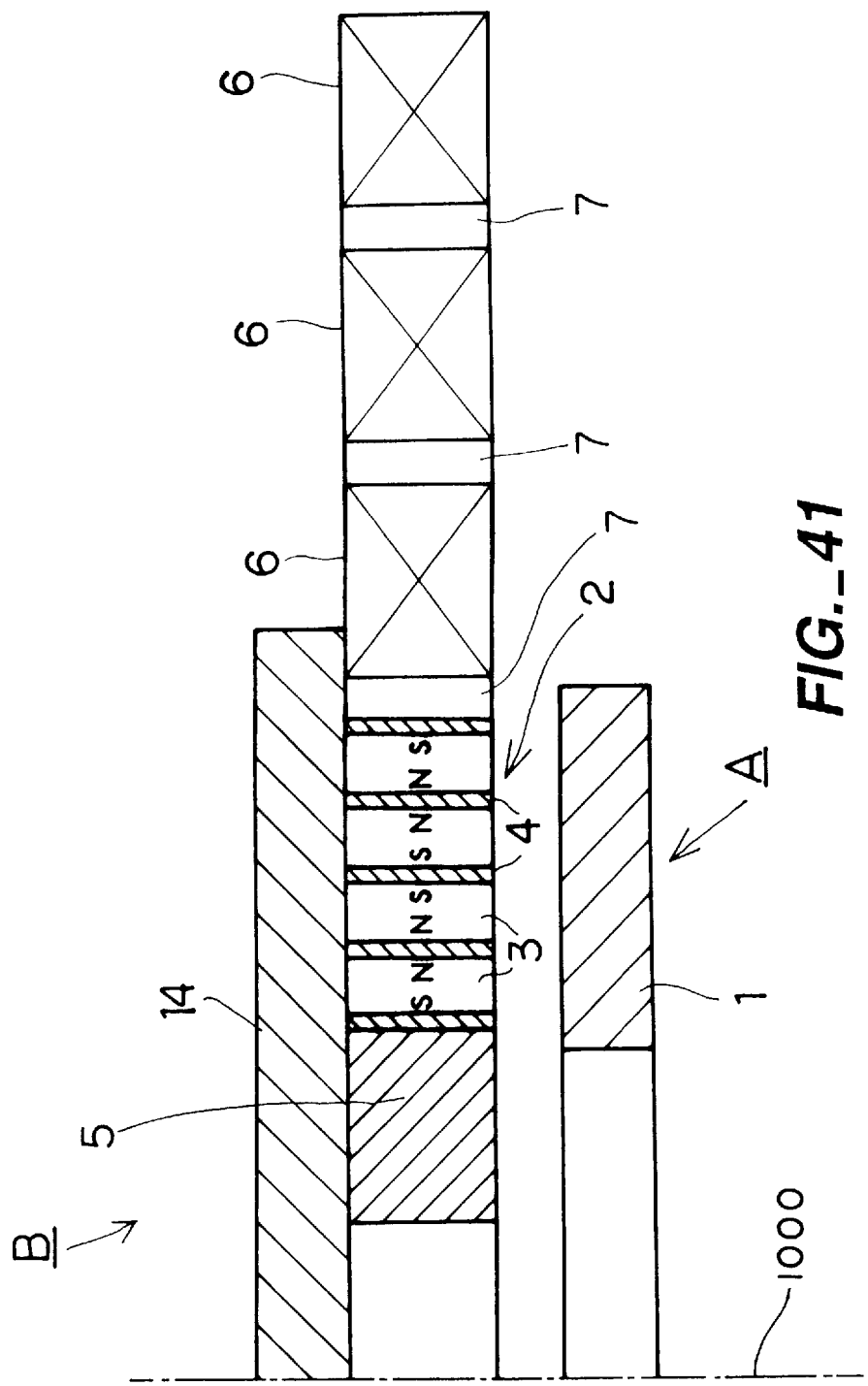

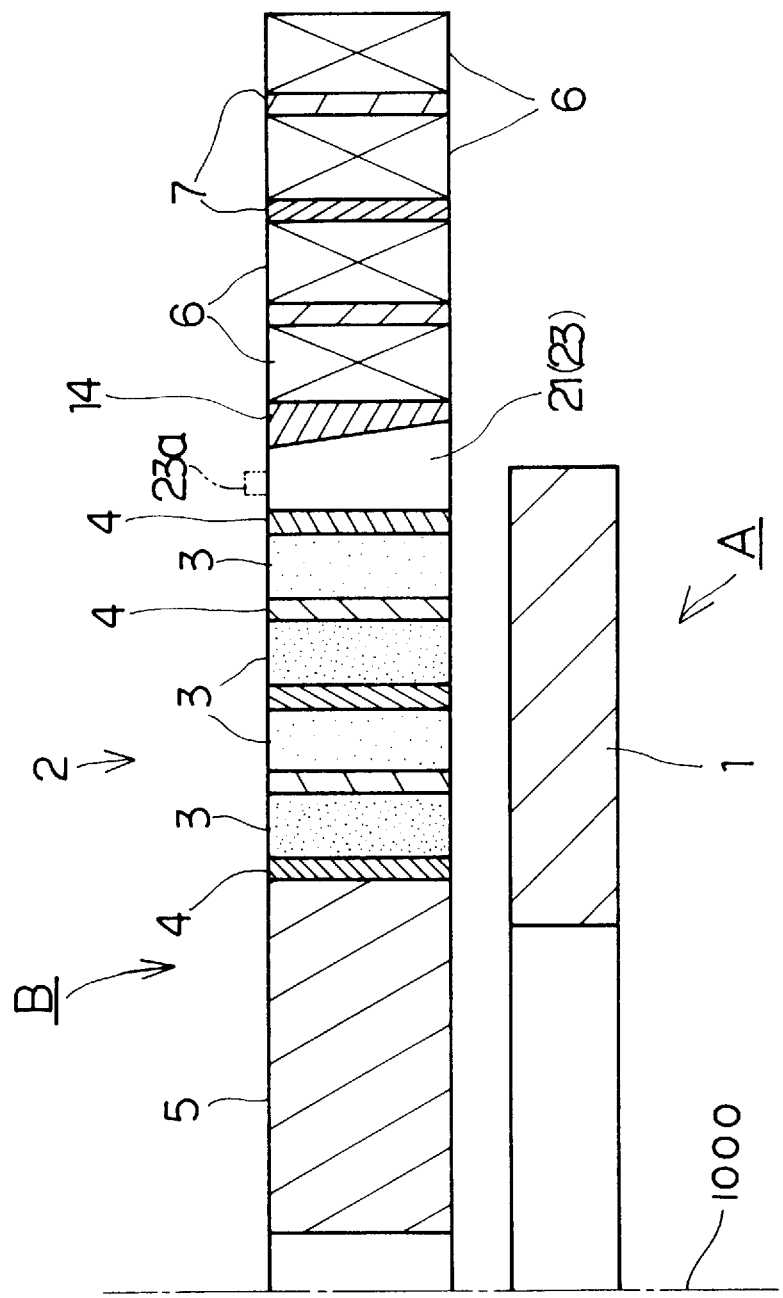
FIG._42

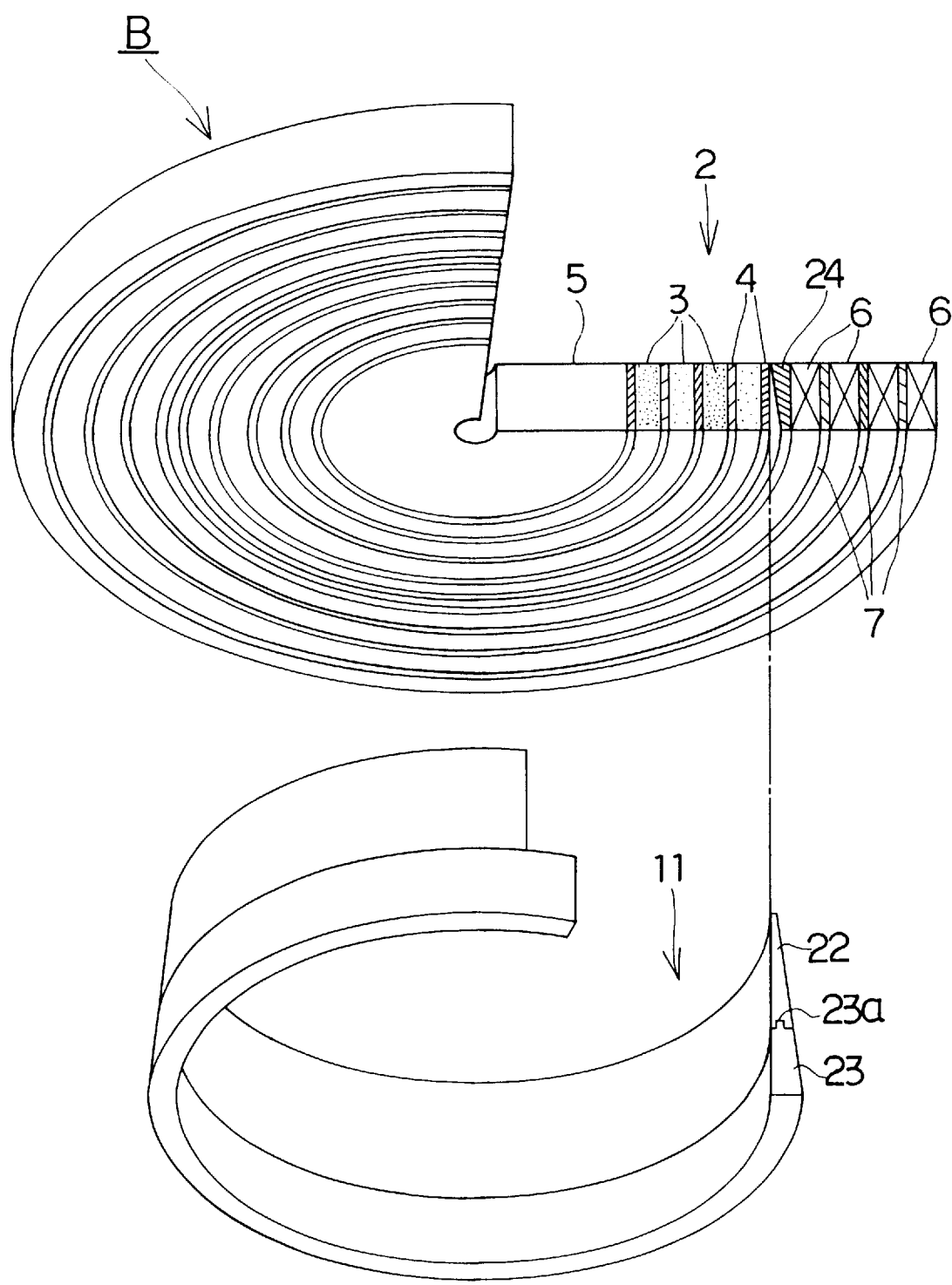
FIG._43

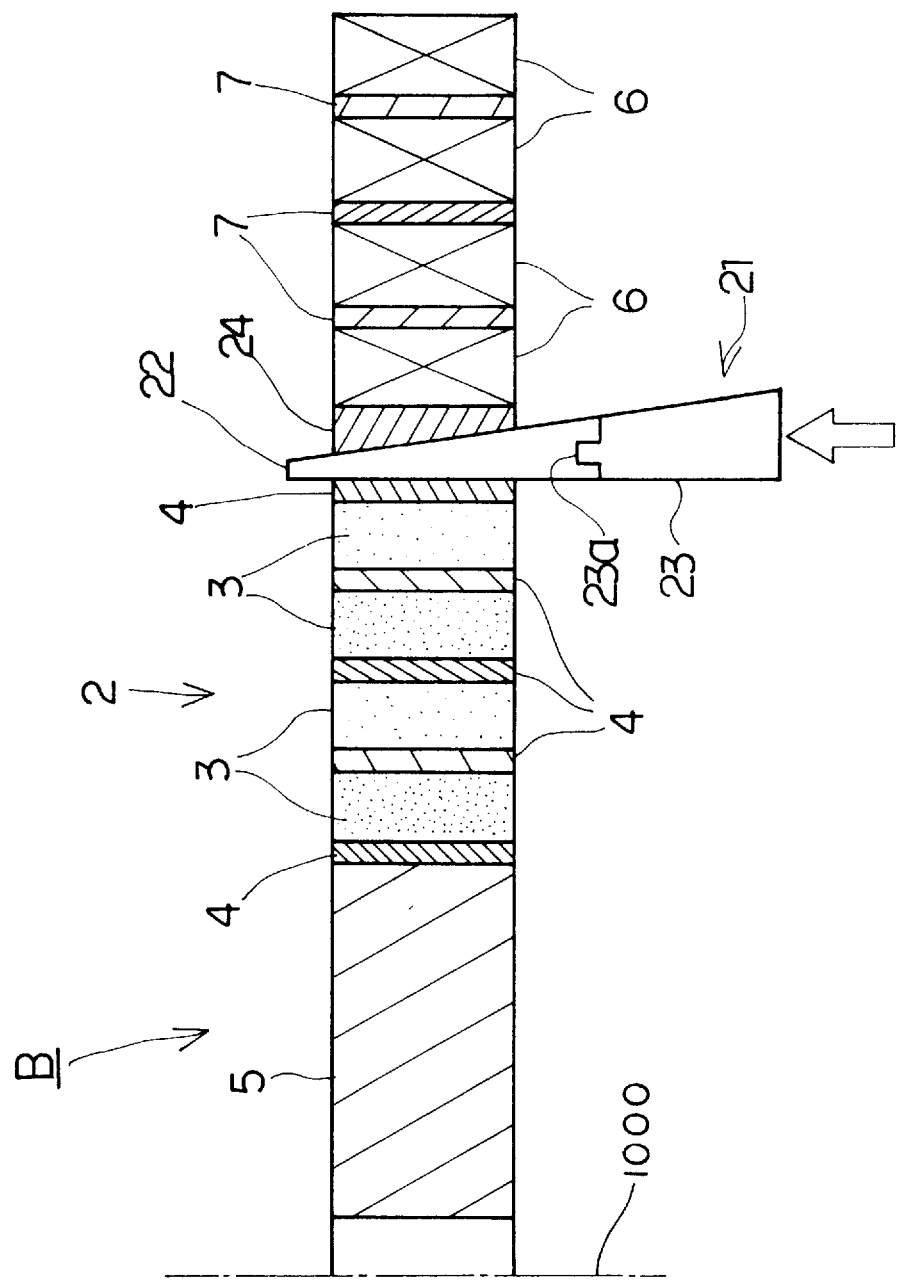
FIG._44

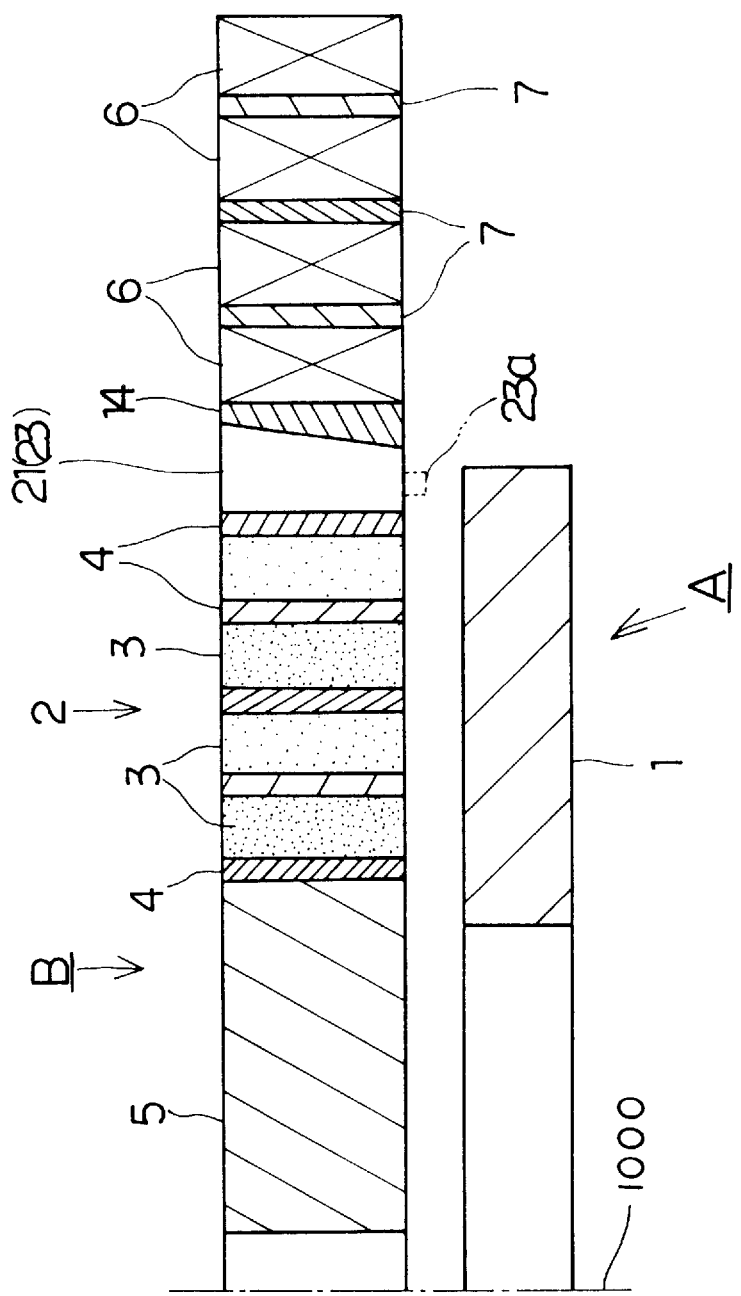
FIG._45

ABSTRACT
SUPERCONDUCTING BEARING DEVICE

BACKGROUND OF THE INVENTION

1. Field of the Invention

This invention relates generally to tandem superconducting magnetic bearing structures, and is particularly concerned with improvements related to the rotating magnetic plates used to repel, support, and permit almost frictionless rotation in a bearing load against opposing superconductors.

2. Description of the Related Art

Recently, various superconducting magnetic bearing devices having a high efficiency and high-speed operability have been developed, which have a magnetic repulsive circuit formed by opposing plates of permanent magnets and superconductors separated by one or more spaces. These devices leverage the clearance holding power for the magnetic circuit in a superconducting state to permit nearly friction-free movement in a manner parallel to the opposing magnet superconductor plates.

For example, such superconducting magnetic devices, used for bearing applications, have been disclosed in Laid-Open Japanese Patent Application Hei4-191520. These superconducting bearing devices are generally configured to include a vertical rotor shaft having an annular permanent magnet fixed concentrically thereto. This magnet includes upper and lower surfaces along the axial direction of the rotor magnetized into opposite polarities, one of which rests above or below an opposing annular superconductor member with a given space therebetween in the direction of the axis of rotation. A similar known superconducting bearing device has an annular superconductor member and an annular permanent magnet mutually opposed and positioned to provide a space in a radial direction to improve rigidity radially outwardly, and still another known superconducting bearing device includes a plurality of permanent magnets of the same diameter arranged axially to the rotor, so that adjacent annular permanent magnets are magnetized in opposite directions.

Moreover, it is well-known (See e.g., Laid-Open Japanese Patent Application No. Hei5-180255), that such superconducting devices would be used in large-scale bearing applications. However, simply increasing the size or diameter of the unitary magnet section to increase the frictionless bearing surface area is not commercially feasible because it is not easy to produce a single-body magnet having a large diameter using known magnet construction techniques. Accordingly, the annular permanent magnet described above is composed of many smaller commercially realizable magnets in which adjacent annular permanent magnets are magnetized in opposite polarities. The resulting magnetic fluxes generated from these smaller magnets are mutually repulsed so as to be intensely concentrated, a magnetic field strength from the magnet section to the superconductor is improved, along with the magnetic levitating force and structural rigidity of the bearing over a unitary magnet structure.

Moreover, it has been disclosed in Japanese Laid Open Patent Application No. Hei6-81845, that magnetic field strength can be improved in a composite annular magnet structure by introducing a soft magnetic yoke disposed between concentric annular permanent magnets. The soft magnetic yoke intensely concentrates the magnetic flux directed from each magnet and directs it to the opposing superconductor. Moreover, when constructing a multilayered ring-shaped magnet section by alternating annular permanent magnets and soft magnetic yokes arranged in a concentric manner, bearing strength and rigidity approaching a theoretical unitary magnet of similar size can be obtained by reducing the inner diameter of each soft magnetic yoke to where it is slightly smaller than the outer diameter of the preceding magnet and force fitting the yoke to the magnet's outer periphery.

For such superconducting bearing devices, a Pr—Fe—B—Cu-based permanent, magnet produced by a hot processing method or an Nd—Fe—B-based sintered magnet is generally used. And, such magnets are known to have a relatively high compression strength and a low tensile strength. Specifically, the former has a tensile strength of up to 24 Kg/mm2, and the latter has a tensile strength of up to 8 Kg/mm2. Accordingly, when the yoke is forced to be fitted to the outside of the magnet as discussed hereinabove, the magnet or yoke may be damaged unexpectedly. Particularly, when the bearing device is made large to increase its mounting force, the magnet section tends to have its outer radius increased, and due to the increase in diameter, a stress is locally concentrated on each part. Therefore, it is particularly necessary to prevent the members from being degraded in quality and damaged. Moreover, since the rotor or shaft is spun at a high speed when the bearing device is operated, it is desired that each member has dimensions as designed so that rotation can be made in a good balance. However, it is not easy to control the production of such members and has a disadvantage of involving an increase in cost. Furthermore, even when the members are produced as expected, a desired operating performance may not be attained unless the assembling is made with sufficient precision.

And, since the magnet section is configured by alternately disposing the annular magnets and the yokes in the multilayered structure, each magnet and each yoke are connected by a tightening force which is applied to the joint faces from the adjacent members. And, since this tightening force is mainly supplied by the yoke positioned radially outwardly from the inner annular magnet, an insufficient tightening force may cause an undesirable partial loss of components. Specifically, when the magnet section is mounted on the rotating member, since centrifugal force owing to the rotation is proportional to a radius and to the square of the rotating speed, centrifugal force is increased from the inner to outer peripheries of the rotating magnet component. Particularly, when the bearing device is enlarged to increase its mounting force, the magnet component will be made commensurately larger and its radius increased. When rotated at a constant rate, rapidly increasing centrifugal force is applied to the alternating rings of magnets and yokes as measured from the central rotor to the outer periphery. Therefore, the yoke itself is pulled in a direction to enlarge its inner diameter, and a tightening force tends to be decreased, thereby lowering structural rigidity to the point where the magnetic rings can shift position and disrupt the precise gap maintained between them and the opposing superconductor. Such magnetic ring movement can be curtailed by using other materials to strengthen and supplement the retaining strength of the interposing yoke members, but doing so reduces the magnetic field transfer properties of the yoke, and may even produce undesirable magnetically "dead" spots within the magnet member.

Alternatively, constructing a single-body annular magnet may be feasible in small-scale bearing device applications, but in the case of a large bearing device, difficulties in production and creating adequate field magnification using known fabrication techniques are increased beyond their practical utilization in all but the most cost insulative requirements. Specifically, to configure a large bearing device, it is necessary to produce a single-body annular permanent magnet having a large diameter. Generally known powerful magnets having a high energy product; include a rare earth magnet, and an Nd—Fe—B magnet is known as the most powerful rare earth magnet. But, since this magnet is produced by a sintering method, a large molding machine and a high pressure are required as its size is increased. Therefore, commercial production of a single-body annular permanent magnet is currently limited up to a diameter of about 100 mm.

Also, since a Pr magnet (Pr—Fe—B—Cu) is produced by a hot rolling method, an annular permanent magnet having a diameter of 100 mm or more can be formed into one body. But, when an annular permanent magnet having a large diameter is produced, it cannot be easily mounted on a prescribed position because of its inherently high magnetic power and unwieldy form. Further, to mount an annular permanent magnet having a large diameter employing a circumferential yoke member, magnetic performance per unit area is deteriorated due to an internal break of the magnet caused by the mechanical energy generated when magnetized, and the yoke may be broken, making it highly susceptible to rotational displacement and failure In view of the above, it has been proposed in the art to connect a plurality of fan-shaped magnet pieces circumferentially to form a single-body annular permanent magnet. But, such an annular permanent magnet exhibits nonuniformities in magnetic flux due to inherent flux density variations among each magnet piece. The uniformity in magnetic field in the rotating direction is deteriorated at the junctions between the magnet pieces to produce the nonuniformity in magnetic flux. When these junctions are aligned, the nonuniformity in magnetic flux cumulates, thereby causing an increase in the rotating energy loss of the bearing device. Even when the annular permanent magnet is actually coalesced into one body, the nonuniformity in magnetic flux may still be present due to imperfections introduced by known production techniques. In either case, it is known that the nonuniformity in magnetic flux will increase proportional to the diameter of the permanent magnet.

Further, since a superconducting bearing device may easily leverage the pinning effect of the permanent magnet and the superconductor to produce a high loading force, a frequent application of such devices is to rotate a heavy member such as a flywheel at high rotational velocity. Thus, superconducting bearing devices are considered useful in electric power storage applications in which electric power is stored as the motion energy of the flywheel. Accordingly, the ideal power storage superconducting bearing device is required to have a mechanical strength resistant to high-speed rotational degradation and which minimizes rotational loss, yet provide a sufficient loading force (levitating force) to support a heavy power storage member.

When rotating, a force applied to the magnet is proportional to a radius and to the square of a rotating speed, so that when the rotating section includes a ring or annular magnet, it is necessary to improve the mechanical strength of the magnet to improve the rotating strength. But, simple improvement of internal material strength is not sufficient to impart adequate structural rigidity, and so it becomes necessary to includes external reinforcing members. Specifically, since the rotation of a rotor at a high speed applies high centrifugal force to the magnet, an iron member is conventionally used to make a frame for housing the magnet to provide a reinforcing structure to protect the magnet from centrifugal force when rotating.

However, even when such a reinforcing structure is disposed, this reinforcing member is exposed to the centrifugal force when rotating and pulled in the centrifugal direction. Thus, when rotating at a particularly high speed, even this type of reinforcing member may not be able to sufficiently protect the magnet from being broken due to centrifugal force.

As described above, when the magnet for the superconducting bearing device includes a Pr—Fe—B—Cu-based permanent magnet produced by a hot processing method, its tensile strength is limited up to 24 Kg/mm2, and when it is an Nd—Fe—B-based sintered magnet, its tensile strength is limited up to 8 Kg/mm2. Therefore, even when the aforementioned reinforcing member is included, the magnet component may still be exposed to rotational stress exceeding these tensile strengths in large-scale applications, resulting in potential magnetic breakup and destruction of the bearing power storage device.

By contrast, to increase loading force and ultimately, storage capacity of the bearing apparatus to desirable levels, it is necessary to increase the magnetic field strength of the magnet through increasing the size of the opposed areas of the superconductor and the permanent magnet. To secure such areas, it is necessary to increase the outer diameter of the magnet section. Therefore, it has become quite difficult to balance the competing design criteria required to build a sturdy, but powerful permanent magnet suitable for power storage operations.

OBJECTS OF THE INVENTION

It is, therefore, an object of the present invention, to provide a superconducting bearing device and associated manufacturing method which can facilitate the assembling of a composite magnet whose structure is resistant to displacement of annular permanent magnet and yoke sections at high rotational speeds.

It is also an object of the present invention to provide a superconducting bearing device and manufacturing method therefor which features a modular magnetic section capable of easy upsizing for increasing the magnetic field strength and load capacity, yet decrease the nonuniformity in magnetic flux caused by composite magnet designs.

It is yet a further object of the present invention to provide a power storage superconducting bearing device and manufacturing method therefor in which the mechanical strength of a magnet rotated at a high speed can be improved even when the external size of an annular permanent magnet is increased and high loading force is experienced.

SUMMARY OF THE INVENTION

In accordance with these and related objects, the present invention relates to a superconducting bearing device which comprises a superconductor mounted on a stationary member and a plate-like magnet component mountable on a rotating member wherein the superconductor and the magnet component oppose each other at a precise gap when the superconducting member is in a superconductive electromagnetic state. At a minimum, this plate or disk magnet section comprises a plurality of smaller, commercially replicable annular permanent magnets arranged concentrically with respect to a central rotational axis.

More specifically, according to the first preferred embodiment of the present invention, the magnet section comprises at least one soft .magnetic-yoke interposing a plurality of concentrically-arranged annular permanent magnets. Each yoke, along with the corresponding permanent magnet surfaces are either curved or slanted with respect to the central axis of rotation in a manner to minimize relative displacement which would impact the precisely-maintained magnet section superconductor gap during high speed rotation (exceeding 10,000 RPM), as well as lend overall rigidity to the magnet section itself. For example, in a vertical superconductive bearing application, a rotating magnet section may take the general form of a circular plate hovering above an activated superconductor. In this case, the magnet section will preferably include concentric rings of permanent magnets spaced-apart by one or more interposing soft magnetic yoke rings to form a composite magnetic "plate".

According to the first preferred embodiment, a cross-section of this magnetic plate example would reveal that the contact surfaces between each permanent magnet and its respective adjacent soft magnetic yoke(s) is curved or slanted with respect to the plate's vertical axis of rotation. More specifically, in the case of curved contact surfaces, the outer radial joint surface of each permanent magnet may be curved convex to the vertical rotational axis to engage the corresponding concave radial joint surface of its circumferentially larger adjacent yoke. Conversely, the inner radial joint surface of each permanent magnet may be curved concave relative to the plate's vertical rotational axis to receive the corresponding convex radial joint surface of its circumferentially smaller adjacent yoke. In so doing, the alternating magnet and yoke rings comprising the magnetic plate section interlock with concave surfaces securing corresponding concave sections to prevent vertical displacement thereof.

According to the first preferred embodiment, to form a magnetic section where the joint surfaces between magnet and yoke rings are curved or bowed, the following manufacturing procedure is followed. Specifically, an external force is applied to an annular yoke to elastically deform it in the shape of an oval, an inner magnet is fitted in the major axis part of the oval-shaped yoke, and an outer magnet is fitted to the outside of the minor axis part. And, the applied external force is removed to return the yoke to have its normal shape, with the major and minor axes of the yoke in the oval shape as the center of rotation, the corresponding inner and outer members are rotated to meet the yoke end faces with the end faces of respective members on the same level to complete assembling. In this case, since the yokes are always intermediated, a pressing force and a tensile force which are applied to the magnets when assembling are reduced by elastically deforming the yokes, so that any unexpected damage to the magnets can be prevented. Further, with the three completely assembled annular members handled as if a single magnet assembly, this procedure may be repeated to internally and externally add additional magnets to this base magnet-yoke, thereby permitting assemblage of a desired number of sets of yokes and magnets on the inner and outer sides of the original yoke assembly as required. Also, each magnet and yoke member may be disassembled only by following the above procedure in reverse, namely by rotating with a given axis as the center. Thus, each yoke or magnet member can be prevented from being inadvertently displaced in the axial direction when rotating.

Alternatively, according to the first preferred embodiment, the respective joint surfaces may be slanted oblique to central axis of rotation. In the case of the vertical superconducting bearing example discussed hereinabove, these surfaces will preferably be slanted radially inwardly relative to the central rotational axis and along the magnet-yoke insertion direction. This arrangement permits, when the press-fitting degree of the yoke in the axial (vertical) direction is adjusted during assembly, the required force for tightening the magnet on the inner peripheral side by an occluding yoke in a radial direction can be adjusted optimally. Specifically, this slanted magnet-and-yoke multiple ring structure can optimally adjust the stress condition of each joint face during assembly. Therefore, since the deviation in external dimensional precision of the annular permanent magnets and the soft magnetic yokes can be accommodated by adjusting the tightening allowance by means of the soft magnetic yoke, the allowable dimensional errors of the annular permanent magnets and soft magnetic yokes are increased, facilitating production control and reducing production cost.

Moreover, when the insertion side of the magnetic segment forms the bearing surface and the alternating magnet-yoke rings are inserted in a radial outward manner, as in the case of the first preferred embodiment, previously inserted magnet and yoke rings are retained by its immediate adjacent neighbor to prevent further movement in the insertion direction. And, the bearing weight, when applied to the magnetic section, prevents the assembled rings from "backing out" to secure them from axial displacement during rotation and thereby prevent disruption of the precise superconductive gap without external bracing.

Further, according to the second preferred embodiment, the magnet section may alternatively or additionally include a peripheral reinforcement member to compress-fit the alternating concentric yoke and permanent magnet annular members and improve rigidity and implement precise superconductive gap separation between the permanent magnet members and the superconductor at high rotational speeds. Also, the yoke member(s) may actually be lengthened to extend beyond the superconductor opposing surface of the magnet section, with their extending portions optimally shaped to further concentrate the generated magnetic fields and improve loading or bearing force, while lowering detrimental effects of nonuniform magnetic flux densities. Further still, the yoke member may be wedge shaped with the broad face opposing the superconductor to further concentrate the magnetic field generated by the magnet section to improve bearing force at high rotational speeds.

Also, according to the second preferred embodiment, the annular permanent magnet section themselves may be magnetized according to a specific shape or direction (e.g. curved or radial) to project the composite center of magnetism away from the superconductor so to maximize bearing force further still.

Further, according to the second preferred embodiment, the annular permanent magnets of the magnet section may themselves be composed of easily manufacturable arcuate magnet portions connected together to form larger, ring-shaped permanent magnets concentrically arranged in the magnet section. In this case, the junctions between the individual arcuate magnet portions are staggered in the radial and axial directions so as to eliminate or reduce the chance of adjacent magnet junction alignment and dissipate nonuniform magnetic field loss when the magnet section is rotated.

Therefore, according to the second preferred embodiment of the present invention, the magnetic fluxes from the north poles of the neighboring annular permanent magnets can pass through the annular soft magnetic yokes and return to the south poles of the respective annular permanent magnets. The magnetic fluxes from the respective annular permanent magnets are narrowed down and concentrated by the annular soft magnetic yokes, so that a magnetic flux density acting on the superconductor can be increased substantially. Besides, a ring-shaped reinforcing member mounted on the outer periphery of the annular permanent magnet can prevent a tensile break in the annular permanent magnets due to centrifugal force.

Also, according to the second preferred embodiment of the invention, the annular permanent magnets are process magnetized to curve so that the middle between north and south poles of the magnets is away from the superconductor, or the annular permanent magnets are formed by a plurality of magnets which are slantingly magnetized along the curved direction, so that among a total quantity of magnetic fluxes generated from the respective annular permanent magnets, the quantity directed to the superconductor can be increased.

Also, a single-body magnet section may formed according to the second preferred embodiment by connecting a plurality of annular permanent magnets in the axial direction or by connecting a plurality of annular permanent magnets having a different diameter, each annular permanent magnet is formed by connecting arcuate magnet portions divided in the radial direction, and the respective annular permanent magnets connected as displaced by a certain degree in the circumferential direction, so that the junctions between the magnet pieces forming the each annular permanent magnet are not aligned with those of the neighboring magnet pieces. This enables thereby enabling to reduce an adverse effect of the nonuniformity in magnetic flux due to the junctions of the above connecting structure.

Further still, according to the third preferred embodiment of the present invention, the aforementioned ring-shaped reinforcing member may be used for tightening the annular permanent magnets in the radial and circumferential directions and is mounted on the outer periphery of the annular permanent magnets. Preferably, the reinforcing member is made of a material having a smaller specific gravity and a higher tensile break strength than the annular permanent magnets, and the compressive forces by the reinforcing member in the radial and circumferential directions of the annular permanent magnets are smaller than the compressive break stress of the magnets when the magnet section is not rotating.

According to the third preferred embodiment, an ideal reinforcing member material is carbon fiber reinforced plastic (CFRP), and can be wound around the annular permanent magnets while compressing them to form a ring-shaped reinforcing member on the outer periphery of the magnet section. More particularly, the concentric permanent magnet (and potential yoke members) may pressure fitted as described hereinabove to form the operable part of the magnet section of the bearing apparatus.

The third embodiment (5 of the third embodiment) of the invention relates to a method for producing a superconducting bearing device which comprises a superconductor to be mounted on a stationary member and a magnet section to be mounted on a rotating member, the superconductor and the magnet section being disposed to oppose each other with a gap therebetween, wherein a ring-shaped reinforcing member made of carbon fiber reinforced plastic (CFRP) is disposed on the outer periphery of the annular permanent magnets. The compressive force applied to the annular permanent magnets by the reinforcing member should be smaller than the compressive break stress of the magnets when the rotating member is not rotating. Also, the tensile break stress, which breaks the magnets when the reinforcing member is not disposed when the rotating member is rotating, is previously determined, and the specific gravity and tensile break strength of the reinforcing member are selected so that a centrifugal tensile force smaller than the tensile break stress is applied to the magnets by virtue of the presence of the reinforcing member. Since the reinforcing member is spun in fiber form onto the magnet section, it is easy to control such factors. Accordingly, the mechanical strength of the magnets against the rotation at a high speed can be improved even when the annular permanent magnet is given a large outer shape. As a result, a superconducting bearing device having a high loading force can be obtained.

Further still, according to the fourth embodiment of the present invention, a reinforced magnet section may additionally include a magnetically neutral wedge ring to impart greater force in compressing the annular permanent magnets in the radial and circumferential directions. Preferably, this wedge ring is positioned adjacent the inner periphery of the retaining member to optimally complement the retaining member in compressing the magnet sections to avoid axial magnet displacement at high rotational speeds.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a vertical cross sectional view of an electric power storage system according to the present invention;

FIG. 2 is an exploded perspective view, partially in vertical section showing the active bearing portions of a superconducting bearing device according to a first specific example of the first embodiment of the present invention;

FIG. 3 is an enlarged vertical sectional view of the active bearing portions shown in FIG. 2;

FIGS. 4A and 4B illustrate the initiation of assembling a yoke and an annular permanent magnet for the magnet section for the first example of the first preferred embodiment of the present invention shown in FIG. 2;

FIG. 5 is a perspective view showing the magnet section for the first example of the first preferred embodiment of the present invention shown in FIG. 2 during assembly;

FIG. 6 is a plan view showing the magnet section for the first example of the first preferred embodiment of the present invention shown in FIG. 2 as assembled;

FIG. 7 is an exploded perspective view, partially in vertical section showing the active bearing portions of a superconducting bearing device according to a second specific example of the first embodiment of the present invention;

FIG. 8 is an enlarged vertical sectional view of the active bearing portions shown in FIG. 7;

FIG. 9 is a perspective view showing the initiation of assembling a yoke and an annular permanent magnet for the magnet section for the second example of the first preferred embodiment of the present invention shown in FIG. 7;

FIG. 10 is an enlarged vertical sectional view showing the assembled magnet section to illustrate the adjustment of a stress by an inner peripheral yoke for the second example of the first preferred embodiment of the present invention shown in FIG. 7;

FIG. 11 is an enlarged vertical sectional view showing the assembled magnet section for the second example of the first preferred embodiment of the present invention shown in FIG. 7 illustrating the adjustment of a stress by an outer peripheral yoke;

FIG. 12 is an enlarged vertical sectional view showing the active bearing portions according to another specific example of the first preferred embodiment of the invention;

FIG. 13 is a vertical sectional view showing the active bearing portions of a superconducting bearing device according to a first specific example of the second preferred embodiment of the invention;

FIG. 14 is a vertical sectional view showing the active bearing portions of a superconducting bearing device according to a second specific example of the second preferred embodiment of the invention;

FIG. 15 is a vertical sectional view showing the active bearing portions of a superconducting bearing device according to a third specific example of the second preferred embodiment of the invention;

FIG. 16 is a vertical sectional view showing the active bearing portions of a superconducting bearing device according to a fourth specific example of the second preferred embodiment of the invention;

FIG. 17 is a vertical sectional view showing the active bearing portions of a superconducting bearing device according to a fifth specific example of the second preferred embodiment of the invention;

FIG. 18 is a vertical sectional view showing the active bearing portions of a superconducting bearing device according to a sixth specific example of the second preferred embodiment of the invention;

FIG. 19 is a vertical sectional view showing the active bearing portions of a superconducting bearing device according to a seventh specific example of the second preferred embodiment of the invention;

FIG. 20 is a vertical sectional view showing the active bearing portions of a superconducting bearing device according to an eighth specific example of the second preferred embodiment of the invention;

FIG. 21 is a vertical sectional view showing the active bearing portions of a superconducting bearing device according to a ninth specific example of the second preferred embodiment of the invention;

FIG. 22 is a vertical sectional view showing the active bearing portions of a superconducting bearing device according to a tenth specific example of the second embodiment of the invention;

FIG. 23 is a general perspective view showing an annular permanent magnet according to the tenth specific example of the second preferred embodiment shown in FIG. 22;

FIG. 24 is a partial exploded perspective view of discrete arcuate magnets according to the tenth specific example of the second preferred embodiment shown in FIG. 22;

FIG. 25 is a plan view showing the annular permanent magnet according to the tenth specific example of the second preferred embodiment shown in FIG. 22;

FIG. 26 is a plan view showing another annular permanent magnet according to the tenth specific example of the second preferred embodiment shown in FIG. 22;

FIG. 27 is a plan view showing yet another annular permanent magnet according to the tenth specific example of the second preferred embodiment shown in FIG. 22;

FIG. 28 is a general perspective view showing a cylindrical permanent magnet according to an eleventh specific example of the second preferred embodiment of the invention;

FIG. 29 is a plan view showing the cylindrical permanent magnet according to the eleventh specific example of the second preferred embodiment shown in FIG. 28;

FIG. 30 is a perspective view of an individual arcuate magnet portion according to the eleventh specific example of the second preferred embodiment shown in FIG. 28;

FIG. 31A represents a plan view of another cylindrical permanent magnet according to the eleventh specific example of the second preferred embodiment shown in FIG. 28;

FIG. 31B represents a perspective view of the permanent magnet of FIG. 31A;

FIG. 32 is a vertical sectional view showing the active bearing portions of a superconducting bearing device according to a first specific example of the third preferred embodiment of the invention;

FIG. 33 is a vertical sectional view showing the active bearing portions of a superconducting bearing device according to a second specific example of the third preferred embodiment of the invention;

FIG. 34 is a vertical sectional view showing the active bearing portions of a superconducting bearing device according to a third specific example of the third preferred embodiment of the invention;

FIG. 35 is an example stress distribution diagram showing a circumferential stress at each radial position when the rotating member is not rotating;

FIG. 36 is an example stress distribution diagram showing a radial stress at each radial position when the rotating member is not rotating;

FIG. 37 is an example stress distribution diagram showing a circumferential stress at each radial position when the rotating member is rotating at 40,000 rpm;

FIG. 38 is an example stress distribution diagram showing a radial stress at each radial position when the rotating member is rotating at 40,000 rpm;

FIG. 39 is a vertical sectional view showing a partially assembled active bearing portions of a superconducting bearing device according to a fourth specific example of the third preferred embodiment of the invention;

FIGS. 40 and 41 are representative vertical sectional views of the fourth specific example shown in FIG. 39 after assembly;

FIG. 42 is a vertical sectional view showing the active bearing portions of a superconducting bearing device according to a first specific example of the fourth preferred embodiment of the invention;

FIG. 43 is a partly sectionalized exploded schematic perspective view showing a rotating member according to the first example shown in FIG. 42;

FIG. 44 is a vertical sectional view of the first example shown in FIG. 42 depicting a wedge ring forced in between a magnet section and a reinforcing member; and FIG. 45 is a vertical sectional view of the active bearing portions of a superconducting bearing device according to a second specific example of the fourth embodiment of the invention.

DESCRIPTION OF THE PREFERRED EMBODIMENTS

Reference is now made to FIG. 1, which depicts a schematic structural view of an electric power storage system to which a superconducting bearing device of the invention is applied. This electric power storage system has a vacuum vessel 31 which contains a superconductor 1 to be mounted on a stationary member A and a permanent magnet section 2 to be mounted on a rotating member B. The superconductor 1 and the magnet section 2 are disposed to oppose each other with a gap therebetween. The superconductor 1 is housed in a cooling case through which a cooling medium 32 is circulated to cool the cooling case interior to a prescribed temperature for maintaining the superconducting condition. An annular supporting member made of copper or some other metallic material is fixed to the outer periphery of the cooling case. The supporting member has the superconductor 1 embedded in the form of a ring or annulus therein.

The rotating member B has the magnet section 2 fitted to a flywheel 33 made of high tension steel. The rotating member B is rotated in the vacuum vessel 31 which is evacuated into a high vacuum by a vacuum pump (not shown) through a pipe 34 so as to reduce a windage loss as small as possible.

The flywheel 33 is provided with a permanent magnet 35 so as to rotate together, and a generator motor 36 is disposed to face the permanent magnet. The generator motor 36 serves as an uninterruptable power supply, wherein energy is accumulated and supplied. In FIG. 1, reference numeral 37 designates a power converter, shown as a black box since further description of its detailed workings are unnecessary for an ordinary skill in the relevant art to garner a proper understanding of the present invention.

Now, the first embodiment of the invention will be described with reference to the specific example shown in FIG. 2 through FIG. 6.

FIG. 2 is a partly sectional exploded perspective view showing the active bearing components, namely the superconductor 1 and the permanent magnet section 2 of an example superconducting bearing device according to the first preferred embodiment of the present invention, and FIG. 3 is a vertical cross-sectional view of the same. As described above, this superconducting bearing device is provided with the superconductor 1 to be mounted on the stationary member A and the permanent magnet section 2 to be mounted on the rotating member B, and the superconductor 1 and the magnet section 2 are disposed to oppose each other with a precise gap therebetween.

The superconductor 1 has a conventional known structure, and housed in a cooling case which is not shown here. As described above, an annular supporting member made of copper or some other metallic material is fixed to the outer periphery of the cooling case. The supporting member has the superconductor embedded in the form of a ring residing therein. And, within the cooling case, a cooling medium is circulated to cool the cooling case interior to a prescribed temperature for keeping a superconducting condition.

Preferably, the superconductor 1 is formed by uniformly mixing normal conduction particles $Y_5Ba_1Cu_1$ into a yttrium high-temperature superconductor, e.g., a substrate made of $YBa_2Cu_3Ox$, and has a characteristic to restrain the intrusion path of magnetic fluxes generated from annular permanent magnets 3 to be described in more detail hereinbelow. The superconductor 1 has its length in a radial direction (normal to central rotational axis 1000) determined to be longer than a total of radial lengths of the annular permanent magnets 3 from the innermost surface to the outermost surface.

The superconductor 1 is disposed to oppose the annular permanent magnets 3 with a prescribed gap therebetween in the axial direction (parallel to central rotational axis 1000). Specifically, the gap between the superconductor 1 and the annular permanent magnets 3 is determined to allow that a prescribed quantity of magnetic fluxes from the annular permanent magnets 3 penetrates the superconductor 1 and the distributed condition of the penetrated magnetic fluxes does not change even when the rotating member B is rotated.

Turning to FIGS. 2 and 3, the rotating member B preferably consists of a rotor 5 having a hollow central portion to receive a central rotating flywheel shaft (not shown) from above or below. The aforementioned magnet section 2 is fixed to the rotor 5. The magnet section 2 is concentric with the axis 1000 of the rotating member B and has the multiple annular permanent magnets 3 which are mutually magnetized so that the neighboring magnets 3 are repelled in the radial direction, and an annular soft magnetic yoke 4 is disposed between the respective annular permanent magnets 3.

In this specific example, the annular permanent magnets 3 use, e.g., a Pr—Fe—B—Cu-based permanent magnet produced by known hot processing techniques, and the annular soft magnetic yoke 4 is made of soft, malleable iron. In this structure, the magnetic fluxes from the north poles of the annular permanent magnets 3 pass through the annular soft magnetic yoke 4 and return to the south poles of the annular permanent magnets 3. Thus, the magnetic fluxes from the annular permanent magnets 3 are narrowed down and concentrated by their interposing annular soft magnetic yokes 4, so that a magnetic density acting on the superconductor 1 can be increased substantially.

This superconducting magnetic bearing device has its superconductor cooled by the cooling medium which is circulating within the cooling case to keep it within the superconducting state. In the superconducting state, the magnetic fluxes from the annular permanent magnets 3 of the rotating member B penetrate to selectively pass through the normal conduction particles which are uniformly mixed into the superconductor, and a superconductive current passes around the penetrated magnetic fluxes to maintain the intrusion path of the magnetic fluxes constant. Therefore, the rotating member B and the annular permanent magnets 3 fall in a state known as the pinning phenomenon, where they are constrained by the superconductor by the magnetic fluxes. But, the magnets are not restricted by the superconductor from moving in a direction that flux density is not changed, and the annular permanent magnets 3 which are configured by an axially symmetrical magnetic circuit can smoothly rotate without being restricted at all by magnetic interaction with-the superconductor 1.

When the superconducting bearing device has a large bearing and a single-body annular permanent magnet cannot be made, a plurality of permanent magnets are connected to form the annular permanent magnets 3. In this case, the annular permanent magnet 3 and the annular soft magnetic yoke 4 are alternately disposed, the nonuniformity in magnetic flux, which is generated on the joint faces of the magnets forming respective annular permanent magnets 3, can be reduced, enabling to produce a large-scale bearing device.

Reference numeral 6 designates a reinforcing member which is mounted on the outermost end of the magnet section, and serves to prevent the magnet section 2 from being subjected to a tensile break due to centrifugal force caused by high rotational speeds.

Moreover, as shown in FIG. 3, the joint faces of each annular permanent magnet 3 and each soft magnetic yoke 4 take on a curved or spherical shape bowed outwardly from the center of the magnet section 2 and central rotational axis 1000. More specifically, the outer radial joint surface of each permanent magnet 3 may be curved convex to the central rotational axis 1000 to engage the corresponding concave radial joint surface of its circumferentially larger adjacent yoke 4. Conversely, the inner radial joint surface of each permanent magnet 3 may be curved concave relative to the central rotational axis 1000 to receive the corresponding convex radial joint surface of its circumferentially smaller adjacent yoke 4. In so doing, the alternating magnet and yoke rings comprising the magnetic plate section interlock with concave surfaces securing corresponding concave sections to prevent axial displacement thereof.

By assembling from the inner periphery to the outer periphery according to this procedure, the magnet section having a large size can be assembled smoothly. Specifically, referring to FIG. 4, the magnet section 2 of the superconducting bearing device of this specific example is assembled by applying an external force F against the soft magnetic yoke 4 to elastically deform in the shape of an oval, and fitting an annular permanent magnet having the corresponding inner and outer peripheries at right angles with respect to the major and minor axes of the oval yoke 4. In other words, the inner annular permanent magnet 3 is fitted into the major axis section having the maximum inner peripheral distance of the oval-shaped soft magnetic yoke 4, and the outer annular permanent magnet 3 is fitted to cover the minor axis section having the minimum outer peripheral distance of the oval-shaped soft magnetic yoke 4. Then, when the applied external force F is removed to return the soft magnetic yoke 4 to have a normal shape of roundness, the inner and outer annular permanent magnets are fitted at right angles to the yoke 4 as shown in FIG. 5. Then, with the major and minor axes of the yoke 4 in the oval shape as the center of rotation, the corresponding inner and outer annular permanent magnets 3 are rotated to meet their end faces with the end faces of the soft magnetic yoke 4, thus completing the assembling as shown in FIG. 6.

By virtue of the presence of the soft magnetic yoke 4, a pressing force and a tensile force which are applied to the magnets 3 when assembling are reduced by being absorbed by the elastic deformation of the soft magnetic yoke 4, so that any unexpected damage to the magnets 3 can be prevented. Besides, this procedure can be repeated to externally assemble additional soft magnetic yokes 4 and magnets 3 to any desired number of combinations.

As described above, according to the superconducting bearing device of this specific example, for the superconducting bearing device in which the magnet section of the rotating member comprises the plurality of annular permanent magnets 3 placed concentrically around the axis 1000 of the rotating member and the soft magnetic yokes 4 positioned between the annular permanent magnets 3, since the joint faces of each magnet and each yoke are curved, generally following spherical or arcuate surface relative to the center of the magnet section, the soft magnetic yoke and the inner and outer annular permanent magnets can be assembled smoothly by being elastically deformed into an oval shape by applying an external force to the yoke. Furthermore, when this procedure is repeated, namely when the above assembled body is regarded as one annular permanent magnet and another soft magnetic yoke is used, the yoke and the inner and outer magnets can be assembled into a desired number of combinations.

The respective magnets and yoke members can be disassembled only by following the above assembly procedure in reverse order, namely by rotating the magnet and yoke rings using the axis 1000 as the center. Thus, any member can be surely prevented from being removed in the axial direction when rotating in a single plane normal to the central rotating axis 1000.

Now, a second specific example of the first preferred embodiment of the invention will be described with reference to FIGS. 7 through 11 hereinbelow.

FIG. 7 is an exploded cut-a-way schematic perspective view showing the general structure of the active bearing components of a superconducting bearing device according to this specific example, and FIG. 8 is a vertical sectional view of the same. This superconducting bearing device has the same basic structure as the above-described specific example, and is provided with a superconductor 1 mounted on a stationary element A and a permanent magnet section 2 mounted on a rotating member B, and the superconductor 1 and the magnet section 2 are mutually opposed with a gap therebetween.

In this specific example, joint faces of respective annular permanent magnets 3 and soft magnetic yokes 4 positioned between them of the magnet section 2 are formed to have a slanted face in a direction these members 3, 4 are inserted. As shown in FIG. 8, these faces are slanted in a direction to permit ring expansion externally and upwardly. Specifically, the members 3, 4 are vertically fitted along the vertical rotating axis of the bearing device. Thus, when the magnet section 2 is assembled from inside to outside according to the following procedure, the magnet section having a large diameter can be assembled smoothly.

Specifically, description will be made of a procedure for assembling the magnet section 2 of the superconducting bearing device of this specific example. As shown in FIG. 9, a block, which is formed by successively mounting the soft magnetic yoke 4 and the annular permanent magnet 3 on the outer periphery of the innermost member or the rotor 5, is mounted on an assembling jig 13. The assembling jig 13 has its outer radius formed slightly smaller than the outer radius of the block, so that when the yoke 4 is forced to be fitted to the outermost periphery of the block to be described afterward, the block as a whole can be contracted in diameter and deformed.

Then, the annular soft magnetic yoke 4 is forced fitted to the outer periphery of the annular permanent magnet 3 of the block. The yoke 4 prior to the forced fitting has a length in the inserting direction determined to be slightly longer than the thickness of the block. The front and rear ends of the yoke 4 are designed to protrude from the ends of the block when the yoke is mounted on the block. On the process of this mounting, the inner peripheral surface of the soft magnetic yoke 4 has a conical surface to expand upwardly, and the outer peripheral surface of the annular permanent magnet 3 is formed to have a conical surface to fit the inner peripheral surface of the soft magnetic yoke 4. Thus, assembling can be facilitated because the opening of the yoke 4 is expanded when insertion is started and the conical surface having an inclined sectional shape serves as a guide face.

At this time, the adjustment of press-fitting degree of the soft magnetic yoke 4 can optimally adjust a force for compressing the magnet 3 by the yoke 4. Namely, when the yoke 4 is pressed in the direction indicated by arrow Y as shown in FIG. 10, the yoke compressive force is increased. Conversely, when the yoke 4 is positioned in the direction indicated by arrow X as shown in the figure, the yoke compressive force is reduced. Therefore, since the yoke compressive force can be optimally adjusted when assembling, the deviation in external dimensional precision of the annular permanent magnets 3, 3 and the soft magnetic yokes 4, 4 can be accommodated by adjusting the compressive allowance by means of the soft magnetic yoke 4.

And, when the soft magnetic yoke. 4 is mounted with an optimum compression stress provided, the assembling jig 13 is removed, the needless protrusion of the soft magnetic yoke 4 from the end surface of the annular permanent magnet 3 is removed by grinding the surface to make the end surface uniform.

Then, on the outer periphery of the soft magnetic yoke 4 mounted on the annular permanent magnet 3, another annular permanent magnet 3 and another soft magnetic yoke 4 are successively mounted by the same procedure described hereinabove. Namely, as shown in FIG. 10, an annular permanent magnet 3 is mounted on the outer periphery of the soft magnetic yoke 4 which is mounted on the annular permanent magnet 3, another assembling jig 13 having an outer periphery radius slightly smaller than the entire external periphery radius in the state that the annular permanent magnet 3 is mounted is mounted, and another annular soft magnetic yoke 4 is press-fitted to the outer periphery of the annular permanent magnet 3. At the time, in the same way as above, since the inner periphery surface of the soft magnetic yoke 4 is formed in a conical surface having an inclined shape, this conical surface serves as a guide face to facilitate the forced fitting. When the yoke 4 is fixed by the forced fitting so as to have an optimum compression stress, in the same way as above, the protrusion of the soft magnetic yoke 4 is removed along the end faces of the inner combined magnet 3 and yoke 4. Then, another magnet 3 as well as another assembling jig 13 are mounted on the outer periphery, and an additional yoke 4 is press-fitted.

Accordingly, the rotating member B is produced by mounting the magnet section 2 which comprises the multiple sets of the annular permanent magnets 3 and soft magnetic yokes 4 and the reinforcing member 6 which is mounted on the outermost periphery of the magnet section 2 to prevent a tensile breakage from occurring due to centrifugal force when rotating as shown in FIG. 8. In the figure, reference numeral 14 designates a warp-preventing member which is nonmagnetic and has a sufficient strength of rigidity. When a magnetic levitating force from the superconductor 1 is not uniform, this warp-preventing member 14 serves to prevent the annular permanent magnets 3 and the magnet section 2 from warping into a deformed shape.

In this specific example, since the annular permanent magnets and soft magnetic yokes are provided with a conical or slanted surface, fitting can be made with a small compressing allowance by the soft magnetic yokes, and the distribution of compression stress to the magnet on the inner periphery surface can be made uniform. And, when the distribution of compressive force against the magnet is made uniform, the dispersion of compression stress given is eliminated, so that the rotating operation can be prevented from being failed, and the device can be improved in safety and reliability.

In the above specific example, the conical or slanted surfaces for joining the magnet section 2 and the respective members 3, 4 are slanted in a direction to expand externally and upwardly as shown in a sectional view. But, it is to be understood that they may be formed to expand externally and downwardly as shown in FIG. 12. In this case, to assemble the members 3, 4, they are fitted downwardly with respect to the bearing device. And, the rotor 5 at the innermost periphery is firmly fixed to the warp-preventing member 14 with screws 15 to prevent the members 3, 4 from dropping down from the magnet section 2. At the same time, since the magnet section 2 is fixed to the warp-preventing member 14 by the screws 15 fitted in the rotor 5 at the innermost side where centrifugal force is relatively small when rotating, an adverse effect on the screwed connection due to centrifugal force can be prevented.

And, the members 3, 4 may have their joining surfaces combined as desired between the two inclined directions. Specifically, the member on the inner periphery side may be inclined to expand downwardly, and the member on the outer periphery side may be inclined to expand upwardly.

Furthermore, the joint faces of the annular permanent magnets and the soft magnetic yokes have the same inclined angle in this specific example, but may be changed as desired. For example, the inclined angle may be decreased from the inner to outer peripheries. And, these joint faces may be curved, and may be combined as desired.

As described above, according to the specific examples of the first preferred embodiment of the present invention, in the superconducting bearing device in which the magnet section of the rotating member comprises the plurality of annular permanent magnets concentric with the axis of the rotating member and the soft magnetic yoke positioned between the annular permanent magnets, since the joint faces of respective magnets and yokes are formed to have the conical or slanted surface in their inserting directions, when the press-fitting degree of the yoke in the axial direction is adjusted when assembling, a force for compressing the magnet on the inner periphery side by the yoke in a radial direction can be adjusted optimally. Thus, the magnet-and-yoke multiple ring structure can optimally adjust the stress condition of each joint face when assembling. Therefore, since the deviation in external dimensional precision of the annular permanent magnets and the soft magnetic yokes can be accommodated by adjusting the compressing allowance by means of the soft magnetic yoke, the allowable dimensional errors of the annular permanent magnets and soft magnetic yokes are increased, facilitating production control and reducing a production cost.

Since the magnets and yokes of the magnet section can not move in the direction that the yokes are inserted when assembling, when the inserting direction becomes downward when the bearing device is completed, the conical or slanted joint faces of the adjacent members can securely prevent the respective members from coming out downward along the rotating shaft. And, when the inserting direction is determined to be upward, the member at the innermost periphery can be merely fixed firmly to the member positioned above such as the warp-preventing member to prevent respective members, which are positioned toward the outermost periphery, from dropping down, and since the member at the innermost periphery is used for connecting, an adverse effect on this connection due to centrifugal force can be reduced.

In the aforementioned specific examples according to the first preferred embodiment, a Pr—Fe—B—Cu based magnet has been used as a magnet, but the magnet is not so limited as will be apparent to an ordinary skill in the art, and any permanent magnets such as ferrite, Alnico, neodymium-based or samarium-based may be used. Also, the superconductor has been described using the yttrium high-temperature superconductor as an example, but any superconductor containing, for example, rare earth (RE) based elements (e.g. RE-Ba—Cu—O), which can have a restoring force against magnets, may be used. Specifically, the RE component preferably includes one or more elements selected from the group of rare earth elements consisting of Y, Sm, Eu, Gd, Dy, Ho, Er and Yb.

Description will now be made of the second embodiment of the invention.

The first specific example of the second embodiment of the invention will be described with reference to FIG. 13.

FIG. 13 is a vertical sectional view showing the main part of a superconducting bearing device according to this specific example. This superconducting bearing device is provided with a superconductor 1 to be mounted on a stationary member A which is fixed to the device and a permanent magnet section 2 to be mounted on a rotating member B which is fixed to a rotating shaft, and the superconductor 1 and the permanent magnet section 2 are disposed to oppose each other with a prescribed gap therebetween.

The superconductor 1 has a conventional known structure and is housed in a cooling case which is not shown. On the outer periphery of the cooling case, an annular supporting member made of copper or another metallic material is affixed.. And, the supporting member has an annular superconductor embedded in it. The cooling case is also connected to a refrigerating machine (not shown) via a pipe to receive a cooling medium from the refrigerating machine. Thus, the superconductor in the cooling case is cooled by the cooling medium which is circulating within the cooling case at a low temperature that the superconducting condition can be retained.

In the same way as in the aforementioned example, the superconductor 1 is formed by uniformly mixing normal conduction particles $Y_2Ba_1Cu_1$ into a yttrium high-temperature superconductor, e.g., a substrate made of $YBa_2Cu_3Ox$, and has a characteristic to restrain the intrusion path of magnetic fluxes generated from annular permanent magnets 3 of a permanent magnet section 2 to be described hereinbelow. The superconductor 1 has its length in a radial direction determined to be longer than a total of radial lengths from the innermost end to the outermost end of the annular permanent magnets 3 of the magnet section 2 which is opposed to the superconductor 1.

The superconductor 1 is disposed to oppose the annular permanent magnets 3 with a prescribed gap therebetween in the axial direction. Specifically, the gap between the superconductor 1 and the annular permanent magnets 3 is determined to allow that a prescribed quantity of magnetic fluxes from the annular permanent magnets 3 penetrates into the superconductor 1 and the distributed condition of the penetrated magnetic fluxes does not change even when the rotating member B is rotated at high speeds.

The rotating member B consists of a rotor 5 having a hollow central section to receive a rotating flywheel shaft (not shown). The aforementioned magnet section 2 is fixed to the rotor 5. The magnet section 2 is concentric with the central axis 1000 of the rotating member B and has multiple annular permanent magnets 3 which are mutually magnetized so that the neighboring magnets 3 are repelled in the radial direction, and an annular soft magnetic yoke 4 is disposed between the respective annular permanent magnets 3 and at the innermost and outermost peripheries. In this specific example, the annular permanent magnets 3 use, e.g., a Pr—Fe—B—Cu-based permanent magnet produced by a hot processing method, and the annular soft magnetic yoke 4 is made of soft, malleable iron. In this structure, the magnetic fluxes from the north poles of the two annular permanent magnets 3 pass through the annular soft magnetic yokes 4 and return to the south poles of the annular permanent magnets 3. Thus, the magnetic fluxes from the annular permanent magnets 3 are narrowed down and concentrated by the annular soft magnetic yokes 4, so that a magnetic density acting on the superconductor 1 can be increased substantially. When this superconducting magnetic bearing device is operating, its superconductor 1 is cooled by the cooling medium circulating within the cooling case to keep it in the superconducting state. In the superconducting state, the magnetic fluxes from the annular permanent magnets 3 of the rotating member B penetrate to selectively pass through the normal conduction particles which are uniformly mixed into the superconductor, and a superconductive current passes around the penetrated magnetic fluxes to fix the intrusion path of the magnetic fluxes as a constant. Therefore, in the same way as described above, the annular permanent magnets 3 are rotated by the pinning phenomenon.

When the superconducting bearing device has a large bearing area and a single-body annular permanent magnet cannot be made, a plurality of permanent magnets are connected to form the annular permanent magnets 3. In this case, the annular permanent magnet 3 and the annular soft magnetic yoke 4 are alternately disposed, the nonuniformity in magnetic fluxes which are generated on the joint faces of the magnets forming respective annular permanent magnets 3 can be reduced, enabling to produce a large-scale bearing device.

Still referring to FIG. 13, reference numeral 6 designates a reinforcing member which is mounted on the outermost end of the magnet section. Specifically, the reinforcing member 6 having the shape of a ring is mounted on the outer periphery of the annular permanent magnets 3 to compress the annular permanent magnets in radial and peripheral directions. The reinforcing member 6 is made of a material having a specific gravity smaller than the annular permanent magnets and a high tensile break strength. And, the compressive force by the reinforcing member 6 in the radial and peripheral directions of the annular permanent magnets is designed to be smaller than a compression break strength of the magnets when the rotating member is not rotating. Preferably, the reinforcing member is a ring which is made of, for example, carbon fiber reinforced plastic (CFRP).

Accordingly, the annular permanent magnets can be prevented from a tensile break due to centrifugal force. As a result, even when the annular permanent magnets have a large external size, their mechanical strength can be improved against the rotation at a high speed, and can provide a superconducting bearing device having a high loading force.

Also, in this specific example, the circumferential end of the soft magnetic yoke 4 which is mounted between the annular permanent magnets 3 and at the innermost and outermost peripheries is designed to protrude from the surface of the magnet section toward the superconductor, enabling improvement of magnetic field intensity, as is known in the art. More specifically, when structured as described above, the magnetic fluxes generated from the north poles of the annular permanent magnets 3 pass through the annular soft magnetic yokes and return to the south poles of the annular permanent magnets 3. In this case, the magnetic fluxes from the north poles to the south poles of the annular permanent magnets 3 are narrowed down by the annular magnetic yokes, so that a magnetic flux density acting on the superconductor can be increased substantially.

In this case, as to the distribution of surface magnetic fluxes, the magnetic flux density in the vicinity of the surface of the annular soft magnetic yoke 4 is high. And, the peak of the magnetic flux density can be varied by changing the width in the radial direction of the annular permanent magnets 3 and the annular soft magnet yokes 4. But, to attain other desirable effects of the second embodiment of the invention discussed hereinbelow, it is a design requirement that the width of the annular soft magnetic yoke 4 be smaller than those of the annular permanent magnets 3.

In this specific example, the peak of the magnetic flux density can be increased by including the annular soft magnetic yoke 4 disposed between the annular permanent magnets 3 as described above. Therefore, when the magnetic flux density acting on the superconductor 4 is increased, rigidity for retaining the gap between the magnet section 2 and the superconductor 1 can be improved.

In addition, the annular soft magnetic yoke 4 serves to ease the nonuniformity in magnetic fluxes from the annular permanent magnets 3. More specifically, the annular permanent magnets 3 exhibit nonuniformity in magnetic flux on their surfaces derived from their production process, and the nonuniformity in magnetic flux in the rotating direction becomes a hysteresis loss within the superconductor 4 to cause a loss in rotating energy, resulting in a rotating loss of the bearing. But, since the nonuniformity in magnetic flux of the annular permanent magnets 3 can be made uniform by including the annular soft magnetic yoke 4, the nonuniformity in magnetic flux in the rotating direction can be reduced, and the rotating loss of the bearing can be reduced.

Furthermore, in this specific example, the width of the annular soft magnetic yoke 4 in the radial direction is determined so that the magnetic fluxes from the annular permanent magnets 3 are saturated in the annular soft magnetic yoke 4. Specifically, the magnetic flux density in the annular soft magnetic yoke 4 is variable depending on a total quantity of magnetic fluxes from the adjacent annular permanent magnets 3 and their corresponding radial. But, it has been determined for this particular illustrated example, according to known techniques, that the width of each annular magnetic yoke 4 forces the magnetic flux, which passes through the annular soft magnetic yoke 4, to fall in a saturated state. Thus, as is well-known in the art, an annular soft magnetic yoke 4 which has a saturated magnetic flux does not have its surface magnetic flux density increased very much if its radial width is further narrowed, and the annular permanent magnets 3 mutually opposed with the annular soft magnetic yoke 4 have their magnetic fields decreased. Conversely, when the width of the annular soft magnetic yoke 4 in the radial direction is increased, the peak of the magnetic flux density on the surface is lowered and the rigidity of the bearing is lowered, but the effect for easing the nonuniformity in magnetic flux is improved.

The annular permanent magnets 3 in this specific example are magnetized in the radial direction and can be magnetized easily in a known manner. And, when the superconducting bearing device has a large bearing and a single-body annular permanent magnet cannot be made, a plurality of magnet pieces are connected to form the annular permanent magnets 3. In this case, according to the structure of this specific example in which the annular soft magnetic yoke 4 is disposed between the annular permanent magnets 3, a large bearing can be produced with the nonuniformity in magnetic flux reduced.

Still referring to FIG. 13, as to the opposed faces of a superconductor 1 and magnet section 2, the annular permanent magnets 3 and the annular magnetic yoke 4 have a different gap with respect to the superconductor 1, and the gap between the annular magnetic yoke 4 and the superconductor 1 is smaller than that between the annular permanent magnets 3 and the superconductor 1. As stated above, the annular soft magnetic yoke 4 serves to concentrate the magnetic fluxes from the annular permanent magnets 3 and disperses the magnetic fluxes uniformly. Most of the magnetic fluxes radiated into the ambient environment are from the annular soft magnetic yoke 4. Specifically, the magnetic fluxes directly generated from the annular permanent magnets 3 are not uniform at the junctions between the magnets. But, the effects by the magnetic fluxes directly generated from the annular permanent magnets 3 can be lowered by protruding the annular soft magnetic yoke 4 from the magnet surfaces.

And, even when the gap between the superconductor 1 and the annular permanent magnets 3 is made larger than that between the superconductor 1 and the annular soft magnetic yoke 4, the magnetic fluxes actually acting on the superconductor 1 are not substantially reduced unless the gap between the superconductor 1 and the annular soft magnetic yoke 4 varies, so no discernible rotational loss is experienced if the yoke extensions are uniform as depicted.

According to this specific example, the annular permanent magnets 3 and the annular soft magnetic yoke 4 can have their inner diameters processed separately, thus precision for processing the inner diameter of the annular soft magnetic yoke 4 can be improved. Thus, the magnetic flux leakage from the annular permanent magnets 3 barely effect the efficiency of the superconductor 1. Therefore, a rotating energy loss in the superconductor 1 is substantially nil even when the magnetic fluxes leaked from the annular permanent magnets 3 are not uniform. More specifically, a magnetic path in the space returning from the annular permanent magnets 3 to the superconductor 1 of the superconducting bearing device according to this specific example can be shortened. As a result, field permeance of the magnet section 2 as a whole can be increased, and the magnetic flux density to the superconductor can be further improved.

As described above, according to this specific example, in the superconducting bearing device in which the magnet section of the rotating member comprises the plurality of annular permanent magnets concentric with the axis of the rotating member and the soft magnetic yoke positioned between the annular permanent magnets and at the innermost and outermost peripheries, since the yoke is extended from the magnet section to the superconductor side, a magnetic field strength can be improved by the yoke which guides the magnetic fluxes from the magnets, the nonuniformity in magnetic flux can be reduced, and a high-performance bearing device can be produced.

And, a ring-shaped reinforcing member, which compresses the annular permanent magnets in radial and peripheral directions, is mounted on the outer periphery of the annular permanent magnet to prevent a tensile break in the annular permanent magnets due to centrifugal force. Therefore, even when the annular permanent magnets have a large external size, their mechanical strength can be improved against the rotation at a high speed. As a result, a superconducting bearing device having a high loading force can be produced.

In these embodiments, magnets for the superconducting bearing device have a maximum tensile strength of 24 Kg/mm2 when a Pr—Fe—B—Cu-based permanent magnet produced by a hot processing method is used, or a maximum tensile strength of 8 Kg/mm2 when an Nd—Fe—B-based sintered magnet is used. Therefore, even when a conventional fly-off preventive member is disposed, the magnets are difficult to prevent from being broken because a stress exceeding the above tensile strength is generated in the magnets when rotating at high speed.

On the other hand, to increase a loading force, it is necessary to enlarge the opposed surface areas of the superconductor and the permanent magnets. To secure the area, it is necessary to enlarge the outer diameter of the magnet section, but the outer diameter of the magnet section is greatly limited because of the limitation of the rotation strength as described hereinabove. Specifically, the magnets mounted on the rotating member have a very low tensile strength, while its compression strength is so high as about 100 Kg/mm2. With attention directed to the above fact, the inventors propose a structure which can prevent as much as possible the application of a compressive force by the reinforcing member as well as the reduction of the applied compressive force or the force applied by the reinforcing member due to the centrifugal force when rotating.

Thus, according to this specific example of the second preferred embodiment, at least the magnet section 2 of the rotating member is provided with annular permanent magnets concentric with the axis of the rotating member and a ring-shaped reinforcing member, which compresses the annular permanent magnets in radial and peripheral directions, is mounted on the outer periphery of the annular permanent magnet. Therefore, the mechanical strength of the magnets against the rotation at a high speed can be improved even when the annular permanent magnet is given a large external size. As a result, a superconducting bearing device having a high loading force can be obtained.

Now, the second specific example of the second embodiment of the invention will be described with reference to FIG. 14.

FIG. 14 shows a vertical sectional view of the main part of a superconducting bearing device of this specific example. This superconducting bearing device is provided with a superconductor 1 to be mounted on a stationary member A and a permanent magnet section 2 to be mounted on a rotating member B, and the superconductor 1 and the permanent magnet section 2 are disposed to oppose each other with a gap therebetween. Thus, the basic structure is the same as the first specific example of the second preferred embodiment, discussed hereinabove. In the following specific examples, description which is the same as in the first specific example will be omitted, and the main points of the practical structure will be described.

In this specific example, the circumferential ends of soft magnetic yokes 4 which are mounted between the respective annular permanent magnets 3 of the magnet section 2 are protruded toward the superconductor 1 and have their cross-sectional shapes formed in the shape of an arc.

Now, the third specific example of the second embodiment of the invention will be described with reference to FIG. 15.

In this specific example, the circumferential ends of the soft magnetic yokes 4 protruded toward the superconductor 1 have their cross-sectional shapes chamfered as shown in FIG. 15. Therefore, substantially the same effects as in the second specific example are provided, and the cross-sectional shape in the radial direction can be formed by plane processing as compared with the processing to form into an arched end.

The fourth specific example of the second embodiment of the invention will be described with reference to FIG. 16.

In this specific example, soft magnetic yokes 4 have a sectional form in the radial direction that the part on the side of a superconductor 1 (lower side in the figure) is broad, the part on the opposite side from the superconductor 1 (upper side in the figure) is narrowed and wedge-shaped, and the part on the side of the superconductor 1 has a sectional form protruded in the shape of an arc as shown in FIG. 16. Therefore, the quantity of magnetic fluxes generated from the respective annular permanent magnets 3 and guided to the yokes 4 is high when directed toward the superconductor. Specifically, among a total magnetic flux quantity of the annular permanent magnets 3, the quantity passing through the space on the side of the superconductor becomes higher than the quantity passing through the space on the opposite side from the superconductor. As a result, the magnetic fluxes from the magnets are used more efficiently to enable the improvement of a magnetic field strength with respect to the superconductor, thus enabling to provide a highly efficient magnetic bearing.

The fifth specific example of the second preferred embodiment of the invention will be described with reference to FIG. 17.

In this specific example, annular permanent magnets 3 are radially magnetized in curved and different directions with respect to the internal radial direction, in a magnetizing manner well-known in the art. Therefore, the quantity of magnetic flux from the annular permanent magnets 3 directed towards the superconductor is greater. Specifically, among a total magnetic flux quantity of the annular permanent magnets 3, the quantity passing through the space on the side of the superconductor becomes higher than the quantity passing through the space on the opposite side from the superconductor. As a result, the magnetic fluxes from the magnets are used more efficiently to enable the improvement of a magnetic field strength with respect to the superconductor, thus enabling to provide an efficient magnetic bearing.

The sixth specific example of the second embodiment of the invention will be described with reference to FIG. 18.

In this specific example, respective annular permanent magnets 3 consist of a pair of magnets 3A, 3B which are opposingly slantingly magnetized in the radial direction as shown in FIG. 18, so that the magnetized direction becomes similar to that of the annular permanent magnets 3 in the fifth specific example. Therefore, the effects to be obtained are almost the same as those when the magnets used inside are magnetized in the curved and different directions, and it is not necessary to magnetize a single magnet in the curved and different directions, which is relatively more difficult and costly to manufacture.

The seventh specific example of the second preferred embodiment of the invention will be described with reference to FIG. 19.

In this specific example, each annular permanent magnet consists of three magnets 3A, 3B, 3C which are slantingly magnetized in the radial direction in section as shown in FIG. 19, so that a more approximate magnetized direction can be attained in connection with the curved magnetization as compared with the magnetized direction of the annular permanent magnets used in the sixth specific example. Specifically, the slantingly magnetized magnet 3A has its north pole slantingly magnetized toward the superconductor, the slantingly magnetized magnet 3B has its north pole slantingly magnetized in a direction away from the superconductor, and the intermediate magnet 3C, which is radially magnetized in parallel to the superconductor, is positioned between the magnets 3A and 3B.

Therefore, the production can be facilitated in the same way as in the sixth specific example, and a more approximate magnetized direction similar to the fifth specific example can be obtained, thus enabling the improvement of a magnetic field strength.

The eighth specific example of the second embodiment of the invention will be described with reference to FIG. 20.

In this specific example, soft magnetic yokes 4 exhibit a triangular wedge sectional form in the radial direction such that the surface closest to and opposing the superconductor 1 is broad and the part on the opposite side from the superconductor 1 is narrowed. Three slantingly magnetized magnets portions 3A, 3B, 3C comprise each annular permanent magnet and each take on a trapezoidal cross section and are slantingly magnetized as shown in FIG. 20. Consequently, the quantity of magnetic fluxes generated from the respective annular permanent magnets 3A, 3B, and 3C, and guided to the yokes 4 is high when directed toward the superconductor. Specifically, since: 1) the magnetic flux from the north pole of the magnet 3 is directed toward the superconductor 1; and 2) the yoke 4 for guiding the magnetic flux is formed to have a wedged cross section with broad end facing to the superconductor, the amount of experienced magnetic flux passing through the space on the side of the superconductor becomes higher than the quantity passing through the space on the opposite side from the superconductor. As a result, the magnetic fluxes from the magnets are used more efficiently to enable the improvement of a magnetic field strength with respect to the superconductor, thus enabling to provide a highly efficient magnetic bearing.

The ninth specific example of the second embodiment of the invention will be described with reference to FIG. 21.

In this specific example, as in the case of the specific example shown in FIG. 20, soft magnetic yokes 4 have a triangular wedge radial cross-section in which the broad face faces and opposes the stationary superconductor, the part on the opposite side from the superconductor (upper side in the figure) is narrowed. However, unlike the specific example shown in FIG. 20, the broad face of the yoke s 4 which face the superconductor 1 protrudes in the shape of an arc towards the superconductor as shown in FIG. 21. And, each annular permanent magnet 3 between the yokes 44 consists of three slantingly magnetized magnets 3A, 3B, 3C which are in a set of 3 and formed to have a trapezoidal section in the same way as in the eighth specific example hereinabove, so that the annular permanent magnet 3 is slantingly magnetized in a curved direction to have the innermost and outermost peripheries approached to the superconductor and the intermediate part separated from the superconductor. Consequently, in the same way as in the eighth specific example, the magnetic fluxes from the annular permanent magnets 3 can be guided efficiently toward the superconductor, and a magnetic path for the magnetic fluxes in the space returning from the annular permanent magnets 3 to the superconductor 1 can be made short. As a result, permeance of the magnet section 2 as a whole can be increased, and the magnetic flux density to the superconductor 1 can be further improved.

The tenth specific example of the second embodiment of the invention will be described hereinbelow with reference to FIG. 22 through FIG. 27.

FIG. 22 is a vertical sectional view showing the main part of a superconducting bearing device according to this specific example. This superconducting bearing device comprises a superconductor 1 mounted on a stationary member A which is fixed to the device body and a permanent magnet section 2 mounted on a rotating member B which is fixed to a rotating shaft 16, and the superconductor 1 and the magnet section 2 are radially disposed to oppose each other with a prescribed gap therebetween.

The rotating member B comprises a bottom-closed cylindrical rotor 5 whose bottom is fixed to a rotating shaft 16 and the magnet section 2 which is fixed to the inner wall of the rotor 5. The magnet section 2 is formed in the shape of a hollow cylinder concentric with the shaft 16 of the rotating member B, and comprises a plurality of circular permanent magnets 8 and a plurality of circular soft magnetic yokes 10, stacked in an alternate fashion. Each circular permanent magnet 8 is axially magnetized with the magnetized direction alternately changed. Specifically, each circular permanent magnet 8 is magnetized in a direction that the same pole is opposed mutually with the circular yoke 10 between them, so that the magnetic fluxes generated from the neighboring magnets are mutually repulsed, thereby increasing the magnetic flux density of the magnetic flux directed from the yoke 10 toward the space.

In the magnet section 2 of this specific example, the magnetic flux from the circular permanent magnet 8 passes through the circular soft magnetic yoke 10 whose circumferential end is protruded toward the superconductor, so that a magnetic path in the space is short. Therefore, in the same way as in the first specific example, permeance of the magnet section 2 as a whole can be increased, and the magnetic flux density acting on the superconductor 1 can be further improved.

When the number of the stacked circular permanent magnets 8 and circular soft magnetic yokes 10 is changed as desired according to an area opposed to the superconductor 1, the bearing rigidity can be varied with the magnet section 8 retained in the optimized state, and designing flexibility can be increased greatly. Thus, since the bearing has its radial rigidity improved and a change in magnetic field in the axial direction is increased, a force axially applied to the bearing, or a loading force of the bearing, can be increased.

As shown in FIG. 23, the circular permanent magnet 8 of this specific example is configured by connecting a plurality of annular permanent magnets 9A, 9B, 9C, 9D having a different diameter from inner to outer peripheries. And, the annular permanent magnets 9A, 9B, 9C, 9D each are configured by connecting eight magnet pieces 9a, 9b, 9c, 9d which here are divided equally. Junctions between the magnet pieces 9a, 9b, 9c, 9d of the neighboring annular permanent magnets 9A, 9B, 9C, 9D are displaced in the peripheral direction so that the junctions do not align linearly in the radial direction or the junctions between the magnet pieces which form the each annular permanent magnet do not align with those of the neighboring magnet pieces. Thus, the circular permanent magnet 8 as a whole is decreased in an adverse effect due to the nonuniformity in magnetic flux caused by the junctions in the above connecting configuration.

More specifically, the axial thickness of each annular permanent magnet 9A, 9B, 9C, 9D is determined to be same, and the inner and outer circumferences of the annular permanent magnet 9A are determined to be a prescribed level, and the inner circumferences of the annular permanent magnets 9B, 9C, 9D positioned on the outer periphery of the annular permanent magnet 9A are determined to be equal to the outer circumferences of the annular permanent magnets 9A, 9B, 9C adjacent to their inner peripheries. And, each annular permanent magnet 9A, 9B, 9C, 9D is radially divided into plural numbers (eight pieces in this example) and formed by connecting these magnet pieces 9a, 9b, 9c, 9d which have the same shape. These magnet pieces 9a, 9b, 9c, 9d are formed into the same shape of a collapsible, handheld fan spreading towards the bottom of the figure as shown in FIG. 24 and magnetized in advance. And, these magnet pieces 9a, 9b, 9c, 9d are made of a powerful anisotropic Pr magnet.

FIG. 25 shows that the neighboring annular permanent magnets 9A to 9D are connected as being displaced in the peripheral direction by approximately 22.5°, a half of the division angle of 45° of the magnet pieces 9a, 9b, 9c, 9d. Therefore, the junctions between the magnet pieces 9a, 9b, 9c, 9d which configure the annular permanent magnets 9A, 9B, 9C, 9D are designed not to align with those of the neighboring magnet pieces, so that the nonuniformity in magnetic flux due to the junctions between the magnet pieces 9a, 9b, 9c, 9d are dispersed uniformly, thereby reducing an adverse effect due to the nonuniformity in magnetic flux resulting from combined junction areas.

Also, the junctions between the magnet pieces of the above neighboring annular permanent magnets may be displaced along a spiral line from the inner to outer peripheries. Specifically, as shown in FIG. 26, the annular permanent magnets 9A, 9B, 9C, 9D arranged in a set of 3 from the inner to outer peripheries may be displaced in the peripheral direction by a prescribed angle.

Further, the annular permanent magnets may be divided into smaller pieces from the inner to outer peripheries, and the junctions between the magnet pieces of the annular permanent magnets may be displaced so as not to align with those of the neighboring magnet pieces, thereby reducing the nonuniformity in magnetic flux possibly caused by the connecting structure. For example, as shown in FIG. 27, the number of the divided magnet pieces 9a, 9b, 9c, 9d which configures the annular permanent magnets 9A, 9B, 9C, 9D may be increased toward the annular permanent magnets 9A, 9B, 9C, 9D at the outer periphery, and the annular permanent magnets 9A, 9B, 9C, 9D may be connected so as not to linearly align in the radial direction the junctions between the magnet pieces 9a, 9b, 9c, 9d of the annular permanent magnets 9A, 9B, 9C, 9D, thereby configuring a single-body circular permanent magnet 8. Accordingly, the same effects as in the previous specific example can be achieved, and since the circumferential length of the annular permanent magnet is increased toward the outer periphery, the increase in divided magnet piece numbers prevents each magnet piece from being made unfeasibly large and facilitates the handling of the magnet pieces, and workability for magnetizing the magnet pieces and for assembling into the annular permanent magnets can be improved.

As described above, according to the tenth specific example of the invention, in the superconducting bearing device which is configured by radially connecting the multiple annular permanent magnets having a different diameter to form a single magnet section and connecting the radially divided magnet pieces to form each annular permanent magnet, since the annular permanent magnets are displaced to be connected in a prescribed rotating direction, the junctions between the magnet pieces for configuring the annular permanent magnets are not aligned with those of the neighboring magnet pieces, so that the adverse effect due to the nonuniformity in magnetic flux caused by the junctions in the above connecting configuration can be reduced.

The eleventh specific example of the second embodiment of the invention will be described with reference to FIG. 28 through FIG. 31.

In this specific example, a magnet section 2 comprises a cylindrical permanent magnet 11 which is concentric with the shaft of a rotating member B as shown in FIG. 28, and this cylindrical permanent magnet 11 is radially magnetized. Specifically, the cylindrical permanent magnet 11 has its inner periphery magnetized to be the north pole and the outer periphery to be the south pole as shown in FIG. 29.

And, the cylindrical permanent magnet 11 is formed by stacking a plurality of annular permanent magnets 12A, 12B, 12C, 12D which are prepared by axially dividing into the same thickness and have the same inner and outer diameters, and these annular permanent magnets 12A, 12B, 12C, 12D each are formed by connecting eight equally divided magnet pieces 12a . . . . And, the junctions between the magnet pieces 12a . . . of the annular permanent magnet 12 are displaced so as not to align with those of the neighboring magnet pieces, thereby reducing the nonuniformity in magnetic flux due to the junctions in this connecting configuration.

These annular permanent magnets 12A, 12B, 12C, 12D have the same inner and outer circumferences and axial thickness. And, the annular permanent magnets 12A, 12B, 12C, 12D are radially divided into plural numbers (eight pieces in this example) and formed by connecting the magnet pieces 12a . . . having the same shape as shown in FIG. 30. Each magnet piece 2a . . . is made of a powerful anisotropic Pr magnet. Specifically, the power of a certain magnet is determined by a maximum value of energy product (BH) which the magnet can have per unit volume or so-called maximum energy product (BH) max. Therefore, it is desired that the residual magnetic flux density Br and holding power Hc of the magnet itself are enhanced, and the magnetizing curve of the magnet is preferably a curve held within the second quadrant or a demagnetization curve in the shape of a square. A magnet having a sharply squared demagnetization curve is called an anisotropic magnet and one having a dully squared demagnetization curve as an isotropic magnet.

And, the neighboring annular permanent magnets are connected as being displaced by 22.5°, a half of the division angle of 45° possessed by the magnet piece 12a. Therefore, the junctions between the magnet pieces 12a which form the annular permanent magnets 12A, 12B, 12C, 12D are designed not to align with those of the neighboring magnet pieces, and the nonuniformity in magnetic flux due to the junctions between the magnet pieces 12a is made to be dispersed uniformly, thereby reducing the adverse effect due to the nonuniformity in magnetic flux.

The junctions between the magnet pieces possessed by the above neighboring annular permanent magnet 12 may be displaced along the spiral line in the longitudinal direction of the shaft of the cylindrical magnet. For example, the annular permanent magnets 12A, 12B, 12D which are in a set of 3 along the axial direction may be displaced by a prescribed angle for configuring as shown in FIGS. 31A and 31B. And, the same effect may also be attained by stacking annular permanent magnets having a different division number in the axial direction.

As described above, according to the eleventh specific example, in the superconducting bearing device which is configured by axially connecting the multiple annular permanent magnets to form a single-body magnet section and connecting the radially divided magnet pieces to form each annular permanent magnet, since the annular permanent magnets are displaced to be connected in a prescribed rotating direction, the junctions between the magnet pieces for configuring the annular permanent magnets are not aligned with those of the neighboring magnet pieces, so that the adverse effect due to the nonuniformity in magnetic flux caused by the junctions in the above connecting configuration can be reduced.

As will be apparent to those ordinarily skilled in the art, the above specific examples may be combined as desired to carry out the design criteria of a particular bearing application. Moreover, the techniques of these specific examples of the second preferred embodiment can also be applied to a single-body bearing device, with similar effects. Further, although the Pr—Fe—B—Cu magnetic material is used for constructing the magnets in the respective specific examples of the second embodiment of the invention, it will be understood to those ordinarily skilled in the art that the base magnet material is not so limited. In fact, any permanent magnets such as ferrite, Alnico, neodymium-based or samarium-based may be used. Besides, the superconductor has been described using the yttrium high-temperature superconductor as an example, but any superconductor such as (RE-Ba—Cu—O)-or similar superconductor based containing, e.g., rare earth based elements, which can have a restoring force against magnets, may be used.

Description will now be made of the third preferred embodiment of the present invention.

FIG. 32 is a vertical sectional view showing the active bearing components of a superconducting bearing device according to the third preferred embodiments of the invention. This superconducting bearing device comprises a superconductor 1 to be mounted on a stationary member A and a magnet section 2 to be mounted on a rotating member B in the same way as in the above-described examples, and the superconductor 1 and the magnet section 2 are disposed to oppose each other with a gap therebetween.

The superconductor 1 is formed by uniformly mixing normal conduction particles $Y_2Ba_1Cu_1$ into a yttrium high-temperature superconductor, e.g., a substrate made of $YBa_2Cu_3Ox$, and has a characteristic to restrain the intrusion of magnetic fluxes generated from annular permanent magnets 3 to be described hereinbelow. The superconductor 1 has its length in a radial direction determined to be almost equal to a total of radial lengths of the annular permanent magnets 3.

The superconductor 1 is disposed to oppose the annular permanent magnets 3 in the axial direction and spaced from them so that at a position where a prescribed quantity of magnetic fluxes from the annular permanent magnets 3 permeates the superconductor, and the distribution of the permeated magnetic fluxes is not varied by the rotation of the rotating member B.

The rotating member B consists of an annular rotor 5 and the aforementioned magnet section 2 fixed to the rotor 5. The magnet section 2 is coaxial or concentric with the central rotating axis 1000 of the rotating member B and has the multiple annular permanent magnets 3 which are mutually magnetized so that the neighboring magnets are repelled in the radial direction, and an annular soft magnetic yoke member 4 is disposed between the respective annular permanent magnets 3.

In this specific example, the annular permanent magnets 3 use, e.g., a Pr—Fe—B—Cu-based permanent magnet produced by a hot processing method, and the annular soft magnetic member 4 is made of soft malleable iron. In this structure, the magnetic fluxes from the north poles of the two annular permanent magnets 3 pass through the annular soft magnetic members 4 and return to the south poles of the annular permanent magnets 3. Thus, the magnetic fluxes from the annular permanent magnets 3 are narrowed down by the annular soft magnetic yoke members 4, so that a magnetic density acting on the superconductor 1 can be increased substantially.

This superconducting bearing device has its superconductor 1 cooled with a cooling medium which is circulating within the cooling case (not shown) to keep it in the superconducting state. In the superconducting state, the magnetic fluxes from the annular permanent magnets 3 of the rotating member B penetrate into the superconductor, where the uniformly mixed normal conduction particles make the distribution of the penetrated magnetic flux in the superconductor uniform, and the annular permanent magnets 3, 3 are rotated by the pinning phenomenon described above.

When the superconducting bearing device has a large bearing and a single annular permanent magnet cannot be made, a plurality of permanent magnets are connected to form the annular permanent magnets 3. In this case, when the annular magnetic member 4 is alternately disposed with the annular permanent magnets 3, a large bearing which does not cause the nonuniformity in magnetic flux can be produced.

In this specific example, ring-shaped reinforcing members 6 are mounted on the outer periphery of the annular permanent magnets 3 to compress them in the radial and circumferential directions. The reinforcing member 6 is made of a material which has a smaller specific gravity and a higher tensile break strength than the annular permanent magnets used.

The third embodiment addresses the design objective for mounting the ring-shaped reinforcing members 6 for compressing the annular permanent magnets 3 on their outer peripheries when the rotating member B is not rotating, and when the rotating member B is rotated at a high speed, tensile force applied to the annular permanent magnets 3 is reduced as much as possible. Therefore, the reinforcing member 6 is made of a material which has a smaller specific gravity and a higher tensile break strength than the annular permanent magnets 3 in order to maintain an adequate compressive force applied to the annular permanent magnets 3. In other words, the selection of a material having a small specific gravity and a high tensile break strength can provide a reinforcing material which exhibits low elongation and high rigidity characteristics for the magnets used. This specific example uses carbon fiber reinforced plastic (CFRP) as the reinforcing member. This CFRP has a density of 1.6 [g/cm3], Poisson's ratio of 0.3, and Young's modulus of $1.72 \times 10^{11}$ [Pa]), while the Pr magnet in this specific example has a density of 7.4 [g/cm3], Poisson's ratio of 0.24, and Young's modulus of $1.34 \times 10^{11}$ [Pa]).

As described above, the compressive forces of the reinforcing member 6 in the radial and circumferential directions of the annular permanent magnets 3 are required to be 100 Kg/mm2 or below when the rotating member B is not rotating because the magnets are more easily broken by a compression stress when the compressive force exceeds 100 Kg/mm2. In other words, the static compressive forces by the reinforcing member 6 in the radial and circumferential directions of the annular permanent magnets 3, 3 are determined to be smaller than the compressing break stress of the magnets.

Moreover, this specific example features the reinforcing member 6 disposed in a multilayered structure. When the reinforcing members 6 are multilayered, each reinforcing member 6 can be mounted with a less interference, so that the distribution of compression stress against the magnets can be made more uniform. When the distribution of compression stress against the magnets is roughly made uniform, the deviated application of a compression stress can be avoided. Thus, since the compression stress is uniformly applied, the breakage of the rotating magnets due to the lack of the compression stress to be applied can be prevented, and the safety and reliability of the device can be improved.

As described above, this specific example uses CFRP for the reinforcing member 6 fitted to the annular permanent magnets while compressing in their radial and circumferential directions, thereby forming the ring-shaped reinforcing member 6 on the outer periphery of the magnet section 2. As described above, the static compressive force in this specific example is determined to be 100 Kg/mm2 or below when the rotating member B is not rotating.

FIG. 33 shows another specific example of the third embodiment of the invention. In this example, reinforcing members 6 are mounted in the multilayered structure in the same way as the above example, and the axial thickness of each reinforcing member 6 is larger than that of magnets 3. In FIG. 33, the vertical width of the reinforcing member 6 is determined to be larger than that of the magnet 3. Since the reinforcing material is thick in the axial direction, its thickness in the radial direction can be reduced, so that reinforcing can be stabilized against wobbling and axial displacement at high speed, and overall durability of the apparatus improved. Reference numeral 18 designates a preferably magnetically neutral intermediate member for correcting an interval difference between the magnet 3 and the reinforcing member 6.

FIG. 34 shows another specific example of the third embodiment of the invention. In this example, reinforcing members 6 are mounted in the multilayered structure in the same way as in the above specific example, and a ring-shaped member 7 having a smaller Young's modulus than the reinforcing member is mounted on the inner periphery of each reinforcing member 6. This member 7 is made of a material such as aluminum having a small Young's modulus, so that a compressive force which is applied to the magnets by the reinforcing member 6 is adjusted to be applied uniformly to the radial peripheries of each permanent magnet.

As will be described below with reference to a specific example, in a method specifying that the reinforcing member 6 is previously formed in the shape of a ring and the ring-shaped reinforcing member 6 is then force fitted to the outer periphery of the annular permanent magnet, when the ring-shaped member 7 has been mounted, the ring-shaped reinforcing member can be fitted easily.

FIG. 35 through FIG. 38 show the results of analysis conducted by the inventors on radial and circumferential stress distribution along different parts of the rotating member B as shown in FIG. 34 when it is stationary and rotated at 40,000 rpm.

FIG. 35 shows a circumferential stress distribution when the rotating member B is stationary with respect to each position in the radial direction from the center of the magnet section 2 on the horizontal axis. In FIG. 35, the outer periphery of the annular rotor 5 extends to about 50 mm on the horizontal axis, the magnet section 2 extends to about 90 mm, and the four-layered reinforcing members 6 extend beyond the 90 mm mark. FIG. 36 shows radial stress distribution when the rotating member B is stationary with respect to each position in the radial direction on the same horizontal axis shown in FIG. 35. And, FIGS. 37 and 38 respectively show circumferential and radial stress distribution when the rotating member B is rotating at 40,000 rpm.

Thus, it was confirmed that when the compressive force is previously applied to the magnets when not rotating by the reinforcing member, even when the annular permanent magnet has a radius of exceeding 50 mm, no break is caused in this specific example at 10,000 rpm where tensile break is generally caused due to centrifugal force, and the compressive force is still effective on the magnets even when rotated at 40,000 rpm. These advantages are quite remarkable over the art. Specifically, in a conventional reinforcing structure which uses an iron member to form a frame to house the magnets to protect them from centrifugal force when rotated, the iron frame itself is externally expanded due to centrifugal force when rotated exceeding 10,000 rpm, instantly losing an effect of protecting the magnets from deformation and displacement. In the present specific example, the same magnets are used but the reinforcing member 6 made of the aforementioned CFRP is used instead of the iron frame, enabling to increase the rotating speed from 10,000 to 40,000 rpm. In this connection, it is seen that the structure, operation and effect of this specific example are quite excellent in view of the fact that the centrifugal force applied to the magnets is proportional to the square of the radius.

FIG. 39 through FIG. 41 illustrate another specific example of the third embodiment of the invention, in which reinforcing members 6 are mounted in the multilayered structure in the same way as in the above specific example, and a ring-shaped member 7 having a smaller Young's modulus than the reinforcing member is mounted on the inner periphery of each reinforcing member 6.

As shown in FIG. 39, this specific example mounts the ring-shaped member 7 on the outer periphery of the magnet. This member 7 has its back side protruded in the axial direction, and this protruded part has an inclined face 7a formed to make the radius increase from the protruded circumferential end and to serve as a guide when the reinforcing member is inserted. In the drawing, reference numeral 17 designates a jig for reinforcing the protruded part of the ring-shaped member 7.

In this specific example, the ring-shaped reinforcing member 6 made of the CFRP is previously formed, while the magnet section 2 is formed by assembling annular permanent magnets 3. Next, the ring-shaped member 7 and the jig 17 are mounted on the outer periphery of the annular permanent magnets 3, and the ring-shaped reinforcing member is then force or frictionally fitted to the outer periphery of the member 7. When the reinforcing member 6 is force fitted, it can be inserted easily by virtue of the inclined face 7a formed on the ring-shaped member 7 which serves as a guide.

After mounting one reinforcing member 6, the jig 17 is removed, and the protruded part of the ring-shaped member 7 is removed to be level with the magnet and the reinforcing member. Then, as shown in FIG. 40, another ring-shaped member 7 and another jig 17 are mounted on the outer periphery of the reinforcing member 6, and another ring-shaped reinforcing member is then force fitted to the outer periphery of the member 7. In the same way as above, when the reinforcing member 6 is force fitted, it can be inserted easily by virtue of the inclined face 7a formed on the ring-shaped member 7 which serves as a guide. After mounting the reinforcing member 6, in the same way as above, the protruded part of the ring-shaped member 7 is removed to be level with the magnet and the reinforcing member. Then, another ring-shaped member and another jig are also mounted on the outer periphery of the reinforcing member 6, and another ring-shaped reinforcing member is force fitted.

Thus, rotating member B which has a set of the ring-shaped member 7 and the reinforcing member 6 mounted in multiple numbers is obtained as shown in FIG. 41. In the drawing, reference numeral 14 designates a nonmagnetic warp preventing member which serves to prevent the annular permanent magnets 3, 3 from being deformed due to warping caused by repulsion in connection with a superconductor 1.

In this specific example, when the reinforcing member 6 is force fitted, the static compressive force in the radial and circumferential directions of the annular permanent magnets is also determined in the same way as above to be 100 Kg/mm2 or below. Further, as shown in the drawing and discussed hereinabove, the set of the ring-shaped member 7 and the reinforcing member 6 is mounted in the multilayered structure as necessary. When the ring-shaped member 7 is used, a prescribed size of forced-fitting allowance can be secured precisely when the ring-shaped reinforcing member 6 is mounted, and the stress distribution of a given load can be obtained correctly. Therefore, even when the forced-fitting allowance is large, the reinforcing member 6 can force fitted in a stable manner, stress due to the reinforcing member may be adjusted, and a correct stress distribution can be attained, so that a reinforcing member having a high compressive force can be used. Accordingly, the magnets can be protected from being broken when rotated, and the rotating member B can be rotated at a high speed.

As described above, according to the respective specific examples of the third embodiment of the invention, the axial loading force by the annular permanent magnet 3 can be increased by increasing the multiple layers of the annular permanent magnets, and even when the radius is increased because of the increased layers of annular permanent magnets, the presence of the reinforcing members for applying a compressive force to the magnets prevents the magnets from being broken due to a critical tensile force. Thus, this specific example provides an optimum structure for a superconducting bearing device for an electric power storage system which rotates a heavy flywheel at a high speed to store an electric power by the rotating energy. Therefore, it is the most preferred embodiment for such applications.

Although the Pr—Fe—B—Cu magnet is used as the magnets in the respective specific examples, it is to be understood that the third embodiment is not limited to it, and any permanent magnets such as ferrite, Alnico, neodymium-based or samarium-based may be used. Also, the superconductor has been described using the yttrium high-temperature superconductor as an example, but any rare earth superconductor such as (RE-Ba—Cu—O)-based which can have a restoring force against the magnets, may be used.

In these specific examples of the third preferred embodiment, the compressive force by the reinforcing member 6 is determined to be 100 Kg/mm2 or below when the rotating member B is stationary, but an ordinary skill should realize that the invention is not so limited, and one can apply any compressive force which does not exceed the compressing break stress of a particular magnet used. And, as the reinforcing member 6 for the magnets, for example, glass fiber reinforced plastic (GFRP) may be used other than the CFRP, and materials having a smaller specific gravity and a higher tensile break strength than a magnet used can be used.

Description will now be made of the fourth embodiment of the invention.

FIG. 42 is a vertical sectional view of the main part of a superconducting bearing device according to the fourth embodiment of the invention. This superconducting bearing device comprises a superconductor 1 to be mounted on a stationary member A and a magnet section 2 to be mounted on a rotating member B, and the superconductor 1 and the magnet section 2 are disposed to oppose each other with a gap therebetween in the same way as in the above-described examples.

The superconductor 1 is formed by uniformly mixing normal conduction articles $Y_2Ba_1Cu_1$ into a yttrium high-temperature superconductor, e.g., a substrate made of $YBa2Cu_3Ox$, and has a characteristic to restrain the intrusion of magnetic fluxes generated from annular permanent magnets 3 to be described hereinbelow. The superconductor 1 has its length in a radial direction determined to be almost equal to a total of radial lengths of the annular permanent magnets 3.

The superconductor 1 is disposed to oppose the annular permanent magnets 3 in the axial direction and spaced from them so that at a position where a prescribed quantity of magnetic fluxes from the annular permanent magnets 3 permeates, the distribution of the permeated magnetic flux is not varied by the rotation of the rotating member B.

The rotating member B consists of an annular rotor 5 and the aforementioned magnet section 2 fixed to the rotor 5. The magnet section 2 is coaxial with the axis of the rotating member B and has the multiple annular permanent magnets 3, 3 which are mutually magnetized so that the neighboring magnets are repelled in the radial direction, and an annular magnetic yoke member 4 is disposed between the respective annular permanent magnets 3.

In this specific example, the annular permanent magnets 3, 3 use e.g., a Pr—Fe—B—Cu-based permanent magnet produced by a hot processing method, and the annular magnetic yoke member 4 is made of soft, malleable iron. As described above, in this structure, the magnetic fluxes from the north poles of the two annular permanent magnets 3 pass through the annular magnetic members 4 and return to the south poles of the annular permanent magnets 3. Thus, the magnetic fluxes from the annular permanent magnets 3 are narrowed down by the annular magnetic yoke members 4, so that a magnetic density acting on the superconductor 1 can be increased substantially.

This superconducting bearing device has its superconductor 1 cooled with a cooling medium which is circulating within a cooling case (not shown) to keep it in the superconducting state in the same way as described above. In the superconducting state, the magnetic fluxes from the annular permanent magnets 3 of the rotating member B penetrate to selectively pass through the uniformly mixed normal conduction particles in the superconductor and are fixed in the intrusion path by a superconducting current passing around the penetrated magnetic fluxes, thereby inducing the pinning phenomenon.

When the superconducting bearing device has a large bearing and a single-body annular permanent magnet cannot be made, a plurality of permanent magnets are connected to form the annular permanent magnets 3. In this case, when the annular magnetic yoke members 4 and the annular permanent magnets 3 are alternately disposed, a large bearing which does not cause the nonuniformity in magnetic flux can be produced.

In this specific example, ring-shaped reinforcing members 6 are mounted (on the outer periphery of the annular permanent magnets 3 to compress them in the radial and circumferential directions. The reinforcing member 6 is made of a material which has a smaller specific gravity and a higher tensile break strength than the annular permanent magnets used.

Specifically, in the same way as in the third embodiment of the invention, the fourth embodiment aims that the ring-shaped reinforcing members 6 for compressing the annular permanent magnets 3 are mounted on their outer peripheries when the rotating member B is not rotating, and when the rotating member B is rotated at a high speed, the tensile strength applied to the annular permanent magnets 3, 3 is reduced as much as possible. Therefore, the reinforcing member 6 is made of a material which has a smaller specific gravity and a higher tensile break strength than the annular permanent magnets 3 in order to retain a compressive force applied to the annular permanent magnets 3 as much as possible. In the same way as in the above specific example, this specific example uses carbon fiber reinforced plastic (CFRP) as the reinforcing member. The used CFRP has a density of 1.6 [g/cm3], Poisson's ratio of 0.3, and Young's modulus of $1.72 \times 10^{11}$ Pa, while the Pr magnet in this specific example has a density of 7.4 [g/cm3], Poisson's ratio of 0.24, and Young's modulus of $1.34 \times 10^{11}$ Pa.

And, this specific example also has the reinforcing member 6 disposed in a multilayered structure discussed hereinabove with respect to the third preferred embodiment. Further, member 6 can be mounted with a less interference, so that the distribution of compression stress against the magnets can be made uniform. When the distribution of compression stress against the magnets is made uniform, the deviated application of a compression stress can be avoided. Thus, since the compression stress is uniformly applied, the breakage of the rotating magnets due to the lack of the compression stress to be applied can be prevented, and the safety and reliability of the device can be improved.

As described above, this specific example uses the CFRP for the reinforcing member 6, and to fit the CFRP, the first alternative method would entail winding it around the annular permanent magnets while compressing in their radial and circumferential directions, thereby forming the ring-shaped reinforcing member 6 on the outer periphery of the magnet section 2. The second alternative method previously forms the ring-shaped reinforcing member 6 and fits it onto the outer periphery of the magnet section 2. In both these methods, the compression stress is set not to exceed 100 Kg/mm2, as described previously.

Now, further, a ring-shaped member 7 having a smaller Young's modulus than the reinforcing member 6 is mounted on the inner periphery of each reinforcing member 6. This member 7 is made of a material such as aluminum having a small Young's modulus, so that a compressive force which is applied to the magnets by the reinforcing member 6 is adjusted to be applied uniformly to the periphery.

In case of adopting the method that the reinforcing member 6 is previously formed in the shape of a ring and the ring-shaped reinforcing member 6 is forced to be fitted to the outer periphery of the annular permanent magnet, when the ring-shaped member 7 is provided with a tapered protrusion for guiding, the ring-shaped reinforcing member 6 can be fitted easily. In this case, the tapered part is removed after mounting the reinforcing member 6.

In the fourth preferred embodiment of the invention, a wedge ring 21 for compressing the annular permanent magnets 3, 3 in the radial and circumferential directions is fitted to the rotating member B. In the specific example shown in FIG. 42, the wedge ring 21 is forced in between the magnet section 2 and the reinforcing member 6. In this specific example, the wedge ring 21 is forced in after previously fitting a guide ring 24 which has a tapered inner periphery to the inner periphery of the reinforcing member 6. Specifically, the wedge ring 21 is forced in with its thin side first between the annular magnetic member 4 fitted to the outer periphery of the outermost annular permanent magnet 3 and the guide ring 24. Since the wedge ring 21 has its outer periphery tapered in a cross-sectional shape, the previous fitting of the guide ring 24 having the tapered inner periphery provides a gap between the annular magnetic member 4 and the guide ring 24, and the wedge ring 21 is inserted into the gap.

Since the guide ring 24 receives the forced-in wedge ring 21 by its inner periphery, it preferably comprises a plastically deformable, nonbreakable material, (e.g., a very elastic material such as special aluminum alloy, titanium alloy, or CFRP).

And, since the wedge ring 21 is fitted with both the tapered surfaces of the wedge ring and the guide ring slidably contacted, the wedge angle is preferably small so that a stress is radially applied without much resistance when the wedge ring 21 is forced in.

Thus, the rotating member B is provided with the wedge ring 21 fair compressing the annular permanent magnets 3 in the radial and circumferential directions, so that the intrinsic compressing action of the reinforcing member 6 is supplemented by the wedge ring 21.

In FIG. 43, the wedge ring 21 comprises a guiding wedge ring 22 and an inserting wedge ring 23 which is larger than the guiding wedge ring 22, both initially being connected. Specifically, the guiding wedge ring 22 and the inserting wedge ring 23 are directly connected to each other to form one wedge ring 21, the guiding wedge ring 22 is previously forced in between the annular magnetic member 4 and the guide ring 24 as shown in FIG. 44, and the guiding wedge ring 22 is pushed out by the inserting wedge ring 23 which forces to insert the inserting wedge ring 23 between the annular magnetic member 4 and the guide ring 24. The guiding wedge ring 22 and the inserting wedge ring 23 are made of the same type of material such as iron or stainless steel.

The guiding wedge ring 22 and the inserting wedge ring 23 are mutually connected by means of their recess and projection, and when the inserting wedge ring 23 is forced in between the annular magnetic member 4 and the guide ring 24, a projection 23a protruded from the surface of the rotating member B is removed.

In this specific example, the wedge ring 21 is formed by directly connecting the guiding wedge ring 22 and the inserting wedge ring 23 which is larger than the wedge ring 22, and after previously forcing in the guiding wedge ring 22, the guiding wedge ring 22 is pushed out by the inserting wedge ring 23 which forces to insert the inserting wedge ring 23 between the annular magnetic member 4 and the reinforcing member 6 (with the guide ring 24 next to the reinforcing member 6 in this specific example). Therefore, the wedge's slant angle can be made small, a stress by the forced insertion can be radially applied without much resistance to facilitate the forced insertion, and when an appropriate number of wedge rings are directly connected and inserted, a desired compressive force can be attained.

The specific example shown in FIG. 45 shows a superconducting bearing device which comprises a superconductor 1 to be mounted on a stationary member A and a magnet section 2 to be mounted on a rotating member B in the same way as in the above-described examples, and the superconductor 1 and the magnet section 2 are disposed to oppose each other with a gap therebetween. The magnet section 2 is formed by fitting annular permanent magnets 3 which are concentric with the axis of the rotating member B, and an annular soft magnetic yoke member 4 which has the shape of a ring is disposed between the respective annular permanent magnets 3. A ring-shaped reinforcing member 6 made of carbon fiber reinforced elastic (CFRP) is mounted on the outer periphery of the magnet section 2, and a wedge ring 21 is forced in between the magnet section 2 and the reinforcing member 6. In this specific example, the wedge ring 21 is forced in from the side opposite from the previous specific example. Also, in this specific example, the wedge's tapered angle can also be made small to facilitate the forced insertion, and when an appropriate number of wedge rings are connected and inserted, a desired compressive force can be attained.

As described above, according to the respective specific examples of the fourth embodiment of the invention, the axial loading force by the annular permanent magnet 6 can be increased by increasing the number of the annular permanent magnet layers, and even when the radius is increased because of the increase in the layers of the multilayered annular permanent magnets, the presence of the reinforcing members for applying a compressive force to the magnets and the supporting wedge ring prevents the magnets from being broken due to a critical tensile force.

Although the Pr—Fe—B—Cu magnet is used as the magnets in the respective specific examples, it is to be understood that the fourth embodiment is not limited to it, and any permanent magnets such as ferrite, Alnico, neodymium-based or samarium-based may be used. Besides, the superconductor has been described using the yttrium high-temperature superconductor as an example, but any rare-earth superconductor such as (RE-Ba—Cu—O)-based materials, which can have a restoring force against magnets, may be used.

Further, in the specific example, the winding compressive force by the reinforcing member 6 is determined to be 100 Kg/mm2 or below when the rotating member B is not rotating, an ordinary skill will recognize that the fourth embodiment or the invention itself is not limited, and one can apply a compressive force which does not exceed the compressing break stress of the particular permanent magnet material used. And, as the reinforcing member 6 for the magnets, for example, glass fiber reinforced plastic (GFRP) may be used other than the CFRP, and materials having a smaller specific gravity and a higher tensile break strength than a magnet used can be used.

In the respective specific examples, the wedge ring 21 is forced in between the magnet section 2 and the reinforcing member 6, but the fourth embodiment of the invention is not particularly so limited, and a single or a plurality of wedge rings 21 may be fitted between the annular permanent magnets 3 and between the reinforcing members 6.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A superconducting bearing device, comprising:
a superconductor mounted on a stationary member; and
an opposing magnet section mounted on a rotating member spaced a gap distance away from said superconductor, said magnet section comprising:
first and second annular permanent magnets arranged concentrically about a central axis of rotation of said rotating member; and
a malleable magnetic yoke member radially interposing said annular permanent magnets, said yoke member engaging a radial outer joint surface of said first permanent magnet and a radial inner joint surface of said second permanent magnet, said joint surfaces being curved with respect to the central axis of rotation of said rotating member to provide an interlocking arrangement between said first and second permanent magnets and said yoke member.

2. The superconducting bearing device of claim 1, wherein:
said radial outer joint surface of said first permanent magnet is convex relative to the central axis of rotation of said rotating member;
wherein said radial inner joint surface of said second permanent magnet is concave relative to the central axis of rotation of said rotating member; and
wherein said yoke member engages said radial outer joint surface of said first permanent magnet at a concave surface thereof relative to the central axis of rotation of said rotating member and engages said radial inner joint surface of said second permanent magnet at a convex surface thereof relative to the central axis of rotation of said rotating member.

3. The superconducting bearing device of claim 1, wherein said first and second permanent magnets each comprise a closed loop of arcuate magnet pieces interconnected at evenly-spaced circumferential junction intervals disposed within each respective permanent magnet;
wherein the circumferential junction intervals of the first permanent magnet are unaligned with the circumferential junction intervals of the second permanent magnet to dissipate nonuniform magnetic flux densities experienced at said junction intervals throughout said magnet section.

4. The superconducting bearing device of claim 3, wherein the circumferential junction intervals of the first permanent magnet are circumferentially staggered relative to the circumferential junction intervals of the second permanent magnet.

5. The superconducting bearing device of claim 3, wherein the respective numbers of circumferential junction intervals in each said first and second permanent magnets are equal.

6. The superconducting bearing device of claim 3, wherein the number of circumferential junction intervals in said first permanent magnet differs from the number of circumferential junction intervals in said second permanent magnet.

7. A superconducting bearing device, comprising:
a superconductor mounted on a stationary member; and
a magnet section mounted on a rotating member opposing said superconductor, said magnet section comprising:
first and second annular permanent magnets arranged concentrically about a central axis of rotation of said rotating member and axially spaced a first gap distance from said superconductor; and
a malleable magnetic yoke member radially interposing said annular permanent magnets and including an extensible portion protruding towards, and axially spaced a second gap distance from, said superconductor, than second gap distance being smaller than the first gap distance;

wherein said extensible portion terminates in a tapered shape to concentrate magnetic flux generated by said magnet section and wherein the lines of magnetic force generated extend from said magnet section to said superconductor.

8. The superconducting bearing device of claim 7, wherein said extensible portion terminates in an axially rounded shape to concentrate magnetic flux generated by said magnet section such that the lines of magnetic force generated extend from said magnet section to said superconductor.

9. The superconducting bearing device of claim 7, wherein said extensible portion terminates in an axially chamfered shape to concentrate magnetic flux generated by said magnet section such that the lines of magnetic force generated extend from said magnet section to said superconductor.

10. The superconducting bearing device of claim 7, wherein said first and second permanent magnets are radially curled magnetized to concentrate magnetic flux along said extensible portion of said yoke member.

11. A superconducting bearing device, comprising:
a superconductor mounted on a stationary member; and
a magnet section mounted on a rotating member opposing said, superconductor, said magnet section comprising:
first and second annular permanent magnets arranged concentrically about a central axis of rotation of said rotating member and axially spaced a first gap distance from said superconductor; and
a malleable magnetic yoke member radially interposing said annular permanent magnets and including an extensible portion protruding towards, and axially spaced a second gap distance from, said superconductor, the second gap distance being smaller than the first gap distance;
wherein said first permanent magnet further comprises:
a radially inner permanent magnet axially slantingly magnetized away from said superconductor; and
a radially outer permanent magnet axially slantingly magnetized towards said superconductor to direct and concentrate magnetic flux along said extensible portion of said yoke member.

12. The superconducting bearing device of claim 11, wherein said first permanent magnet further comprises a intermediate permanent magnet radially interposing said inner and outer permanent magnets and axially slantingly magnetized parallel to said superconductor.

13. A superconducting bearing device, comprising:
a superconductor mounted on a stationary member; and
a magnet section mounted on a rotating member opposing said superconductor, said magnet section comprising:
first and second annular permanent magnets arranged concentrically about a central axis of rotation of said rotating member and axially spaced a first gap distance from said superconductor; and
a malleable magnetic yoke member radially interposing said annular permanent magnets and including an extensible portion protruding towards, and axially spaced a second gap distance from, said superconductor, the second gap distance being smaller than the first gap distance;
wherein said second permanent magnet further comprises:
a radially inner permanent magnet axially slantingly magnetized towards said superconductor; and
a radially outer permanent magnet axially slantingly magnetized away from said superconductor to direct and concentrate magnetic flux along said extensible portion of said yoke member.

14. The superconducting bearing device of claim 13, wherein said second permanent magnet further comprises a intermediate permanent magnet radially interposing said inner and outer permanent magnets and axially slantingly magnetized parallel to said superconductor.

15. The superconducting bearing device of claim 11, wherein said second permanent magnet further comprises:
a radially inner permanent magnet axially slantingly magnetized towards said superconductor; and
a radially outer permanent magnet axially slantingly magnetized away from said superconductor to direct and concentrate magnetic flux along said extensible portion of said yoke member.

16. The superconducting bearing device of claim 15, wherein said first and second permanent magnets each further comprise a intermediate permanent magnet radially interposing said respective inner and outer permanent magnets and axially slantingly magnetized parallel to said superconductor.

17. A superconducting bearing device, comprising:
a superconductor mounted on a stationary member; and
an magnet section mounted on a rotating member opposing said superconductor, said magnet section comprising:
first and second annular permanent magnets arranged concentrically about a central axis of rotation of said rotating member and axially spaced a first gap distance from said superconductor; and
an axially wedge-shaped magnetic yoke member radially interposing said annular permanent magnets.

18. The superconducting bearing device of claim 17, wherein said wedge-shaped magnetic yoke includes first and second surfaces radially engaging said first and second annular permanent magnets respectively and a third surface facing said superconductor.

19. The superconducting bearing device of claim 18, wherein said third surface of said wedge-shaped magnetic yoke extends from a superconductor opposing face of said magnet section towards the superconductor terminating in an axially curved extensible portion axially spaced at least a second gap distance from said superconductor, wherein said second gap distance is smaller than said first gap distance.

20. The superconducting bearing device of claim 18, wherein said second permanent magnet further comprises:
a radially inner permanent magnet axially slantingly magnetized towards said superconductor and engaging said second surface of said wedge-shaped yoke member; and
a radially outer permanent magnet axially slantingly magnetized away from said superconductor to direct and concentrate magnetic flux along said third surface of said wedge-shaped yoke member.

21. The superconducting bearing device of claim 20, wherein said second permanent magnet further comprises a intermediate permanent magnet radially interposing said inner and outer permanent magnets and axially slantingly magnetized parallel to said superconductor.

22. A superconducting bearing device, comprising:
a superconductor mounted on a stationary member; and
a magnet section mounted on a rotating member opposing said superconductor, said magnet section comprising:
first and second annular permanent magnets arranged concentrically about a central axis of rotation of said rotating member and axially spaced a first gap distance from said superconductor; and an axially wedge-shaped magnetic yoke member radially interposing said annular permanent magnets;

wherein said wedge-shaped magnetic yoke includes first and second surfaces radially engaging said first and second annular permanent magnets respectively and a third surface facing said superconductor; and wherein said first permanent magnet further comprises:
  a radially inner permanent magnet axially slantingly magnetized away from said superconductor; and
  a radially outer permanent magnet axially slantingly magnetized towards said superconductor and engaging said first surface of said wedge-shaped yoke to direct and concentrate magnetic flux along said third surface of said wedge-shaped yoke member.

23. The superconducting bearing device of claim 22, wherein said first permanent magnet further comprises a intermediate permanent magnet radially interposing said inner and outer permanent magnets and axially slantingly magnetized parallel to said superconductor.

24. The superconducting bearing device of claim 22, wherein said second permanent magnet further comprises:
  a radially inner permanent magnet axially slantingly magnetized towards said superconductor and engaging said second surface of said wedge-shaped yoke member; and
  a radially outer permanent magnet axially slantingly magnetized away from said superconductor to direct and concentrate magnetic flux along said third surface of said wedge-shaped yoke member.

25. The superconducting bearing device of claim 24, wherein said first and second permanent magnets each further comprise a intermediate permanent magnet radially interposing said respective inner and outer permanent magnets and axially slantingly magnetized parallel to said superconductor.

26. A superconducting bearing device, comprising:
  a superconductor mounted on a stationary member; and
  an opposing magnet section mounted on a rotating member spaced a gap distance away from said superconductor, said magnet section comprising:
    inner and outer annular permanent magnets arranged concentrically about a central axis of rotation of said rotating member;
    a malleable magnetic yoke member radially interposing said inner and outer annular permanent magnets; and
    a separate annular reinforcing member concentrically circumscribing said inner and outer annular permanent magnets and said yoke member for radially and circumferentially compressing each of said annular permanent magnets and said yoke member and preventing axial displacement thereof at high rotational speeds.

27. The superconducting bearing device of claim 26, wherein said annular reinforcing member comprises a magnetically-neutral material having a smaller specific gravity and higher tensile strength than a magnetic material comprising the inner and outer annular permanent magnets.

28. The superconducting bearing device of claim 27, wherein said annular reinforcing member comprises carbon fiber reinforced plastic (CFRP).

29. The superconducting bearing device of claim 26, wherein
  said inner and outer annular permanent magnets each have a first axial thickness; and
  wherein said reinforcing member has a second axial thickness larger than said first axial thickness to increase rotational stability of said magnet section.

30. The superconducting bearing device of claim 26, further comprising a magnetically-neutral annular wedge interposing said outer annular permanent magnet and said annular reinforcing member to impart additional radial and circumferential force against said annular permanent magnets and said yoke member.

31. The superconducting bearing device of claim 26, wherein said annular reinforcing member comprises a plurality of concentrically arranged annular reinforcing members.

32. The superconducting bearing device of claim 26, wherein said inner and outer annular permanent magnets each comprise a closed loop of arcuate magnet pieces interconnected at evenly-spaced circumferential junction intervals disposed within each respective permanent magnet.

33. The superconducting bearing device of claim 32, wherein the circumferential junction intervals of the inner annular permanent magnet are unaligned with the circumferential junction intervals of the outer annular permanent magnet to dissipate nonuniform magnetic flux densities experienced at said junction intervals throughout said magnet section.

34. The superconducting bearing device of claim 33, wherein the circumferential junction intervals of the inner annular permanent magnet are circumferentially staggered relative to the circumferential junction intervals of the outer annular permanent magnet.

35. The superconducting bearing device of claim 33, wherein the respective numbers of circumferential junction intervals in each said inner and outer annular permanent magnets are equal.

36. The superconducting bearing device of claim 33, wherein the number of circumferential junction intervals in said inner annular permanent magnet differs from the number of circumferential junction intervals in said outer annular permanent magnet.

37. A superconducting bearing device, comprising:
  a superconductor mounted on a stationary member; and
  an opposing magnet section mounted on a rotating member spaced a gap distance away from said superconductor, said magnet section comprising:
    upper and lower annular permanent magnets arranged cylindrically about a central axis of rotation of said rotating member, wherein said upper and lower annular permanent magnets each comprise a closed loop of arcuate magnet pieces interconnected at evenly-spaced circumferential junction intervals disposed within each respective permanent magnet;
  wherein the circumferential junction intervals of the upper annular permanent magnet are unaligned with the circumferential junction intervals of the lower annular permanent magnet to dissipate nonuniform magnetic flux densities experienced at said junction intervals throughout said magnet section.

38. The superconducting bearing device of claim 37, wherein the circumferential junction intervals of the upper annular permanent magnet are axially staggered relative to the circumferential junction intervals of the inner annular permanent magnet.

39. The superconducting bearing device of claim 37, wherein the respective numbers of circumferential junction intervals in each said upper and lower annular permanent magnets are equal.

40. The superconducting bearing device of claim 37, wherein the number of circumferential junction intervals in said upper annular permanent magnet differs from the number of circumferential junction intervals in said lower annular permanent magnet.

41. A magnet section mountable on a rotating member for use in a superconducting bearing device and comprising:
- first and second annular permanent magnets arranged concentrically about a central axis of rotation of said rotating member when mounted on the rotating member; and
- a malleable magnetic yoke member radially interposing said annular permanent magnets, said yoke member engaging a radial outer joint surface of said first permanent magnet and a radial inner joint surface of said second permanent magnet, said joint surfaces being curved with respect to the central axis of rotation of said rotating member to provide an interlocking arrangement between said first and second permanent magnets and said yoke member.

42. A magnet section for use in a superconducting bearing device, said magnet section being mountable on a rotating member opposing a superconductor and comprising:
- first and second annular permanent magnets arranged concentrically about a central axis of rotation of the rotating member and axially spaced a first gap distance from the superconductor when mounted on the rotating member; and
- a malleable magnetic yoke member radially interposing said annular permanent magnets and including an extensible portion protruding towards, and axially spaced a second gap distance from, said superconductor, the second gap distance being smaller than the first gap distance, when mounted on the rotating member;
- wherein said extensible portion terminates in a tapered shape to concentrate magnetic flux generated by said magnet section and wherein the lines of magnetic force generated extend from said magnet section to said superconductor.

43. A magnet section for use in a superconducting bearing device, said magnet section being mountable on a rotating member opposing a superconductor and comprising:
- first and second annular permanent magnets arranged concentrically about a central axis of rotation of said rotating member and axially spaced a first gap distance from the superconductor when mounted on the rotating member; and
- an axially wedge-shaped magnetic yoke member radially interposing said annular permanent magnets.

44. A magnet section for use in a superconducting bearing device, said magnet section being mountable on a rotating member opposing a superconductor and comprising:
- inner and outer annular permanent magnets arranged concentrically about a central axis of rotation of the rotating member when mounted thereon;
- a malleable magnetic yoke member radially interposing said inner and outer annular permanent magnets; and
- a separate annular reinforcing member concentrically circumscribing said inner and outer annular permanent magnets and said yoke member for radially and circumferentially compressing each of said annular permanent magnets and said yoke member and preventing axial displacement thereof at high rotational speeds.

45. A magnet section for use in a superconducting bearing device, said magnet section being mountable on a rotating member opposing a superconductor and comprising upper and lower annular permanent magnets arranged cylindrically about a central axis of rotation of the rotating member when mounted thereon, wherein said upper and lower annular permanent magnets each comprise a closed loop of arcuate magnet pieces interconnected at evenly-spaced circumferential junction intervals disposed within each respective permanent magnet;
- wherein the circumferential junction intervals of the upper annular permanent magnet are unaligned with the circumferential junction intervals of the lower annular permanent magnet to dissipate nonuniform magnetic flux densities experienced at said junction intervals throughout said magnet section.

\* \* \* \* \*

UNITED STATES PATENT AND TRADEMARK OFFICE
CERTIFICATE OF CORRECTION

PATENT NO.   : 5,838,082
DATED        : November 17, 1998
INVENTOR(S)  : Norio Ito, et al.

It is certified that errors appear in the above identified patent and that said Letters Patent is hereby corrected as shown below:

Column 37, line 25, delete the "," after "said".

Signed and Sealed this

Nineteenth Day of October, 1999

Attest:

Q. TODD DICKINSON

Attesting Officer

Acting Commissioner of Patents and Trademarks